(12) United States Patent
Dayrell

(10) Patent No.: US 12,510,469 B2
(45) Date of Patent: Dec. 30, 2025

(54) PORTABLE MULTIFUNCTION SPECTROSCOPY ANALYZER

(71) Applicant: Ivan Araujo Dayrell, Belo Horizonte (BR)

(72) Inventor: Ivan Araujo Dayrell, Belo Horizonte (BR)

(*) Notice: Subject to any disclaimer, the term of this patent is extended or adjusted under 35 U.S.C. 154(b) by 231 days.

(21) Appl. No.: 18/223,065

(22) Filed: Jul. 18, 2023

(65) Prior Publication Data

US 2024/0035960 A1 Feb. 1, 2024

Related U.S. Application Data

(60) Provisional application No. 63/392,512, filed on Jul. 27, 2022.

(51) Int. Cl.
*G01N 21/31* (2006.01)

(52) U.S. Cl.
CPC ....... *G01N 21/31* (2013.01); *G01N 2201/062* (2013.01); *G01N 2201/0635* (2013.01); *G01N 2201/0636* (2013.01)

(58) Field of Classification Search
CPC ........ G01J 3/021; G01J 3/0272; G01J 3/0291; G01J 3/10; G01J 3/18; G01J 3/42; G01J 3/45; G01N 2021/1738; G01N 21/255; G01N 21/31; G01N 2201/0221; G01N 2201/062; G01N 2201/0635; G01N 2201/0636

See application file for complete search history.

(56) References Cited

U.S. PATENT DOCUMENTS

| | | | | |
|---|---|---|---|---|
| 2006/0062263 A1* | 3/2006 | Miyaki | ................. | H01S 3/1055 372/20 |
| 2007/0263220 A1* | 11/2007 | Lu | ............................ | G01J 3/02 356/369 |
| 2014/0168649 A1* | 6/2014 | Smith | .................. | G01N 21/031 356/246 |
| 2021/0109015 A1* | 4/2021 | Carcasi | .................. | G01N 21/31 |

FOREIGN PATENT DOCUMENTS

GB 2349207 A * 10/2000 ........... G01N 21/031

* cited by examiner

*Primary Examiner* — Hina F Ayub
(74) *Attorney, Agent, or Firm* — Z IP Law PLLC

(57) ABSTRACT

A spectroscopy analyzer for the identification of substances contained in a sample using a set of spectroscopy techniques and methods using a single device that can be configured to conduct a variety of tests using multiple optical devices and elements. The results are combined in a consolidated sample diagnostic profile that can then be compared with benchmark information produced from other spectroscopy analysis results downloaded from external databases and interpreted using artificial intelligence.

17 Claims, 29 Drawing Sheets

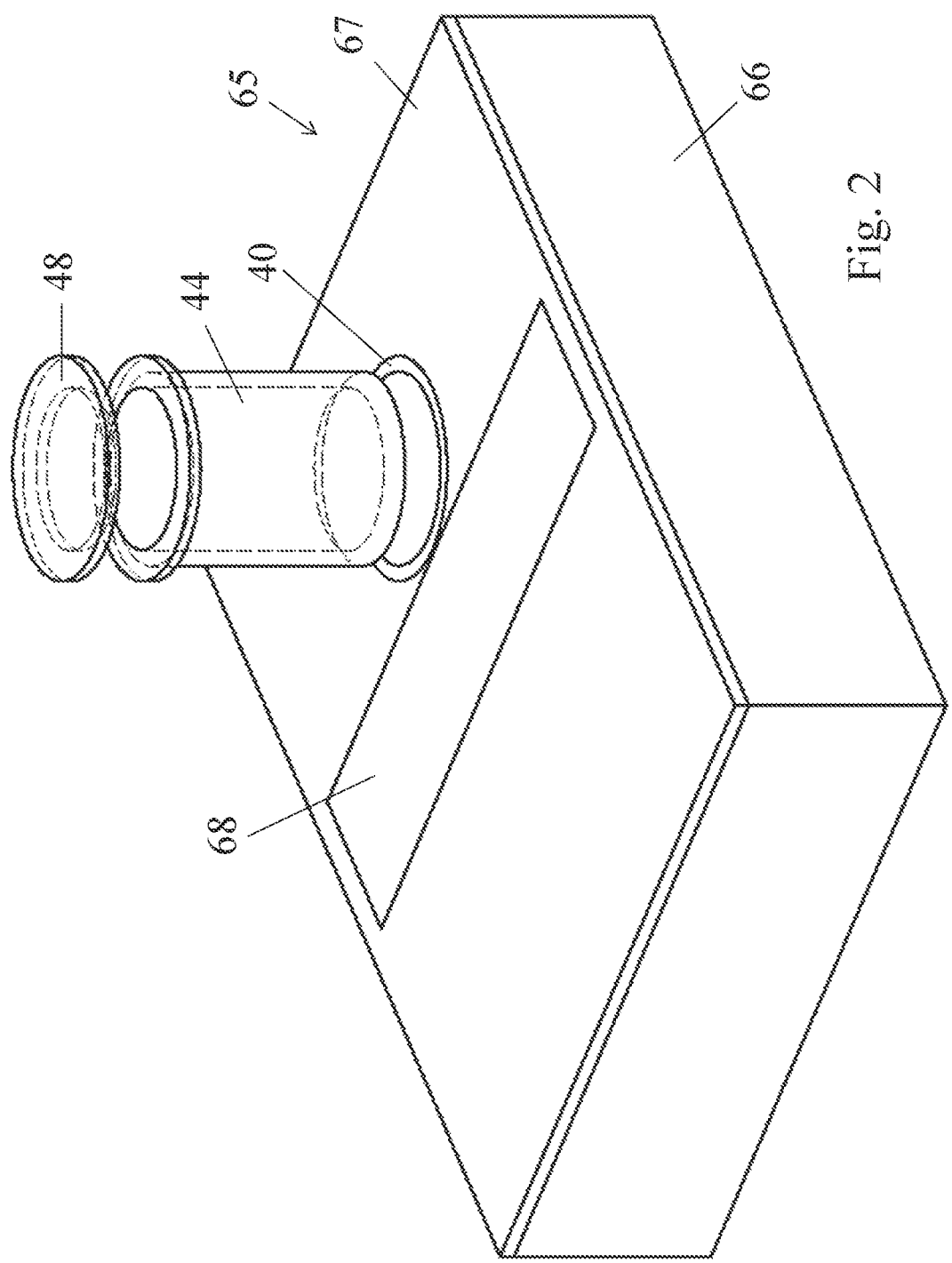

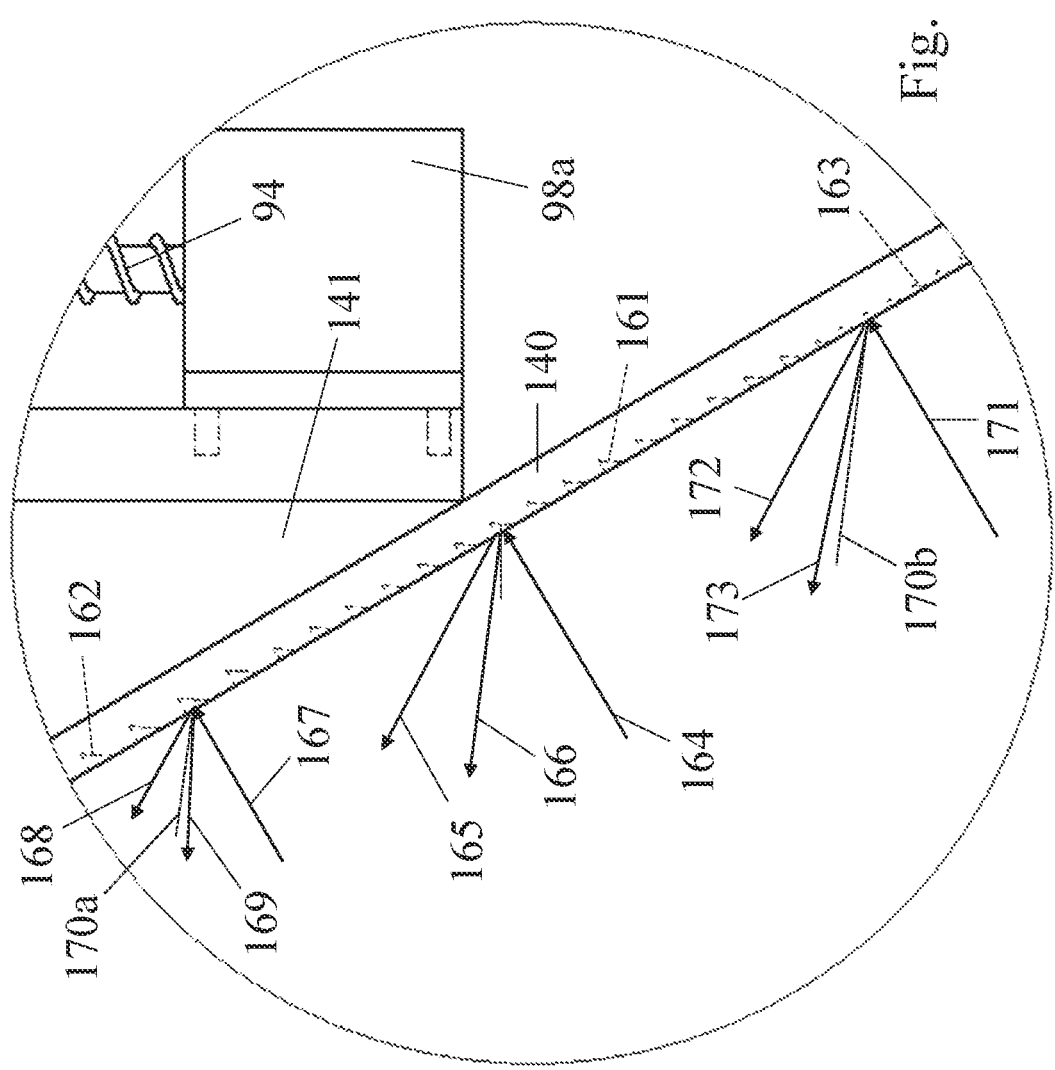

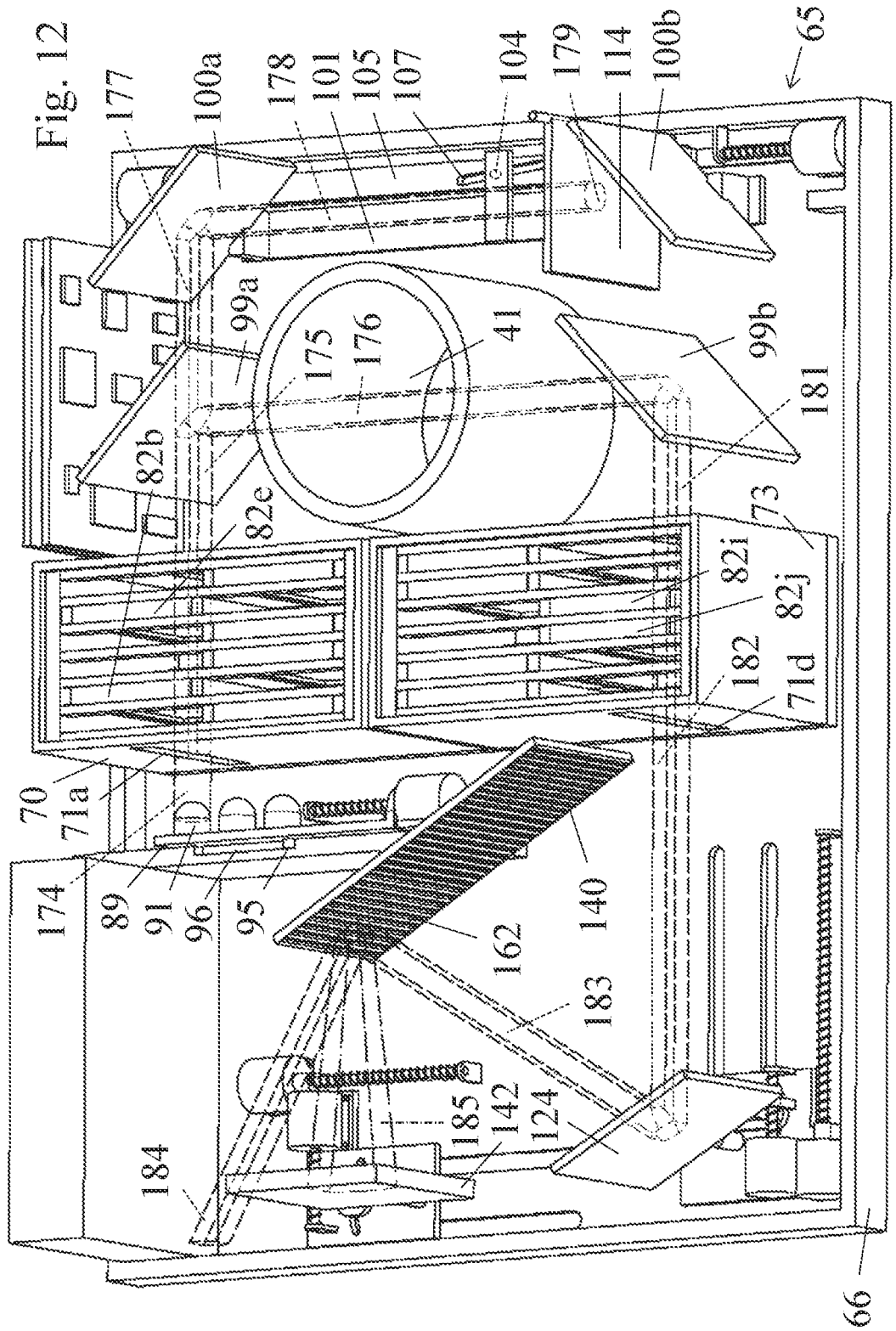

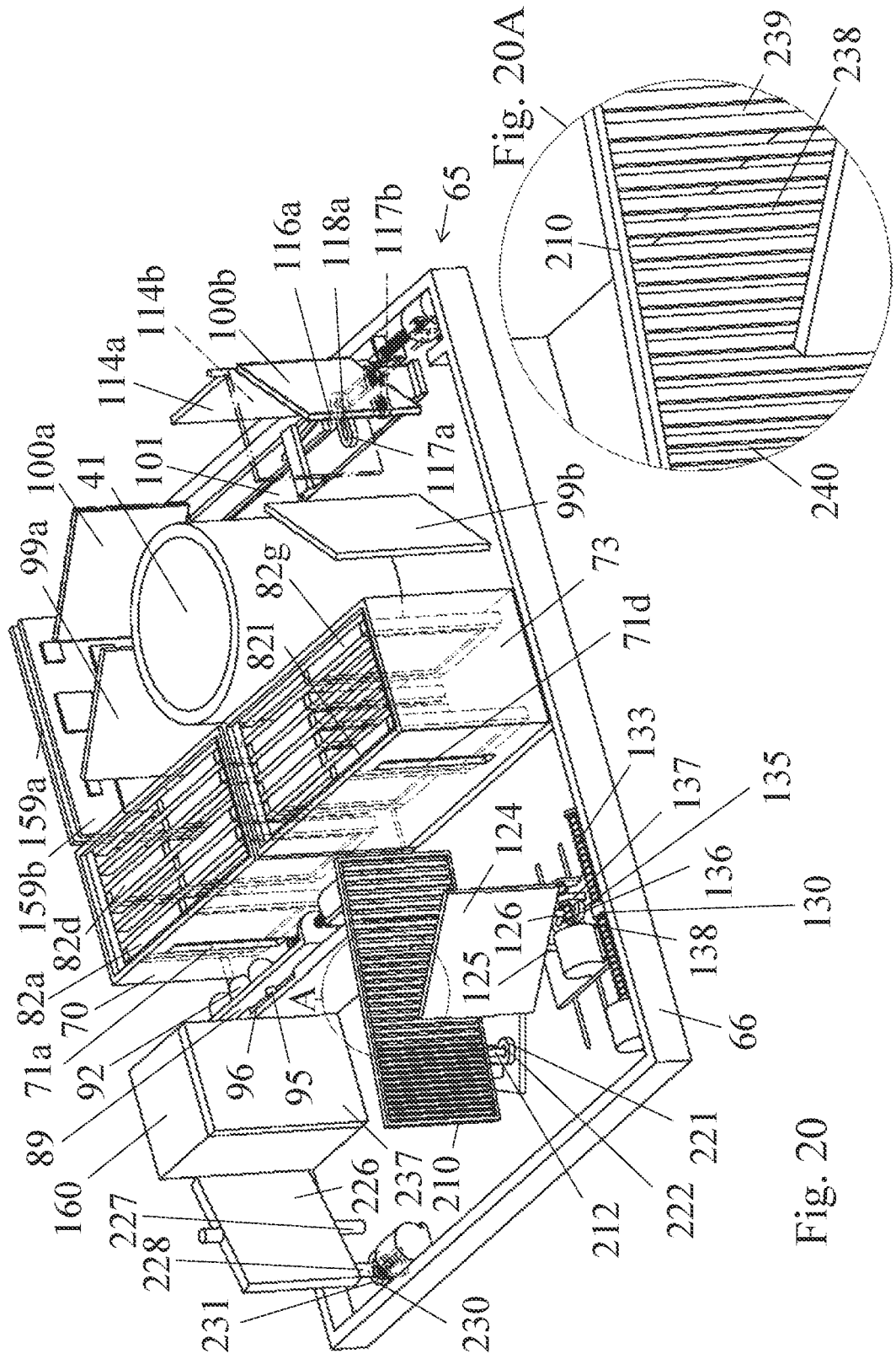

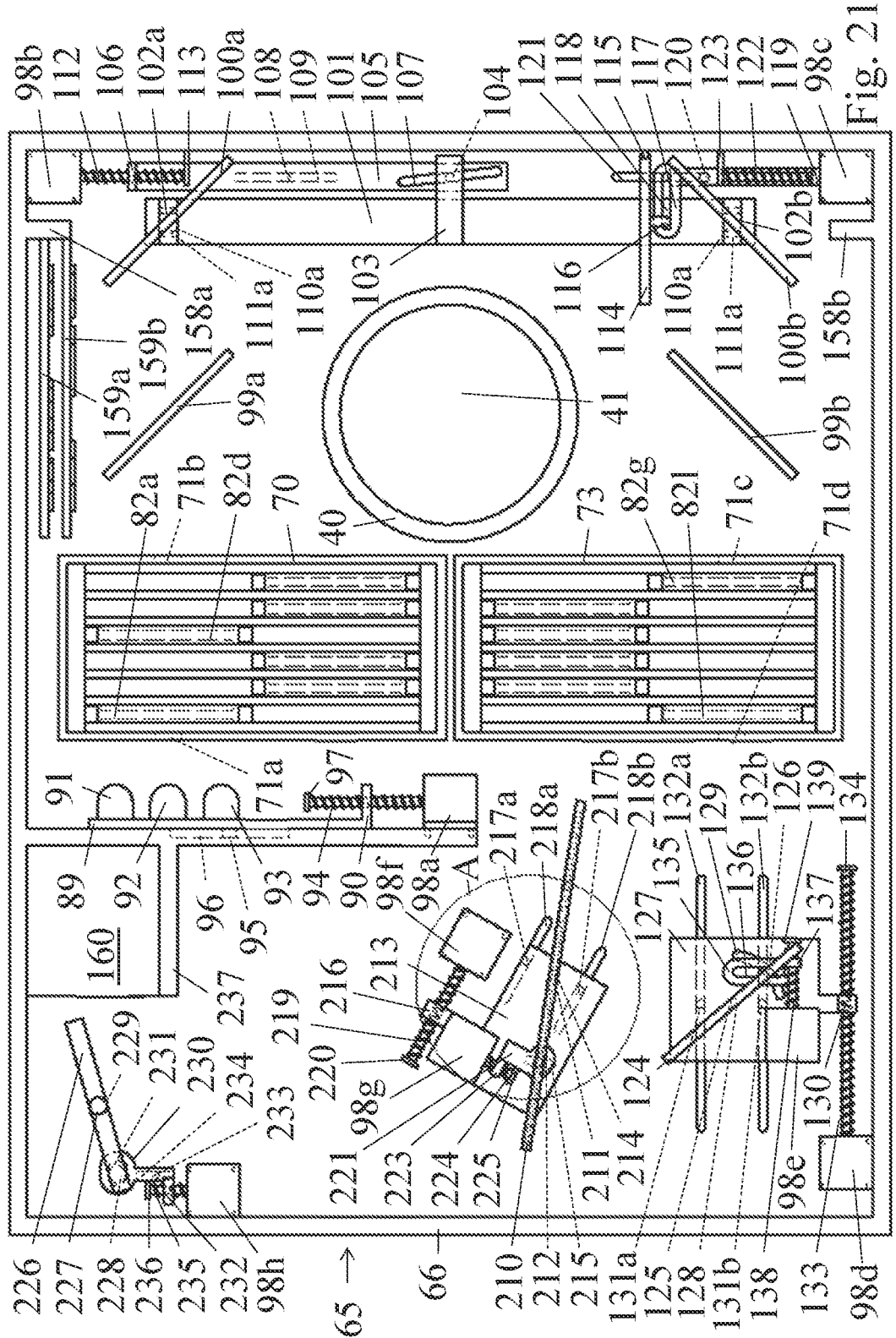

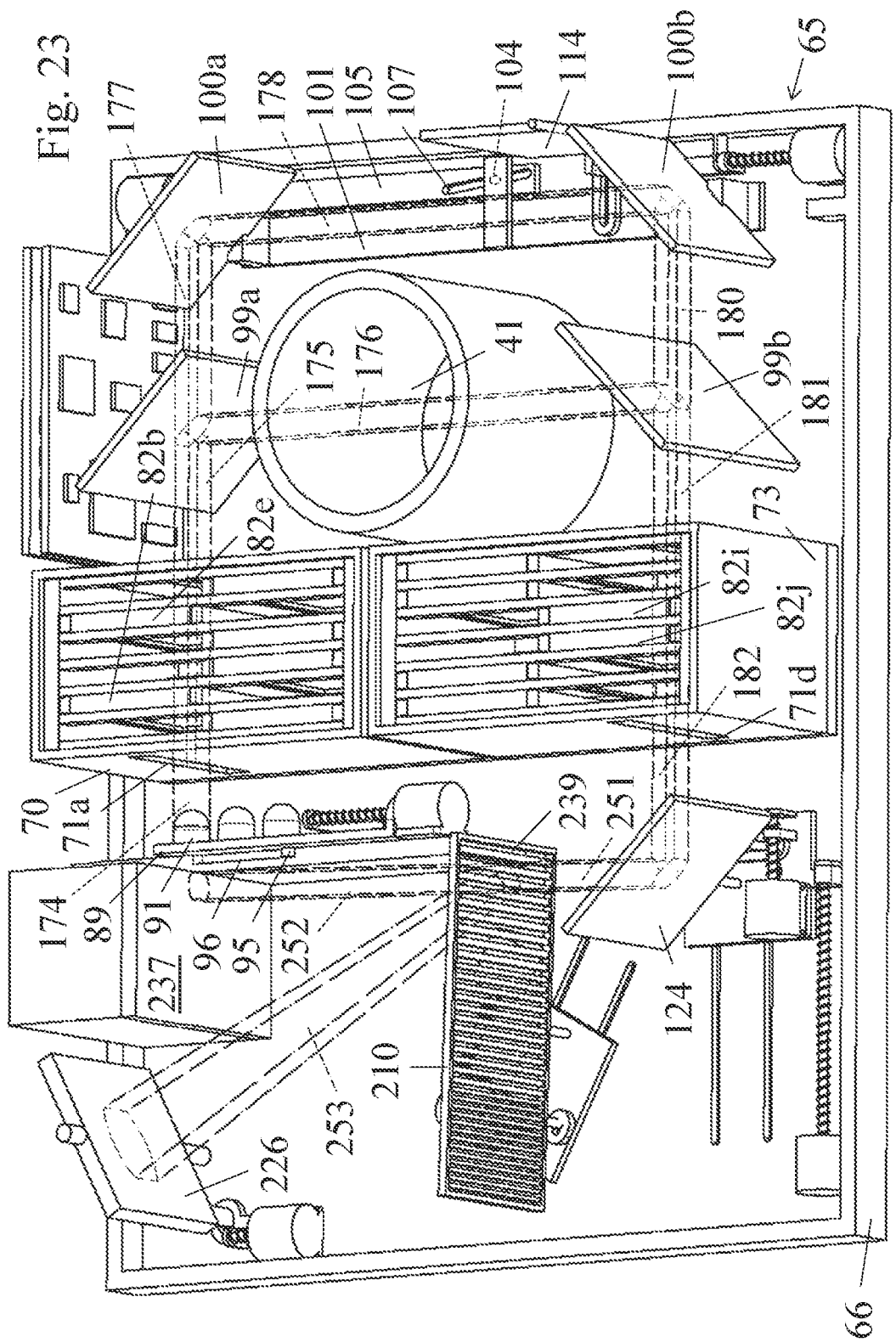

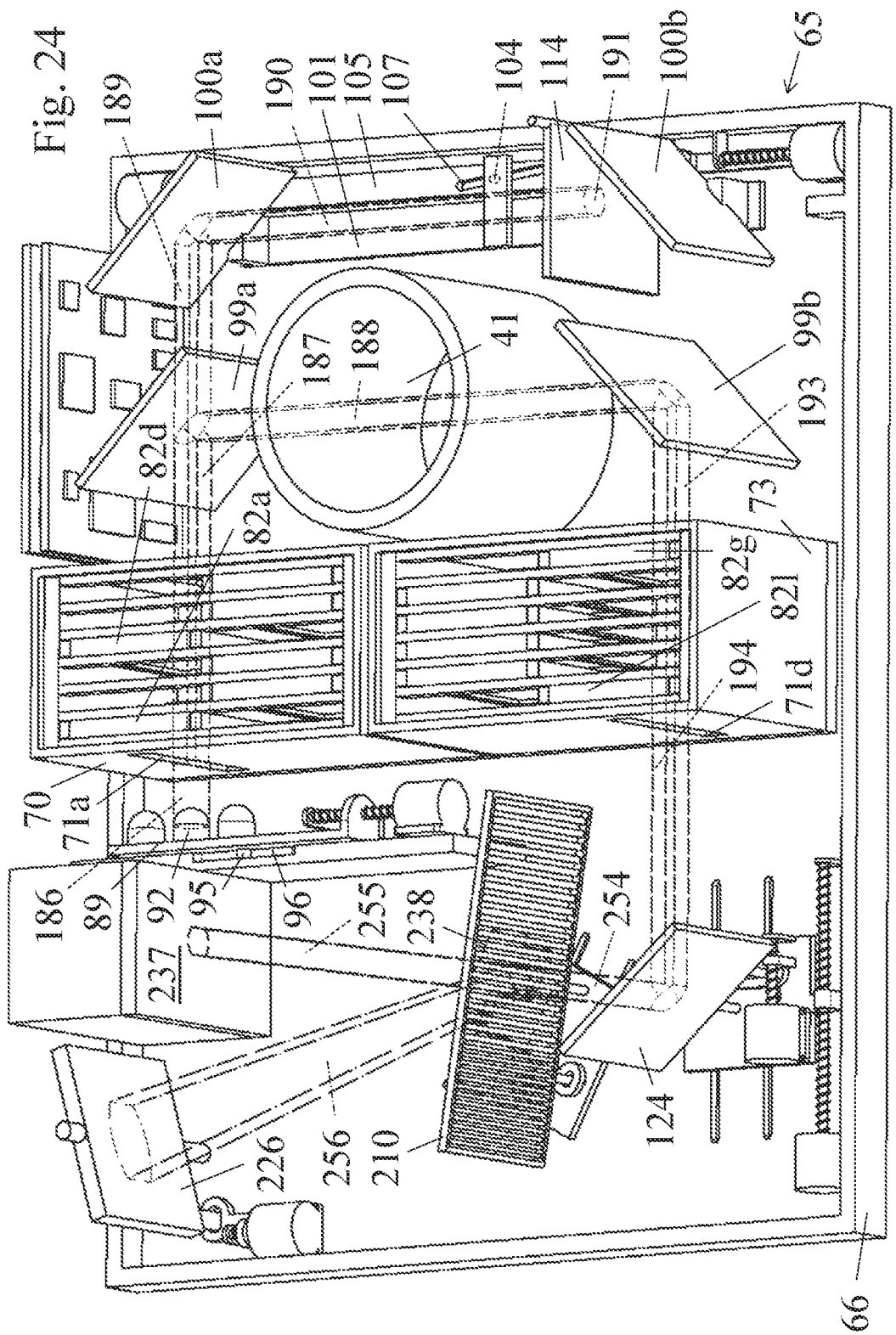

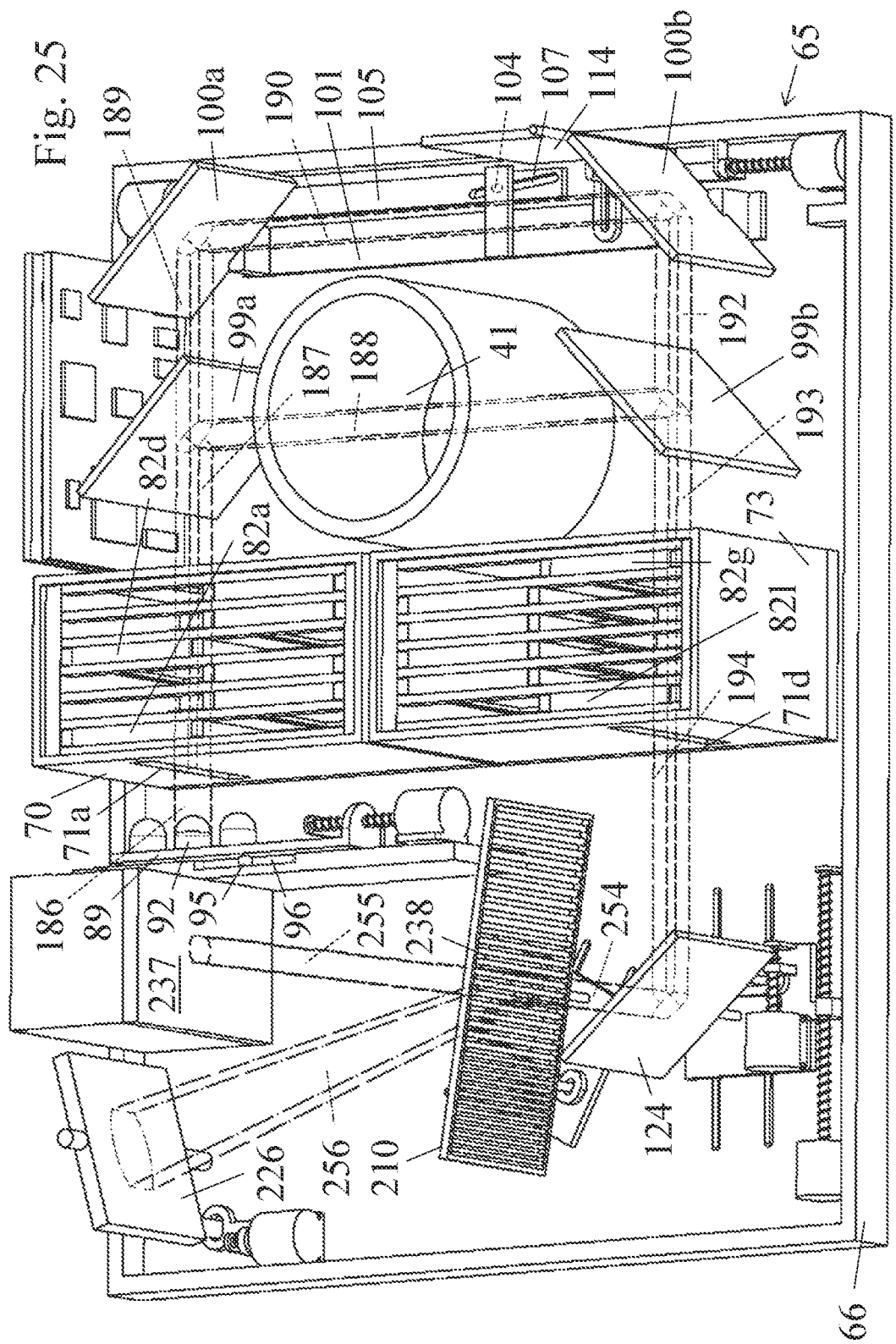

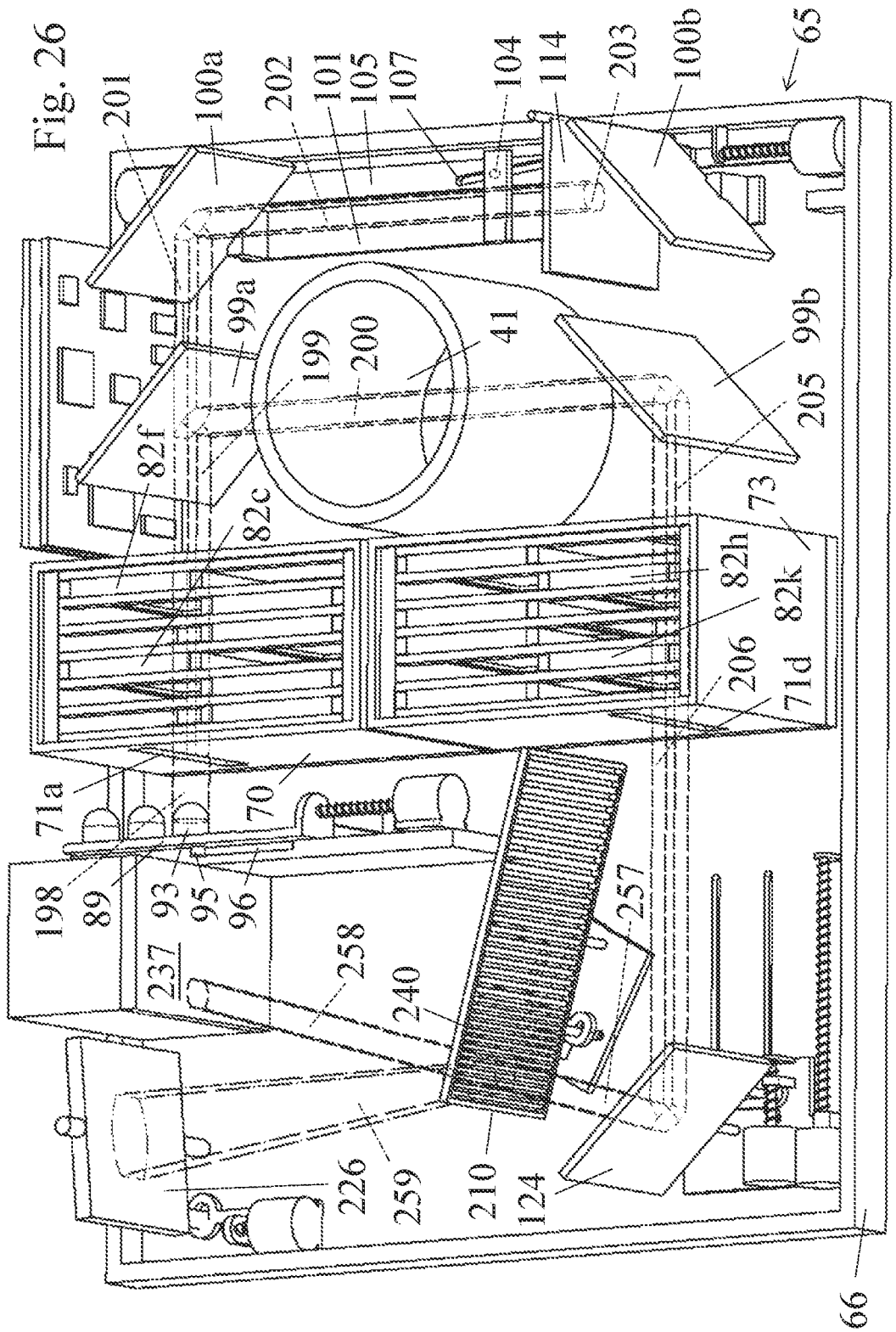

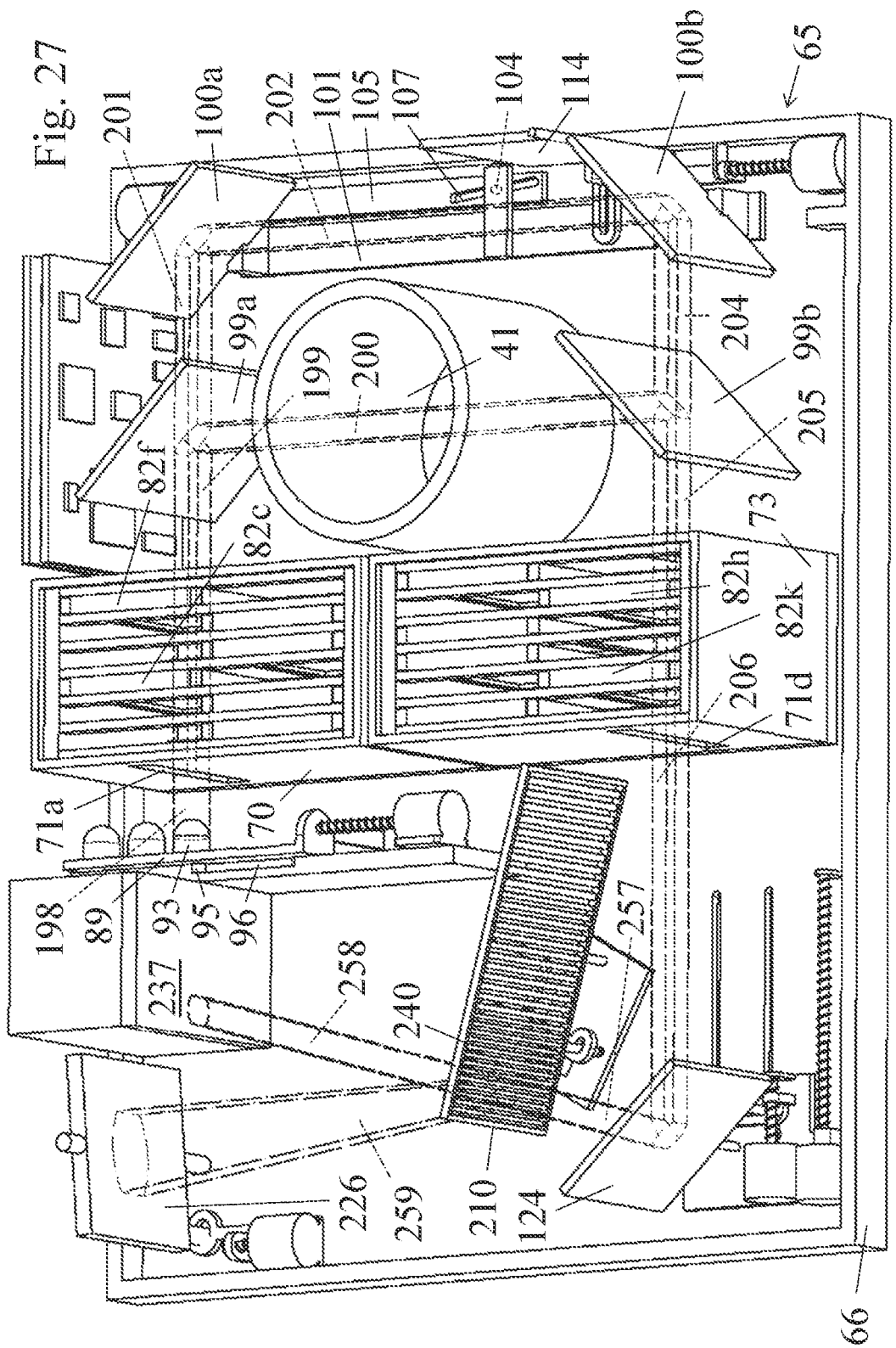

PORTABLE MULTIFUNCTION SPECTROSCOPY ANALYZER

FIELD OF THE INVENTION

The present invention is related to the identification of substances contained in a sample using a set of spectroscopy techniques and methods using a single device that can be configured to conduct a variety of tests using multiple techniques.

The results are combined in a consolidated sample diagnostic profile that can then be compared with benchmark information produced in other more accurate or sensitive devices in a laboratory downloaded from external databases using the internet and interpreted using artificial intelligence.

BACKGROUND

There are many techniques to identify substances in samples and identify potential harmful components and support medical decisions regarding patient treatment.

To date such procedures are mostly conducted in laboratories and require the presence of the patient in the laboratory or a visit of skilled personnel to the patient location to collect the sample. This introduces delays in the execution of the test and in the availability of the results as well as extra costs and in practice limits the number of tests a patient does over a period of time.

A portable, easy to use and efficient device that could do a variety of tests at an affordable cost and at any moment the patient desires has been listed very high on the wish list of doctors and patients and could potentially change the way medicine and health care is conducted changing the focus from the current approach of treating established conditions into early detection and even prevention of problems.

There has been some progress and portable and simple devices are available that work for special tests such as blood sugar concentration, blood saturation of oxygen, alcohol concentration, and others but these tend to be very specific, and work isolated from one another limiting their applicability and potential.

There have been some attempts to produce a more sophisticated and multifunctional device that could be used to perform tests at any desired time and made available for patients at a clinic or even better at home for added convenience. Complexity, costs and reliability however have so far prevented such a device from becoming a reality.

SUMMARY OF THE INVENTION

Technical Problem

The problem of identifying substances in a sample and producing reliable and consistent results is challenging because such a test normally requires a large number of steps starting with sample acquisition and preparation. If any step is performed incorrectly the results may deviate, vary or even be completely wrong. As a result, tests usually require skilled and trained personnel able to collect and prepare samples, use the test equipment, read and interpret the results.

The challenge becomes even bigger when dealing with medical tests as inaccurate or wrong results may affect the wellbeing of the patients and in more extreme cases have life threatening consequences.

A portable and simple test device able to deliver accurate and reliable results would give a substantial aid to patients with a variety of conditions that require constant check of specific levels of substances in the body and give them access to early detection of a deteriorating trend in their condition before it gets serious and even before it can be felt.

This could be lifesaving. But only if the accuracy and reliability of the device can be ascertained and maintained over the expected life of the device. There must be ways to calibrate and self-diagnose the device at regular intervals and the device needs to detect and alarm a malfunction to ensure that it is in good working order and the results are reliable.

Spectroscopy has so far been used as a very sensitive and accurate technique to identify substances in samples. There is a variety of machines that conduct several different tests according to various methods such as absorption of wavelengths, resonance, emission of other wavelengths by excitation of the substance, Raman spectroscopy, interferometry, polarized spectroscopy, etc.

These machines are all different in shape and form as they require a number of particular optical parts assembled in a specific way. Furthermore, they are normally bulky, use a lot of energy and require skilled personnel to produce the samples and operate the machines rendering the tests very expensive and impractical for a portable and affordable device for home use.

Spectroscopy is however a very powerful tool to identify substances and analyze samples with very high levels of accuracy and reliability and has found many applications in diverse science fields including, astronomy, material science, biology, medicine and many others. If a solution could be found to miniaturize and integrate multiple machines into a single device this could have game changing implications and enable the construction of true portable, reliable and affordable test devices.

Regardless of the availability of a good and reliable test device, for added safety or according to medical or expert advice the user may periodically conduct more elaborate tests done in the controlled environment of a laboratory by skilled personnel and compare these with the results presented by the device.

Technical Solution

An object and advantage of the invention is the use of a multipurpose simple and compact machine that uses laser spectroscopy as the primary means to detect substances in a sample.

Another object and advantage of the invention is the flexibility to use different laser wavelengths and a variety of optical devices to enable the execution of a variety of spectroscopy analyses using absorption, reflective, excitation, resonance, Raman, among other techniques with and without interferometry.

Another object and advantage of the invention is the availability at home and at a low cost of a device that performs a variety of tests with high level of precision enabled by spectroscopy analyses.

Another object and advantage of the invention is the simplicity of use that allows a regular user but also an elderly or partially disabled person to perform the required tests using a single machine and following a simple procedure without compromising the accuracy nor the reliability of the result.

Another object and advantage of the invention is the possibility to repeat the tests at more frequent intervals than currently possible today due to the cost but also due to the necessity to go to a laboratory or clinic to collect the samples, have staff available to perform the tests and produce the results and await the results, a process that may take up to several days. The present invention allows the user to repeat a test in a matter of minutes if necessary or desired at the comfort of home.

Another object and advantage of the invention is the possibility to send the results digitally via internet to skilled medical personnel for prompt evaluation of the results and the assessment of the necessity of internment in a hospital for emergency or planned treatment.

Another object and advantage of the invention is the possibility of collecting a very high number of tests from multiple people in all conditions and locate them at specific geographic regions allowing the authorities to have a reliable and accurate database to plan for health care adequations to cope with seasonal demands, detect prevalent chronical conditions in the population and have an early warning on the spread of known or new diseases and take action before the situation escalates. The results can be sent removing any personal information to protect the privacy of the user and at the same time provide the authorities with valuable information for planning heath care capacity, identify and follow up trends and also in the case of diseases provide the required notification to protect the population from pandemics, outbreaks of contagious diseases, accidental or intentional release of hazardous pathogens or substances, etc.

Another object and advantage of the invention is the use of the same machine or a specially modified machine for tests in pets, improving the health and comfort of house animals that currently do not have many options for health care outside veterinary clinics.

Advantageous Effects of the Invention

The proposed invention offers a compact, affordable and effective solution for the execution of a variety of tests at home or at a clinic that are not available today due to the complexity and cost of the required equipment. That in turn allows the execution of a variety of tests at more frequent intervals and enables many advances in health care such as better control of chronical conditions, early detection of acute and creeping diseases, detection of the presence of pathogens, contaminants and hazardous substances in food or beverage, and many more.

The tests can be passed to a doctor digitally via the internet allowing the doctor to have valuable information to access the patient's condition in case of an online consultation. This allows patients in remote areas or with mobility problems to have better access to medical services and enables a more comprehensive approach to preventive medicine.

The present invention offers the advantage of simplicity for elderly or partially disabled people to have a single device easy to use that delivers reliable results with a simple procedure at the touch of a button. These results can be automatically sent to a family doctor and remain stored for reference and follow up.

In the event that a new pathogen is discovered such as the virus responsible for the Covid 19 pandemic, tests can be performed at the laboratory to identify the most effective way to detect it, by identifying a specific molecule or group of molecules using one or more than one technique to produce a combined cross-referenced result that increases the reliability of the test.

Such new tests are devised using sophisticated special purpose spectroscopy instruments in a laboratory and the results can be verified using other techniques, different from the spectroscopy techniques to verify the results and access risks of false positives and/or false negatives. Once the results obtained in the laboratory are satisfactory and the best strategy is devised, a new test setup for the machine is produced and can be downloaded from the internet allowing the new test to be conducted by any user at home. The laboratory test results can also be used as baseline and reference for software applications using artificial intelligence to detect anomalies and variations further improving the diagnostic capabilities of the machine.

The present invention is designed to have a flexible set of components and be easily upgraded. New tests can be devised after the machine has been purchased using a new test setup requiring available components or even a new test set up that can be done using a spare set of interchangeable parts that can be purchased and installed by the customer if necessary.

The machine, or a special version of the machine, can also be used for tests in pets improving the health and comfort of house animals that currently do not have many options for health care outside veterinary clinics.

BRIEF DESCRIPTION OF DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 2 is an isometric view of the sample container ready to be inserted into the sampling window of one embodiment of an analyzer device of the present invention;

Detail

Detail FIG. 10A is a detailed view of one embodiment of a reflective diffraction grating in an embodiment of the present invention;

Detail FIG. 11A is a detailed view of one embodiment of the reflective diffraction grating of the present invention showing the direction of reflection and diffraction of light rays away from and through the reflective diffraction grating;

FIG. 12 is an isometric view of an embodiment of an infrared light path in the first embodiment of the analyzer device of the present invention;

FIG. 20 is an isometric overlayed view of the second embodiment of the analyzer device of the present invention showing internal components and an embodiment of a beam stopper;

FIG. 20A is a detailed view of an embodiment of a transmission diffraction grating of the present invention;

FIG. 21 is a top view of the second embodiment of the analyzer device of the present invention showing internal components;

FIG. 23 is an isometric view of an embodiment of an interfered infrared light path in the second embodiment of the analyzer device of the present invention;

FIG. 24 is an isometric view of an embodiment of a visible light path in the second embodiment of the analyzer device of the present invention;

FIG. 25 is an isometric view of an embodiment of an interfered visible light path in the second embodiment of the analyzer device of the present invention;

FIG. 26 is an isometric view of an embodiment of an ultraviolet light path in the second embodiment of the analyzer device of the present invention; and FIG. 27 is an isometric view of an embodiment of an interfered ultraviolet light path in the second embodiment of the analyzer device of the present invention.

DETAILED DESCRIPTION OF EMBODIMENTS

The present invention is composed of multiple components that together constitute a portable machine capable of performing a variety of spectroscopy tests using multiple techniques in a single device. The machine uses different laser wavelengths and a variety of optical devices to enable the execution of spectroscopy analyses using absorption, reflective, excitation, resonance, Raman, among other techniques with and without interferometry.

The machine uses a variety of movable optical devices including laser diodes, lenses, filters, polarizers, slits, partial mirrors, mirrors, light absorbers, diffraction grating and others. The machine can be configured for each different test using the selected technique requiring its own set of optical devices placed in the required order and with the appropriate wavelength of laser. This is achieved by moving the required components to an active position in the light path according to the test set up detailing the appropriate wavelengths and ensuring that other available but not required components are removed from the light path in order not to disturb the test set up.

The machine has many moving parts that operate with a high degree of precision as required by spectroscopy analyses.

While references may be made to upper, lower, vertical and horizontal, left and right, these terms are used merely to describe relationships and not to limit the operation or use of the present invention to any one orientation.

First Embodiment

Figure 1:
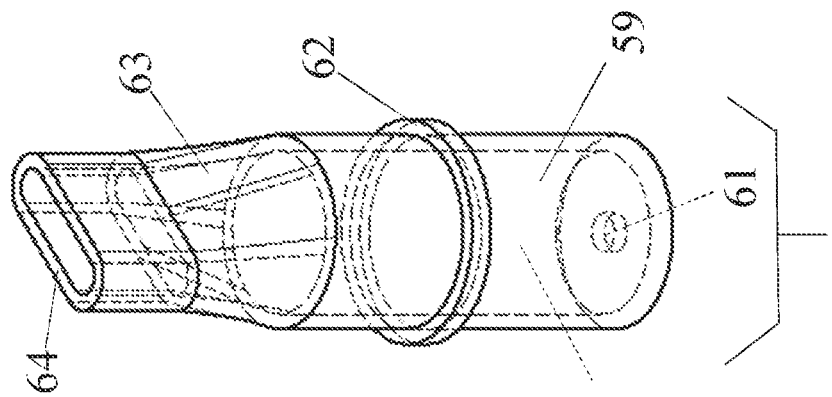
FIG. 1 is an isometric view of one embodiment of a sampling window of the present invention and a finger that may be introduced inside the sampling window to perform tests.

FIG. 1 shows a sampling window 40 that is composed of a hollow cylinder made of a suitable material that is transparent across the light wavelengths used in the present invention from infrared to ultraviolet. The sampling window 40 encloses a sampling cavity 41 that is open at the top and at the bottom and has suitable dimensions to allow the introduction of a finger 42 from a human hand 43 and also allows for the use of other sample containing devices.

Figure 1A:
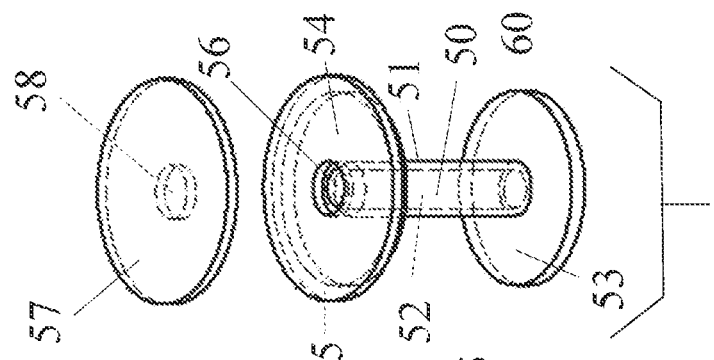
FIG. 1A is an isometric view of one embodiment of a sample container of the present invention.

FIG. 1A shows a container 44 composed of a hollow cylindrical body made of a suitable material that is transparent across the light wavelengths used in the present invention from infrared to ultraviolet. The container 44 has a fitting outer diameter to enable it to be precisely inserted into the sampling cavity 41 of the sampling window 40 with as little friction as possible.

The container 44 has a container sampling cavity 45 that can hold a relative large amount of liquid and/or solid. The container 44 has a container alignment rim 46 around the top that is wider than the diameter of the sampling cavity 41 of the sampling window 40 that keeps the container 44 and the sampling cavity 41 aligned and prevents the container 44 from sliding and falling through the sampling cavity 41.

The container 44 has a container opening 47 at the top to insert and remove the sample. A container lid 48 with a container opening seal 49 with comparable dimensions to the container opening 47 is used to close and seal the container sampling cavity 45 and prevent spills.

Figure 1B:
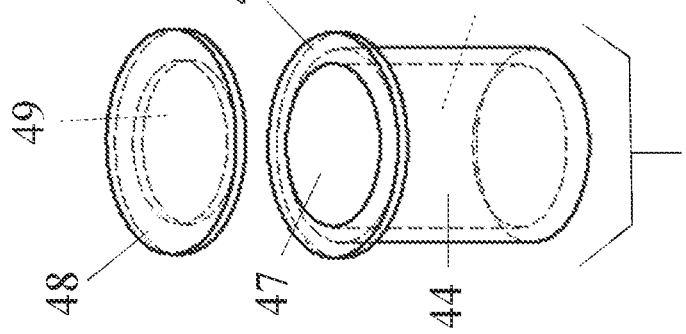
FIG. 1B is an isometric view of one embodiment of a thin container suitable to contain small volume samples.

FIG. 1B shows a thin container 50 composed of a hollow cylindrical body made of a suitable material that is transparent across the light wavelengths used in the present invention from infrared to ultraviolet. The thin container 50 has a reduced volume body 51 with a thin container sampling cavity 52 suitable to contain small samples that are not sufficient to fill the volume of the container sampling cavity 45 of the container 44 ensuring the small sample is adequately placed for the test.

The thin container 50 has a bottom alignment body 53 and a top alignment body 54 with fitting dimensions to ensure that the thin container 50 is precisely inserted and remains centered inside the sampling cavity 41 of the sampling window 40 with as little friction as possible. The thin container 50 also has a thin container alignment rim 55 around the top that is wider than the diameter of the sampling cavity 41 of the sampling window 40 that keeps the thin container 50 and the sampling cavity 41 aligned and prevents the thin container 50 from sliding and falling through the sampling cavity 41.

The thin container 50 has a thin container opening 56 at the top to insert and remove the sample. A thin container lid 57 with a thin container opening seal 58 with passing dimensions is used to close and seal the thin container sampling cavity 52 and prevent spills.

Figure 1C:
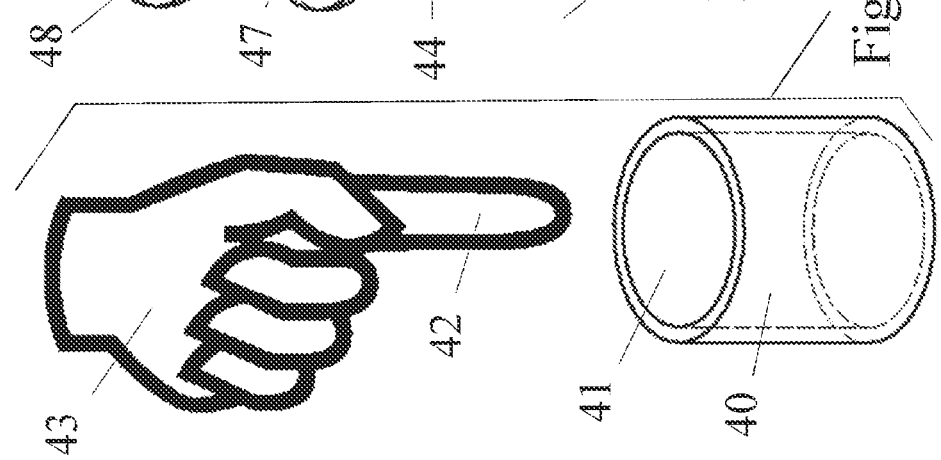
FIG. 1C is an isometric view of one embodiment of a blower device of the present invention.

FIG. 1C shows a blower device 59 composed of a hollow cylindrical body made of a suitable material that is transparent across the light wavelengths used in the present invention from infrared to ultraviolet. The blower device 59 has a fitting outer diameter to enable it to be precisely inserted into the sampling cavity 41 of the sampling window 40 with as little friction as possible.

The blower device 59 has a blower sampling cavity 60 with a blower cavity exit hole 61 at the bottom and a blower alignment rim 62 around the center. The blower alignment rim 62 is wider than the diameter of the sampling cavity 41 of the sampling window 40 and keeps the blower sampling cavity 60 and the sampling cavity 41 aligned and prevents the blower device 59 from sliding and falling through the sampling cavity 41.

The blower device 59 also has a blower neck 63 that provides a smooth transition between the cylindrical shape of the lower part of the blower device 59 and the shape of a blower mouthpiece 64 that facilitates the user to blow through the blower device 59 without leaks and without discomfort.

As the user blows through the blower mouthpiece 64 the exhaled air goes through the blower sampling cavity 60 and exits though the blower cavity exit hole 61 at the bottom. The blower cavity exit hole 61 creates some restriction to the air flow and ensures that the sample is held inside the blower sampling cavity 60 long enough to be analyzed and enables tests to be conducted as the exhale process unfolds and capture eventual variations in the sample.

FIG. 2 shows the first embodiment of an analyzer device 65 of the present invention. The analyzer device 65 has an analyzer body 66 covered by an analyzer lid 67 to contain and protect the components of the analyzer device 65. The dimensions of the analyzer body are sized appropriately to accommodate all components with the components and analyzer body are suitably small as being designed to be handheld by a user. The analyzer lid 67 has an analyzer lid opening cover 68 placed near the middle of the length of the analyzer lid 67 that allows easier access to components inside the analyzer device 65. The sampling window 40 is placed at the center line of the analyzer device 65 near the edge of the analyzer lid opening cover 68 and at the slightly smaller side of the analyzer lid 67 according to the placement of the analyzer lid opening cover 68.

The container 44 and the container lid 48 are seen above the sampling window 40 prior to insertion for testing.

Figure 3:
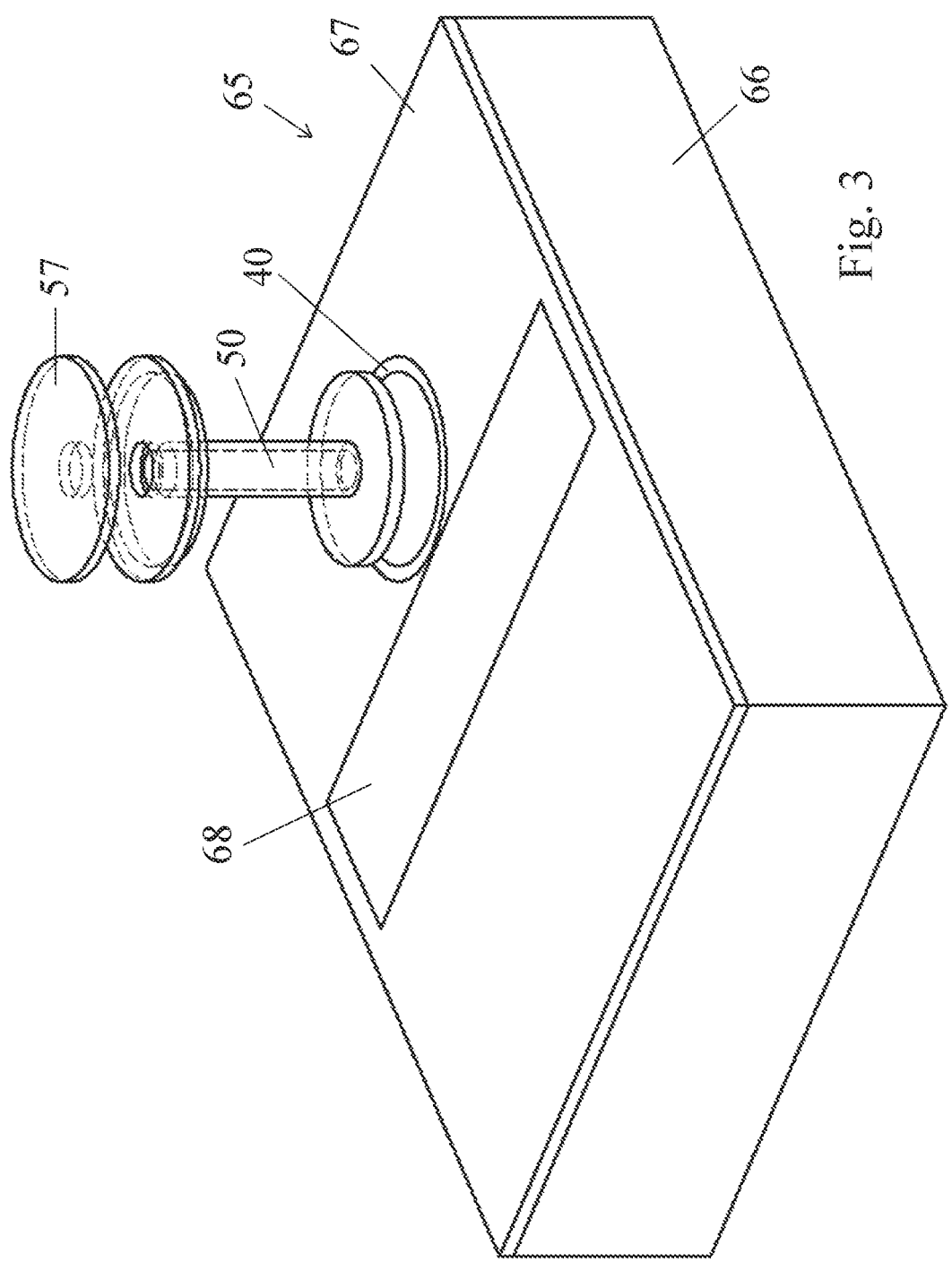
FIG. 3 is an isometric view of the thin container suitable to contain small volume samples ready to be inserted into the sampling window of one embodiment of an analyzer device of the present invention.

FIG. 3 shows the analyzer device 65, the analyzer body 66 and the analyzer lid 67 with the analyzer lid opening cover 68. The thin container 50 and the thin container lid 57 are seen above the sampling window 40 prior to insertion for testing.

Figure 4:
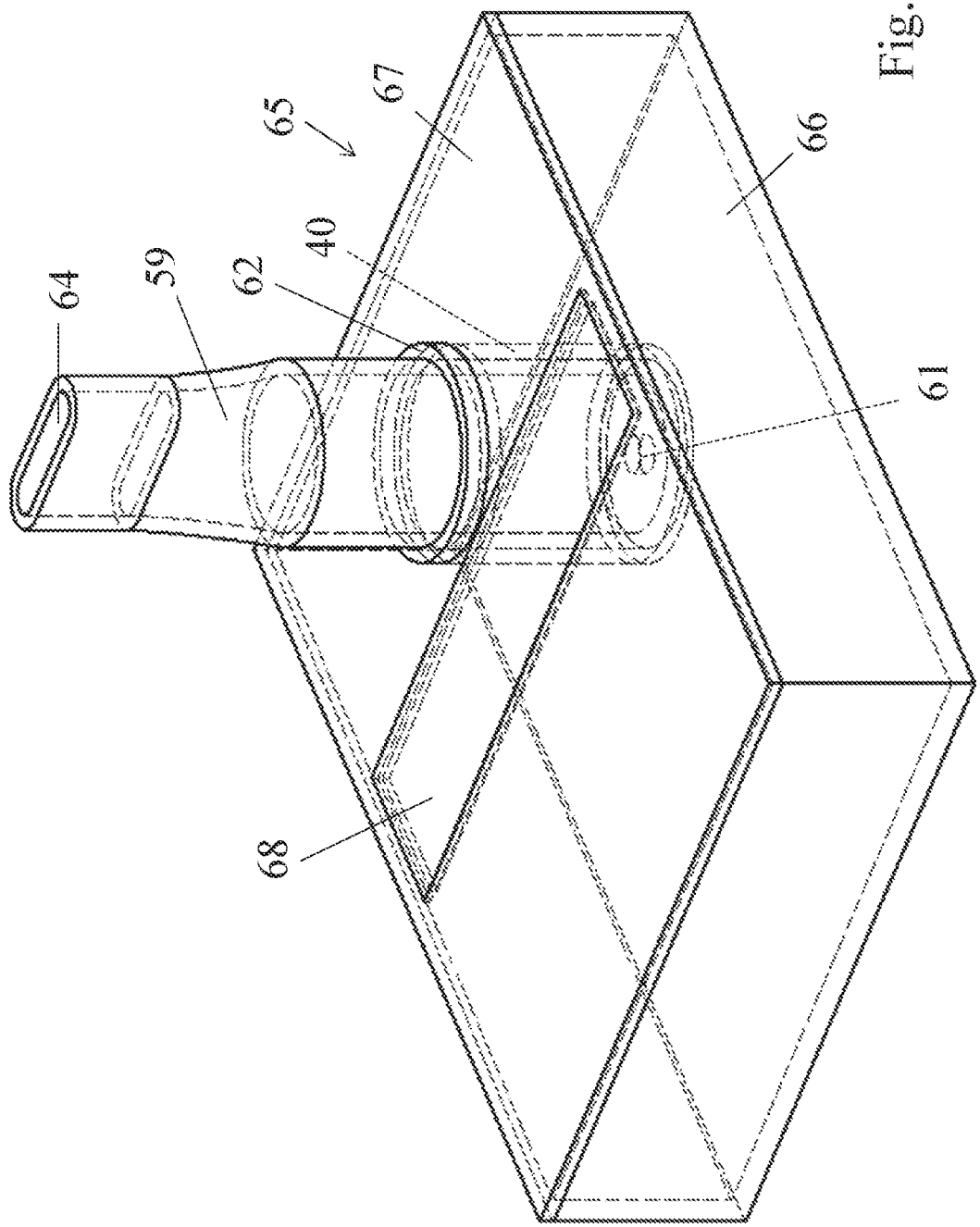
FIG. 4 is an isometric view of an embodiment of a blower device inserted into the sampling window of one embodiment of an analyzer device of the present invention.

FIG. 4 shows the analyzer device 65, the analyzer body 66 and the analyzer lid 67 with the analyzer lid opening cover 68. The blower alignment rim 62 is in contact with the sampling window 40 indicating that the blower device 59 is fully inserted and the analyzer device 65 is ready for testing. The user blows through the blower mouthpiece 64 at the top, the air passes through the blower device 59 and exits through the blower cavity exit hole 61 at the bottom.

Figure 5:
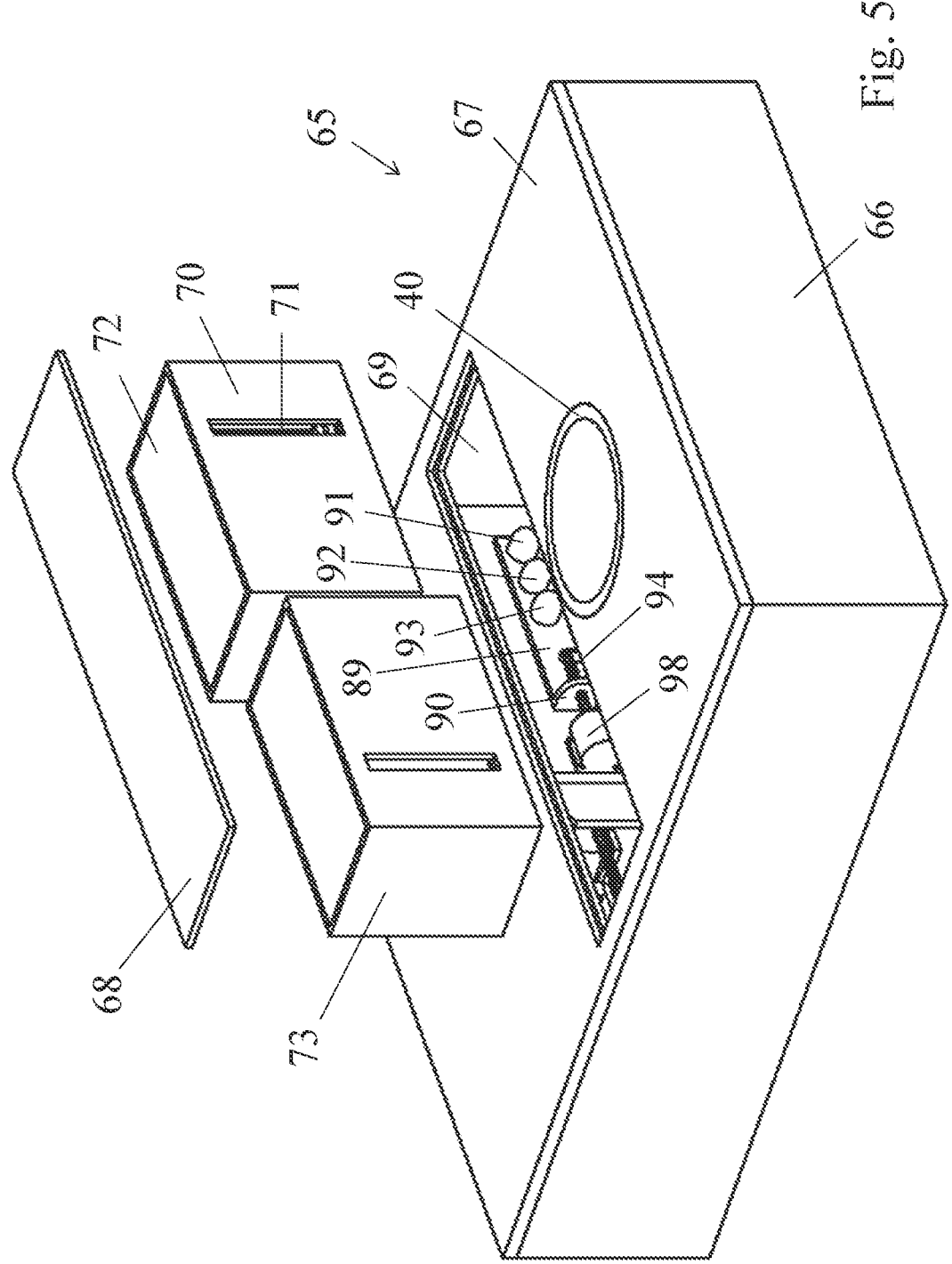
FIG. 5 is an isometric view of the installation of embodiments of optical cartridges into the analyzer device in an embodiment of the present invention.

FIG. 5 shows a partially exploded view of the analyzer device 65 showing the sampling window 40 at the front right. The analyzer lid 67 is installed on top of the analyzer body 66 and the analyzer lid opening cover 68 is removed to show an analyzer lid opening 69 that allows the installation of an optical cartridge A 70 and an optical cartridge B 73. The optical cartridge A 70 has a pair of optical cartridge slits 71, one in the front and one in the back (see FIG. 6 and FIG. 7) and is closed by an optical cartridge lid 72 on the top.

Apart from differences in some equipped components inside, the optical cartridge A 70 and the optical cartridge B 73 are identical externally, one being rotated 180 degrees in relation to the other. The optical cartridge A 70 and the optical cartridge B 73 are accessible through the analyzer lid opening 69 when opening the analyzer lid opening cover 68 to allow easy replacement of the optical cartridge A 70 and/or the optical cartridge B 73 for maintenance but also to allow for more flexibility in the operation of the analyzer device 65.

A variety of optical cartridge As 70 and optical cartridge Bs 73 can be made available and be interchanged to allow the analyzer device 65 to be configured for the execution of a set of routine tests, more specific tests, and not so common tests based on the application and needs of the patient or condition of the environment. The possibility of replacing the optical cartridge A 70 and/or the optical cartridge B 73 also allows the analyzer device 65 to be upgraded to execute new tests not yet conceived to detect new substances for example present in a new virus not yet known.

The possibility of replacing the optical cartridge A 70 and/or the optical cartridge B 73 also allows the reduction of the size, weight and cost of the analyzer device 65 limiting the number of optical components inside the optical cartridge A 70 and optical cartridge B 73 to a basic set of the most useful optical components. This does not limit the capabilities and the flexibility of the analyzer device 65 as specific sets of optical cartridge A 70 and optical cartridge B 73 can be made for any specific test needed and special versions of the analyzer device 65 can be constructed with larger versions of the optical cartridge A 70 and optical cartridge B 73 containing a full set of optical devices inside to satisfy the requirements of more demanding users at home or medical personnel in clinics.

FIG. 5 also shows some internal components of the analyzer device 65 that can be seen through the analyzer lid opening 69 when the analyzer lid opening cover 68 is removed. A laser tray 89 with a laser tray rim 90 provides support and positioning for a set of laser diodes: an infrared laser emitter 91, a visible laser emitter 92, and an ultraviolet laser emitter 93.

The position of the laser tray 89 is controlled by a laser tray positioning screw 94 driven by a micro motor 98. As the micro motor 98 turns the laser tray positioning screw 94 clockwise or counterclockwise, the laser tray positioning screw 94 pulls or pushes the laser tray rim 90 attached to the laser tray 89 to the precision position to provide the appropriate wavelength.

Figures 6, 6A:
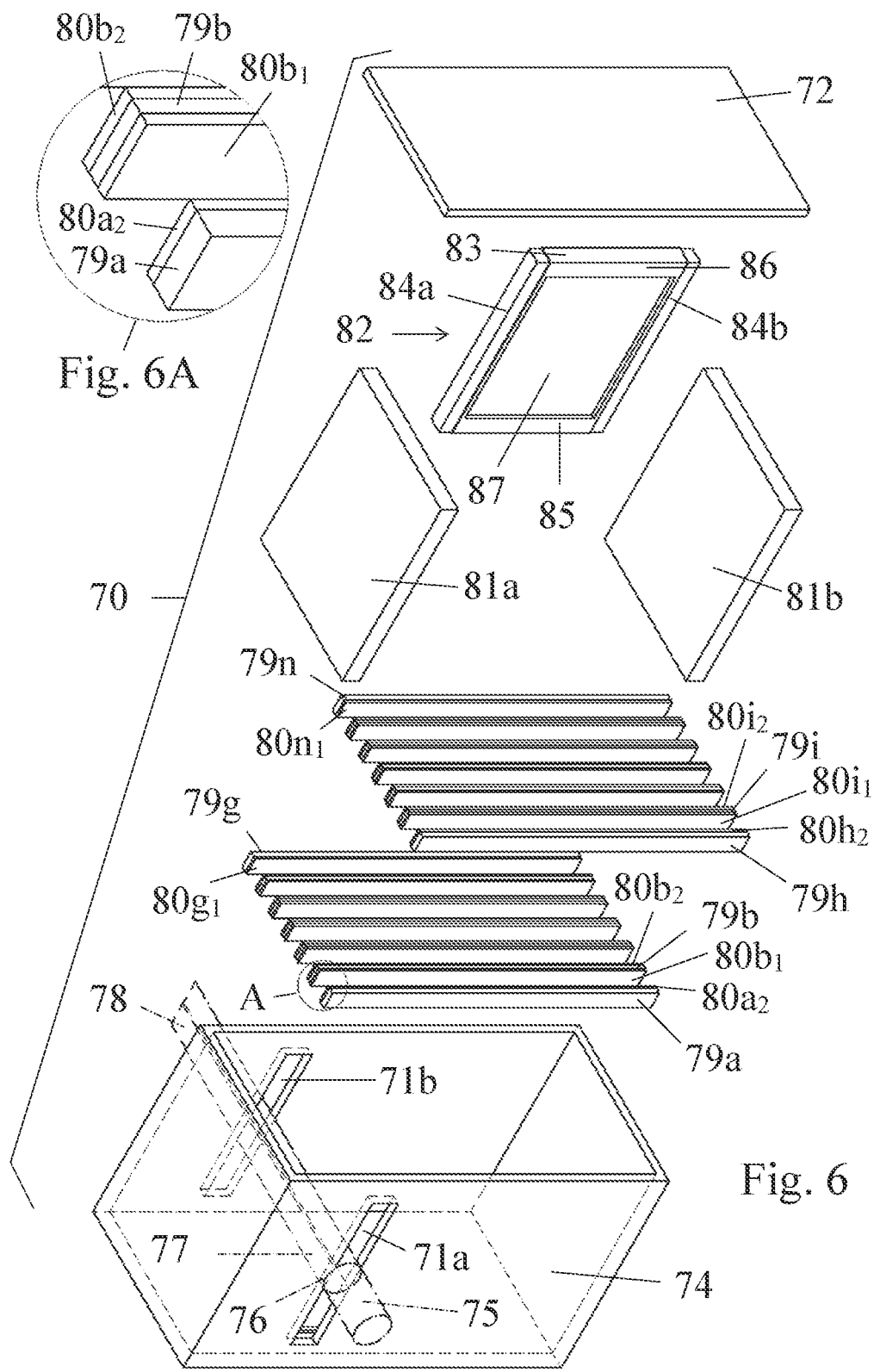
FIG. 6 is an isometric exploded view of an embodiment of the optical cartridge in an embodiment of the present invention.
FIG. 6A is a detailed view of an embodiment of an optical cartridge guide rail showing the optical cartridge guide rail contacts in an embodiment of the present invention.

FIG. 6 shows an isometric exploded view of the optical cartridge A 70 to allow a better view of its internal components.

The optical cartridge A 70 is composed of an optical cartridge case 74 that has one optical cartridge slit 71a in the front and one optical cartridge slit 71b in the back. The optical cartridge slit 71a and the optical cartridge slit 71b are placed in perfect alignment, at the same distance to the optical cartridge case 74 edges.

An incident laser beam 75 aimed at the optical cartridge slit 71a is able to pass through the optical cartridge A 70. A laser beam chopped portion 76 that misses optical cartridge slit 71a hits the optical cartridge A 70 and is absorbed allowing only a collimated laser beam 77 to pass. The collimated laser beam 77 continues through the optical cartridge A 70 and is able to pass through the optical cartridge slit 71a provided that it is in perfect alignment with both the optical cartridge slit 71a in the front and one optical cartridge slit 71b in the back. Any divergence in the incident laser beam 75 is absorbed inside the optical cartridge A 70 producing a recollimated laser beam 78 exiting the optical cartridge A 70.

A set of optical cartridge guide rails 79a, 79b, ... 79g is placed at the bottom of the optical cartridge case 74 and another set of optical cartridge guide rails 79h, 79i, ... 79n is placed at the top of the optical cartridge case 74.

The optical cartridge guide rails 79b, 79c, ..., 79f at the center of the set of optical cartridge guide rails 79a, 79b, ... 79g at the bottom are fitted with a pair of optical cartridge guide rail contacts $80b_1$ and $80b_2$, $80c_1$ and $80c_2$, ..., $80f_1$ and $80f_2$ respectively.

The optical cartridge guide rails 79a and 79g at the extremities of the set of optical cartridge guide rails 79a, 79b, ... 79g at the bottom are fitted with one optical cartridge guide rail contact $80a_2$ and $80g_1$ respectively at the side of the respective optical cartridge guide rails 79a and 79g oriented towards the center of the set.

The optical cartridge guide rail contacts $80b_1$, $80c_1$, ..., $80g_1$ are at the front of the corresponding optical cartridge guide rails 79b, 79c, ..., 79g, and the optical cartridge guide rail contacts $80a_2$, $80b_2$, ..., $80f_2$ are at the back of the corresponding optical cartridge guide rails 79a, 79b, ..., 79f.

The optical cartridge guide rails 79h, 79i, ... 79n at the top are also fitted with one or two optical cartridge guide rail contacts $80h_2$, $80i_1$ and $80i_2$, ..., $80n_1$ respectively in the same arrangement as the optical cartridge guide rails 79a, 79b, ..., 79g at the bottom.

A pair of permanent magnets 81a and 81b with the same orientation for the magnetic field with either both North Poles facing the left and the South Poles facing the right or both South Poles facing the left and the North Poles facing the right is placed at the optical cartridge case 74 one permanent magnet 81a in contact with the inner left face of the optical cartridge case 74 and one permanent magnet 81b in contact with the inner right face of the optical cartridge case 74.

The orientation of the permanent magnets 81a and 81b installed in the optical cartridge A 70 must be the opposite of the orientation of the permanent magnets 81a and 81b installed in the optical cartridge B 73. In this way, when the optical cartridge A 70 and the optical cartridge B 73 are installed in the analyzer device 65 with the optical cartridge A 70 and the optical cartridge B 73 oriented in opposite directions, the orientation of the magnetic field is the same and the magnetic field is not weakened between the optical cartridge A 70 and the optical cartridge B 73 (see FIG. 5).

Figure 7:
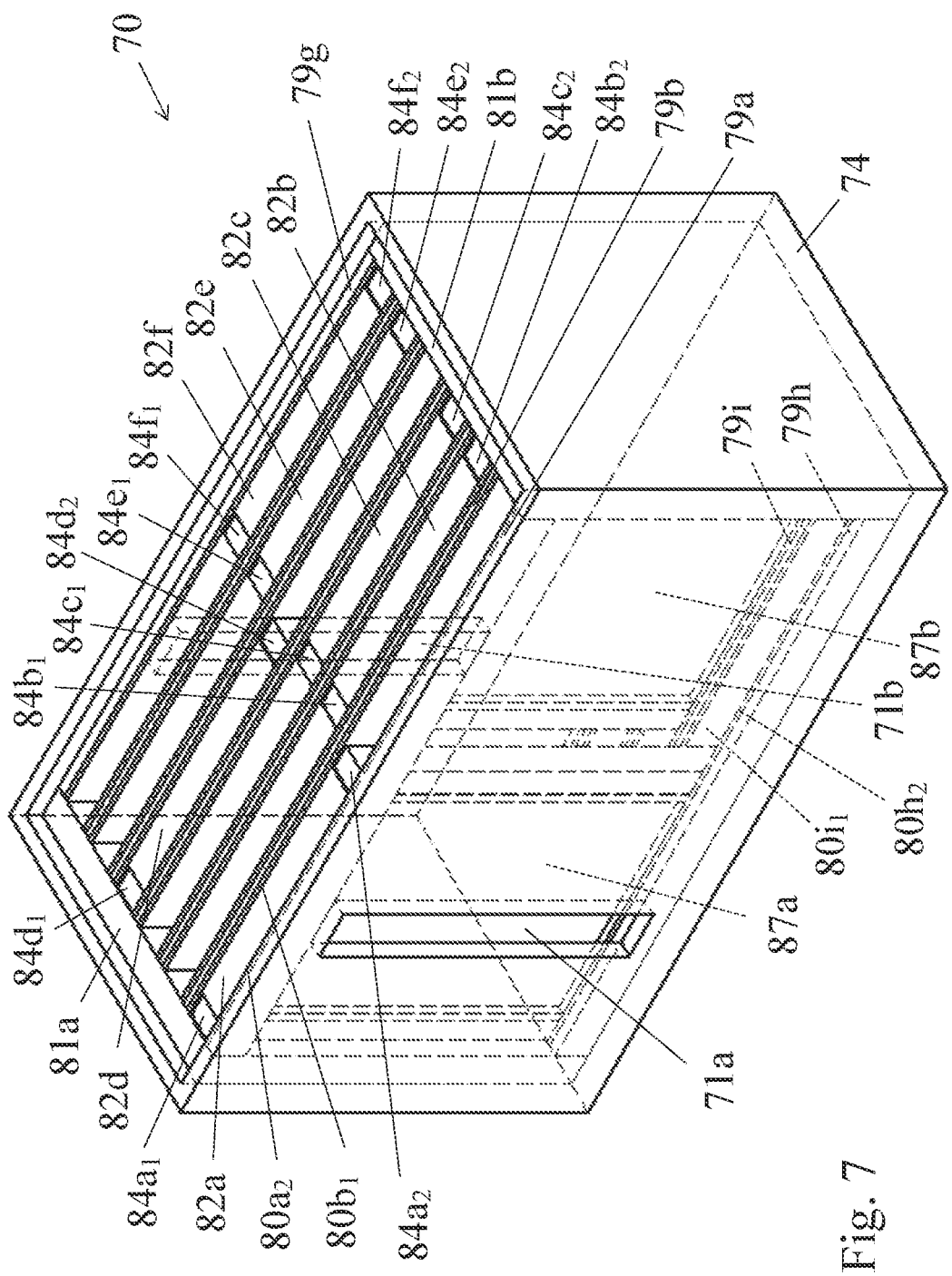
FIG. 7 is an isometric view of an embodiment of the optical cartridge in an embodiment of the present invention.

The optical cartridge guide rails 79a, 79b, ... 79g and the optical cartridge guide rails 79h, 79i, ... 79n span the distance between the permanent magnets 81a and 81b (see FIG. 7).

Between each two consecutive optical cartridge guide rails 79a and 79b, 79b and 79c, ..., 79f and 79g bellow and the optical cartridge guide rails 79h and 79i, 79i and 79j, ..., 79m and 79n at the top an optical device 82 is installed. In the first embodiment of the optical cartridge A 70 as shown in FIG. 6 a total of six optical devices 82 are installed (see FIG. 7).

The optical device 82 is composed of an optical device frame 83 that has a pair of electromagnets 84a and 84b at the sides, one electromagnet 84a at the left and one electromagnet 84b at the right. The electromagnet 84a at the left is attached to a pair of optical device bottom contacts 85 at the front and at the back of the bottom portion of the optical device frame 83 and is powered by electric current flowing from the pair of optical device bottom contacts 85. The electromagnet 84a can be switched off or switched on producing a magnetic field oriented to the left or to the right depending on the status and polarity of the electric potential available at the pair of optical device bottom contacts 85.

Similarly, the electromagnet 84b at the right is attached to a pair of optical device top contacts 86 at the front and at the back of the top portion of the optical device frame 83 and the electromagnet 84b can be switched off or switched on producing a magnetic field oriented to the left or to the right depending on the status and polarity of the electric potential available at the pair of optical device top contacts 86.

As the electromagnet 84a and the electromagnet 84b are switched on or off with a certain polarity, the magnetic fields they produce interact with the magnetic fields of the permanent magnets 81a and 81b allowing the optical device 82 to move to the left or to the right. The electromagnet 84a and the electromagnet 84b can be individually controlled with more or less current to produce a stronger magnetic field necessary to move the optical device 82 from one side to the other or a weaker magnetic field sufficient to keep the optical device 82 in contact with the permanent magnet 81a or 81b The optical device frame 83 of each optical device 82 holds a variety of optical device active parts 87 designed to performs specific tasks individually or working together with other optical device active parts 87. The optical device active part 87 can be a lens, a filter, a polarizer, and many other optical devices.

The optical cartridge lid 72 closes the optical cartridge case 74 at the top keeping the other components of the optical cartridge A 70 safe and properly placed inside the optical cartridge case 74.

Detail FIG. 6A shows an isometric view of the optical cartridge guide rails 79a and 79b with their respective optical cartridge guide rail contacts $80a_2$, $80b_1$ and $80b_2$ respectively in greater magnification to present additional detail.

The optical cartridge guide rail 79a is fitted with the optical cartridge guide rail contact $80a_2$, and the optical cartridge guide rail 79b is fitted with the optical cartridge guide rail contacts $80b_1$ and $80b_2$.

FIG. 7 shows an isometric view of the optical cartridge A 70 with all components in place. The optical cartridge lid 72 is not drawn to facilitate the view of the other components.

The permanent magnet 81a is installed in contact with the inner left face of the optical cartridge case 74 and the permanent magnet 81b is installed in contact with the inner right face of the optical cartridge case 74.

Six optical devices 82a, 82b, 82c, 82d, 82e, and 82f are installed and their corresponding electromagnets $84a_1$ and $84a_2$, $84b_1$ and $84b_2$, $84c_1$ and $84c_2$, $84d_1$ and $84d_2$, $84e_1$ and $84e_2$, and $84f_1$ and $84f_2$, are indicated to better ascertain the position of each individual optical device.

The optical cartridge guide rails 79a, 79b, . . . 79g on top as well as the optical cartridge guide rails 79h, 79i on the bottom are visible.

The optical device 82a is in contact with the adjacent optical cartridge guide rail contacts $80h_2$ and $80i_1$ at the bottom that power the electromagnet $84a_1$ and with the adjacent optical cartridge guide rail contacts $80a_2$ and $80b_1$ at the top that power the electromagnet $84a_2$. The other optical devices 82b, 82c, 82d, 82e, and 82f are also in contact with their respective adjacent optical cartridge guide rail contacts at the bottom and at the top to power their respective electromagnets.

The optical cartridge slit 71a in the front and the optical cartridge slit 71b in the back are located in perfect alignment, at the center of the position occupied by the optical devices 82a, 82d at the left side of the optical cartridge case 74. The optical device active part 87a at the left side of the optical cartridge case 74 is on the light path and produces an effect on a light beam passing through and collimated by the optical cartridge slit 71a and the optical cartridge slit 71b whereas the optical device active part 87b at the right side of the optical cartridge case 74 stays out of the light path and does not produce any effect.

In FIG. 7, the optical devices 82a, 82d that are at the left side of the optical cartridge case 74 are active and produce effects on a light beam passing through the optical cartridge A 70 while the remaining optical devices 82b, 82c, 82e, and 82f that are at the right side of the optical cartridge case 74 are inactive and do not produce any effect on a light beam passing through the optical cartridge A 70.

Figure 8:
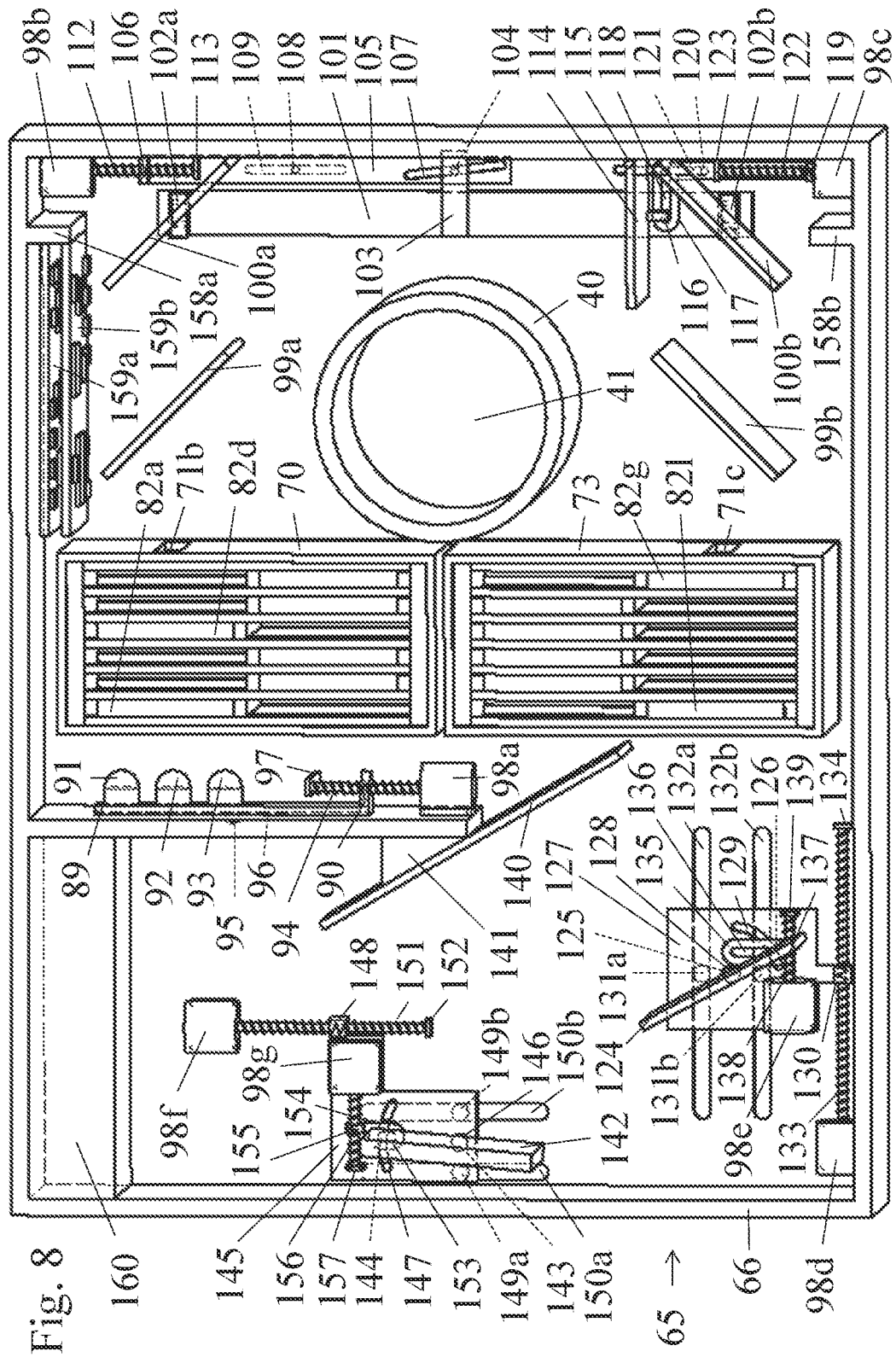
FIG. 8 is an isometric top view of a first embodiment of the analyzer device of the present invention showing internal components.

FIG. 8 shows an isometric top view of the first embodiment of the analyzer device 65 of the present invention with the analyzer lid 67 removed to show the internal components inside the analyzer body 66.

The sampling cavity 41 inside the sampling window 40 is at the centerline of the analyzer device 65. The optical cartridge A 70 and the optical cartridge B 73 are shown without their respective optical cartridge lids 72 to allow the view of their respective optical devices 82. In the position shown in FIG. 8 the optical devices 82a and 82d in the optical cartridge A 70 and the optical devices 82g and 82l in the optical cartridge B 73 are active.

The laser tray 89 with the laser tray rim 90 provides support and positioning for the set of laser diodes: the infrared laser emitter 91, the visible laser emitter 92, and the ultraviolet laser emitter 93.

The laser tray 89 has a laser tray guide pin 95 at the other side of the face containing the set of laser diodes that fits and slides inside a laser tray guide rail 96 in the analyzer body 66. The position of the laser tray 89 is controlled by the laser tray positioning screw 94 driven by the micro motor 98a. A laser tray positioning screw support 97 attached to the analyzer body 66 provides additional support to prevent wobbling of the laser tray positioning screw 94 as it turns.

As the micro motor 98a turns the laser tray positioning screw 94 clockwise or counterclockwise, the laser tray positioning screw 94 pulls or pushes the laser tray rim 90 attached to the laser tray 89 to the appropriate position for the desired wavelength. The laser tray guide pin 95 stays restrained inside the laser tray guide rail 96 ensuring that the laser tray 89 stays leveled and that the movement of the laser tray 89 stays restrained to the intended linear direction.

In the position shown in FIG. 8 the laser tray 89 is positioned in such a way that the visible laser emitter 92 is located in front of the optical cartridge slits 71a and 71b of the optical cartridge A 70 or stated in a more concise way, the visible laser emitter 92 is selected. As the optical cartridge slits 71a and 71b are in the same line, to avoid clutter only the optical cartridge slit 71b is indicated (see FIG. 10). When the visible laser emitter 92 is turned on, the emitted visible laser light passes through the optical cartridge slit 71a in front of the visible laser emitter 92, gets modified by the active optical devices 82a and 82d inside the optical cartridge A 70 and passes through the optical cartridge slit 71b. The visible laser light is also collimated as it passes through both optical cartridge slits 71a and 71b and continues inside the analyzer device 65 following a controlled path.

A pair of partial mirrors 99a and 99b is placed facing the sampling window 40 at a 90 degree angle with respect to each other and with the center of the partial mirror 99a positioned at a 45 degree angle to the path of the laser light exiting the optical cartridge slit 71b in the optical cartridge A 70.

The laser light exiting the optical cartridge slit 71b in the optical cartridge A 70 hits the center of the partial mirror 99a causing the reflected part to pass through the center of the sampling cavity 41. The laser light as modified by the optical devices 82a and 82d interacts with the substances present in a sample located inside the sampling cavity 41 further altering the characteristics of the laser light producing a sample spectrum of laser light that continues to the center of the partial mirror 99b. The partial mirror 99b then reflects the sample spectrum of laser light to the center of the optical cartridge slit 71c in the optical cartridge B 73.

The sample spectrum of laser light enters the optical cartridge slit 71c and is modified again by the active optical devices 82g and 82l inside the optical cartridge B 73 in this example and exits through the optical cartridge slit 71d being collimated a second time in the process of passing through the optical cartridge slits 71c and 71d. As the optical cartridge slits 71c and 71d are in the same line, to avoid clutter only the optical cartridge slit 71c is indicated (see FIG. 10).

A pair of interference mirrors 100a and 100b is mounted on an interference mirror positioning device 101 in a pair of mirror supports 102a and 102b in such a way that the interference mirrors 100a and 100b are at a 90 degree angle with respect to each other, the interference mirror 100a is parallel to the partial mirror 99a and the interference mirror 100b is parallel to the partial mirror 99b. An interference mirror positioning device arm 103 is a small bar attached at the center of the top face of the interference mirror positioning device 101 that extends some length to the right and has an interference mirror positioning device pin 104 at the edge that extends towards the bottom and reaches the level of the bottom face of the interference mirror positioning device 101.

FIG. 8 also shows an interference mirror positioning device control bar 105 parallel to the interference mirror positioning device 101 that has an interference mirror positioning device control bar rim 106 at one end and an interference mirror positioning device control bar slot 107 at the other end.

The interference mirror positioning device control bar 105 has an interference mirror positioning device guide pin 108 at the bottom face that fits and slides inside an interference mirror positioning device guide rail 109 in the analyzer body 66. The position of the interference mirror positioning device control bar 105 is controlled by an interference mirror positioning device control bar positioning screw 112 driven by the micro motor 98b. An interference mirror positioning device control bar positioning screw support 113 attached to the analyzer body 66 provides additional support to prevent wobbling of the interference mirror positioning device control bar positioning screw 112 as it turns.

As the micro motor 98b turns the interference mirror positioning device control bar positioning screw 112 clockwise or counterclockwise, the interference mirror positioning device control bar positioning screw 112 pulls or pushes the interference mirror positioning device control bar rim 106 attached to the interference mirror positioning device control bar 105 to the desired position. The interference mirror positioning device guide pin 108 stays restrained inside the interference mirror positioning device guide rail 109 ensuring that the interference mirror positioning device control bar 105 stays leveled and that the movement of the interference mirror positioning device control bar 105 stays restrained to the intended linear direction.

The interference mirror positioning device pin 104 fits and slides inside the interference mirror positioning device control bar slot 107. As the interference mirror positioning device control bar 105 moves up or down, the interference mirror positioning device control bar slot 107 forces the interference mirror positioning device pin 104 right or left respectively.

As the interference mirror positioning device control bar slot 107 is constructed at a small angle to the center line of the interference mirror positioning device control bar 105, a large vertical movement of the interference mirror positioning device control bar 105 is translated into a small horizontal movement of the interference mirror positioning device pin 104 in the interference mirror positioning device 101 allowing an increased level of precision in the positioning of the interference mirrors 100a and 100b with respect to the partial mirrors 99a and 99b that are fixed.

A beam stopper 114 is a moving barrier that pivots 90 degrees around a beam stopper shaft 115 located at the right edge of the beam stopper 114. The beam stopper 114 is fitted with a beam stopper handle 116 that allows the position of the beam stopper 114 to be controlled.

A beam stopper actuator 117 has a beam stopper actuator slot 118 at a 90 degree angle in one end and a beam stopper actuator rim 119 at the other end.

The beam stopper actuator 117 has a beam stopper actuator guide pin 120 at the bottom face that fits and slides inside a beam stopper actuator guide rail 121 in the analyzer body 66. The position of the beam stopper actuator 117 is controlled by a beam stopper actuator positioning screw 122 driven by the micro motor 98c. A beam stopper actuator positioning screw support 123 attached to the analyzer body 66 provides additional support to prevent wobbling of the beam stopper actuator positioning screw 122 as it turns.

As the micro motor 98c turns the beam stopper actuator positioning screw 122 clockwise or counterclockwise, the beam stopper actuator positioning screw 122 pulls or pushes the beam stopper actuator rim 119 attached to the beam stopper actuator 117 to the desired position. The beam stopper actuator guide pin 120 stays restrained inside the beam stopper actuator guide rail 121 ensuring that the beam stopper actuator 117 stays leveled and that the movement of the beam stopper actuator 117 stays restrained to the intended linear direction.

The beam stopper handle 116 fits inside the beam stopper actuator slot 118. As the beam stopper actuator 117 moves up or down, the beam stopper actuator slot 118 forces the beam stopper handle 116 to describe an arch around the beam stopper shaft 115 pivoting the beam stopper 114 in the clockwise or counterclockwise directions respectively.

The laser light exiting the optical cartridge slit 71b in the optical cartridge A 70 hits the center of the partial mirror 99a and the transmitted part continues until it hits the center of the interference mirror 100a and is reflected 90 degrees towards the center of the interference mirror 100b but in the position shown in FIG. 8 the transmitted part of the laser light hits the beam stopper 114 and does not reach the interference mirror 100b.

FIG. 8 also shows a selection mirror 124 that has a selection mirror pivoting shaft 125 at the center and a selection mirror angle control handle 126 at a distance to the selection mirror pivoting shaft 125.

The selection mirror 124 is mounted on a selection mirror rail 127 by means of inserting the selection mirror pivoting shaft 125 into a selection mirror rail central pivot 128 and the selection mirror angle control handle 126 into a selection mirror rail guide slot 129 in the selection mirror rail 127.

As the selection mirror 124 pivots around the selection mirror rail central pivot 128, the range of movement of the selection mirror angle control handle 126 is limited by the selection mirror rail guide slot 129 restricting the range of pivoting movement of the selection mirror 124.

The selection mirror rail 127 also has a selection mirror rail nut 130 and a pair of selection mirror rail alignment pins 131a and 131b underneath that fit and slide inside a corresponding pair of selection mirror rail alignment guides 132a and 132b respectively on the analyzer body 66.

The position of the selection mirror rail 127 is controlled by a selection mirror rail positioning screw 133 driven by the micro motor 98d. As the micro motor 98d turns the selection mirror rail positioning screw 133 clockwise or counterclockwise, the selection mirror rail positioning screw 133 pulls or pushes the selection mirror rail nut 130 attached to the selection mirror rail 127 to the desired position. The selection mirror rail alignment pins 131a and 131b stay restrained inside the respective selection mirror rail alignment guides 132a and 132b on the analyzer body 66 ensuring that the selection mirror rail 127 stays leveled and that the movement of the selection mirror rail 127 stays restrained to the intended linear direction.

A selection mirror rail positioning screw support 134 attached to the analyzer body 66 provides additional support to prevent wobbling of the selection mirror rail positioning screw 133 as it turns.

The angle of the selection mirror 124 is controlled by the position of a selection mirror angle control actuator 135 that has a selection mirror angle control actuator slot 136 and a selection mirror angle control actuator nut 137. The position of the selection mirror angle control actuator 135 is controlled by a selection mirror angle control actuator positioning screw 138 driven by the micro motor 98e. The selection mirror angle control handle 126 fits and is held inside the selection mirror rail guide slot 129 on the selection mirror rail 127 and the selection mirror angle control actuator slot 136 on the selection mirror angle control actuator 135.

As the micro motor 98e turns the selection mirror angle control actuator positioning screw 138 clockwise or counterclockwise, the selection mirror angle control actuator positioning screw 138 pulls or pushes the selection mirror angle control actuator nut 137 attached to the selection mirror angle control actuator 135 to the desired position. As the selection mirror angle control actuator 135 moves, the selection mirror angle control actuator slot 136 forces the selection mirror angle control handle 126 to slide and assume the position defined by the intersection of the selection mirror rail guide slot 129 and the selection mirror angle control actuator slot 136 pivoting the selection mirror 124 the desired amount.

A selection mirror angle control actuator positioning screw support 139 attached to the selection mirror rail 127 provides additional support to prevent wobbling of the selection mirror angle control actuator positioning screw 138 as it turns.

The laser light that exits through the optical cartridge slit 71d of the optical cartridge B 73 continues until it reaches the center of the selection mirror 124 that is held at a precise position and at a precise angle to reflect the incoming sample spectrum of laser light towards the desired region of a reflective diffraction grating 140. The reflective diffraction grating 140 is fixed, mounted at a reflective diffraction grating support 141 in the analyzer body 66.

The position of the center of the selection mirror 124 is defined by the position of the selection mirror rail 127 that is controlled by the selection mirror rail positioning screw 133 driven by the micro motor 98d.

The angle of the selection mirror 124 is defined by the position of the selection mirror angle control handle 126 that fits and is held inside the selection mirror rail guide slot 129 on the selection mirror rail 127 and the selection mirror angle control actuator slot 136 on the selection mirror angle control actuator 135. The position of the selection mirror angle control actuator 135 is controlled by the selection mirror angle control actuator positioning screw 138 driven by the micro motor 98e.

FIG. 8 also shows a moving detector 142 that has a moving detector pivoting shaft 143 at the center and a moving detector angle control handle 144 at a distance to the moving detector pivoting shaft 143.

The moving detector 142 is mounted on a moving detector rail 145 by means of inserting the moving detector pivoting shaft 143 into a moving detector rail central pivot 146 and the moving detector angle control handle 144 into a moving detector rail guide slot 147 in the moving detector rail 145.

As the moving detector 142 pivots around the moving detector rail central pivot 146, the range of movement of the moving detector angle control handle 144 is limited by the moving detector rail guide slot 147 restricting the range of pivoting movement of the moving detector 142.

The moving detector rail 145 also has a moving detector rail nut 148 and a pair of moving detector rail alignment pins 149a and 149b underneath that fit and slide inside a corresponding pair of moving detector rail alignment guides 150a and 150b respectively on the analyzer body 66.

The position of the moving detector rail 145 is controlled by a moving detector rail positioning screw 151 driven by the micro motor 98f. As the micro motor 98f turns the moving detector rail positioning screw 151 clockwise or counterclockwise, the moving detector rail positioning screw 151 pulls or pushes the moving detector rail nut 148 attached to the moving detector rail 145 to the desired position. The moving detector rail alignment pins 149a and 149b stay restrained inside the respective moving detector rail alignment guides 150a and 150b on the analyzer body 66 ensuring that the moving detector rail 145 stays leveled and that the movement of the moving detector rail 145 stays restrained to the intended linear direction.

A moving detector rail positioning screw support 152 attached to the analyzer body 66 provides additional support to prevent wobbling of the moving detector rail positioning screw 151 as it turns.

The angle of the moving detector 142 is controlled by the position of a moving detector rail angle control actuator 153 that has a moving detector rail angle control actuator slot 154 and a moving detector rail angle control actuator nut 155. The position of the moving detector rail angle control actuator 153 is controlled by a moving detector rail angle control actuator positioning screw 156 driven by the micro motor 98g. The moving detector angle control handle 144 fits and is held inside the moving detector rail guide slot 147 on the moving detector rail 145 and the moving detector rail angle control actuator slot 154 on the moving detector rail angle control actuator 153.

As the micro motor 98g turns the moving detector rail angle control actuator positioning screw 156 clockwise or counterclockwise, the moving detector rail angle control actuator positioning screw 156 pulls or pushes the moving detector rail angle control actuator nut 155 attached to the moving detector rail angle control actuator 153 to the desired position. As the moving detector rail angle control actuator 153 moves, the moving detector rail angle control actuator slot 154 forces the moving detector angle control handle 144 to slide and assume the position defined by the intersection of the moving detector rail guide slot 147 and the moving detector rail angle control actuator slot 154 pivoting the moving detector 142 the desired amount.

A moving detector rail angle control actuator positioning screw support 157 attached to the moving detector rail 145 provides additional support to prevent wobbling of the moving detector rail angle control actuator positioning screw 156 as it turns.

The sample spectrum of laser light that is diffracted by the reflective diffraction grating 140 continues until it reaches the center of the moving detector 142 that is held at the optimum precise position and at the optimum precise angle to receive and process the incoming diffracted laser light.

The position of the center of the moving detector 142 is defined by the position of the moving detector rail 145 that is controlled by the moving detector rail positioning screw 151 driven by the micro motor 98f.

The angle of the moving detector 142 is defined by the position of the moving detector angle control handle 144 that fits and is held inside the moving detector rail guide slot 147 on the moving detector rail 145 and the moving detector rail angle control actuator slot 154 on the moving detector rail angle control actuator 153. The position of the moving detector rail angle control actuator 153 is controlled by the moving detector rail angle control actuator positioning screw 156 driven by the micro motor 98g.

FIG. 8 also shows a pair of case fixation supports 158a and 158b located at the rims of the analyzer body 66 away from the light path that are available to hold additional components. The case fixation support 158a provides fixation support to a set of electronic boards 159a and 159b that contain all the electronics necessary to operate the analyzer device 65 performing all tasks including but not limited to the control of all components, connection to the internet and other devices, storage of information downloaded from the internet or generated inside the analyzer device 65 as results of tests or calculations, processing of the information, preparation of reports and presentations of the results.

A battery 160 provides the energy to run the analyzer device 65 and perform all the functions for the duration that the analyzer device 65 is switched on. The battery 160 must be recharged from time to time using a standard AC to DC charger.

The unused case fixation support 158b can be used to provide support for the installation of additional electronic boards 159 or one additional battery 160 in the event that a future upgrade of the analyzer device 65 requires more electronics or power respectively.

Figure 9:
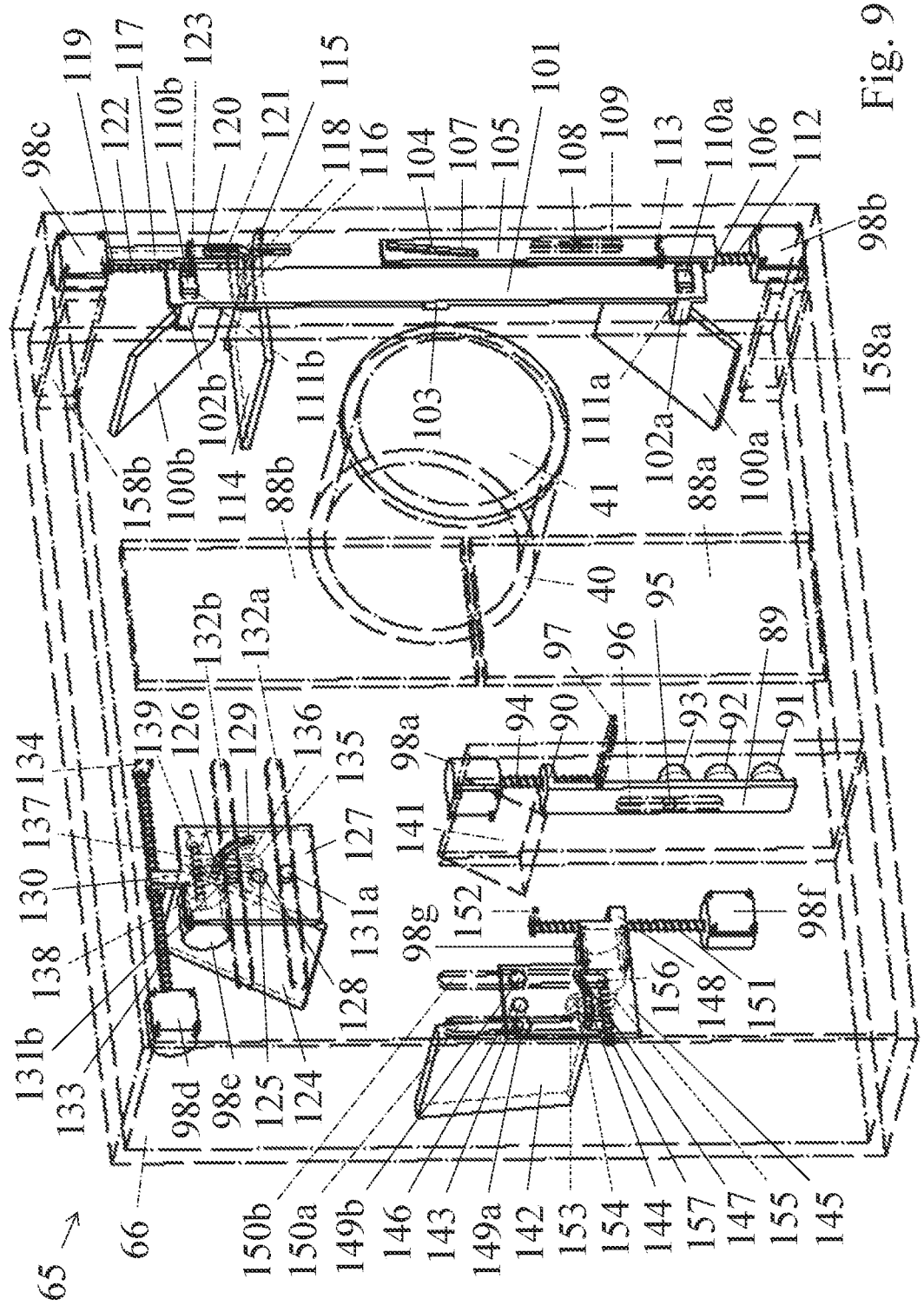
FIG. 9 is an isometric bottom view of the first embodiment of the analyzer device of the present invention showing moving components.

FIG. 9 shows an isometric view of the moving components of the analyzer device 65 seen from below with the analyzer body 66 drawn transparent in dash dotted lines to allow a better visualization of the underside of the moving components and provides another viewing angle to the analyzer device 65 to show additional detail.

The sampling cavity 41 inside the sampling window 40 is at the centerline of the analyzer device 65. A pair of cartridge installation sites 88a and 88b where the optical cartridge A 70 and the optical cartridge B 73 are installed is located next to the sampling window 40.

The laser tray 89 with the laser tray rim 90 provides support and positioning for the set of laser diodes: the infrared laser emitter 91, the visible laser emitter 92, and the ultraviolet laser emitter 93.

The pair of interference mirrors 100a and 100b is mounted on the interference mirror positioning device 101 in one pair of mirror supports 102a and 102b in such a way that the interference mirrors 100a and 100b are at a 90 degree angle with respect to each other. The interference mirror positioning device arm 103 attached to the center of the top face of the interference mirror positioning device 101 extends some length to the right and is linked to the interference mirror positioning device pin 104 that extends towards the bottom and reaches the level of the bottom face of the interference mirror positioning device 101.

The interference mirror positioning device 101 also has a pair of interference mirror positioning device guide pins 110a and 110b that fit and slide inside a pair of interference mirror positioning device guide slots 111a and 111b in the analyzer body 66 allowing the interference mirror positioning device 101 to have only a short range of movement in the horizontal direction parallel to the interference mirror positioning device guide slots 111a and 111b. This range of movement is however more than sufficient to adjust the light path in one wavelength to achieve destructive interference between the light path that goes through the sampling cavity 41 and the light path adjusted by the interference mirror positioning device 101.

FIG. 9 also shows the interference mirror positioning device control bar 105 located parallel to the interference mirror positioning device 101 that is fitted with the interference mirror positioning device control bar rim 106 at one end and the interference mirror positioning device control bar slot 107 at the other end.

The interference mirror positioning device guide pin 108 at the bottom face of the interference mirror positioning device control bar 105 fits and slides inside the interference mirror positioning device guide rail 109 in the analyzer body 66. The position of the interference mirror positioning device control bar 105 is controlled by the interference mirror positioning device control bar positioning screw 112 driven by the micro motor 98b. The interference mirror positioning device control bar positioning screw support 113 attached to the analyzer body 66 provides additional support to prevent wobbling of the interference mirror positioning device control bar positioning screw 112 as it turns.

The beam stopper 114 is a moving barrier that pivots 90 degrees around the beam stopper shaft 115 located at the right edge of the beam stopper 114. The beam stopper handle 116 allows the position of the beam stopper 114 to be controlled.

The selection mirror 124 is fitted with the selection mirror pivoting shaft 125 at the center and the selection mirror angle control handle 126 at a distance to the selection mirror pivoting shaft 125.

The moving detector 142 is fitted with the moving detector pivoting shaft 143 at the center and the moving detector angle control handle 144 at a distance to the moving detector pivoting shaft 143.

FIG. 9 also shows the case fixation supports 158a and 158b located at the rims of the analyzer body 66 away from the light path that hold additional components and the reflective diffraction grating support 141 where the reflective diffraction grating 140 is installed.

Figure 10:
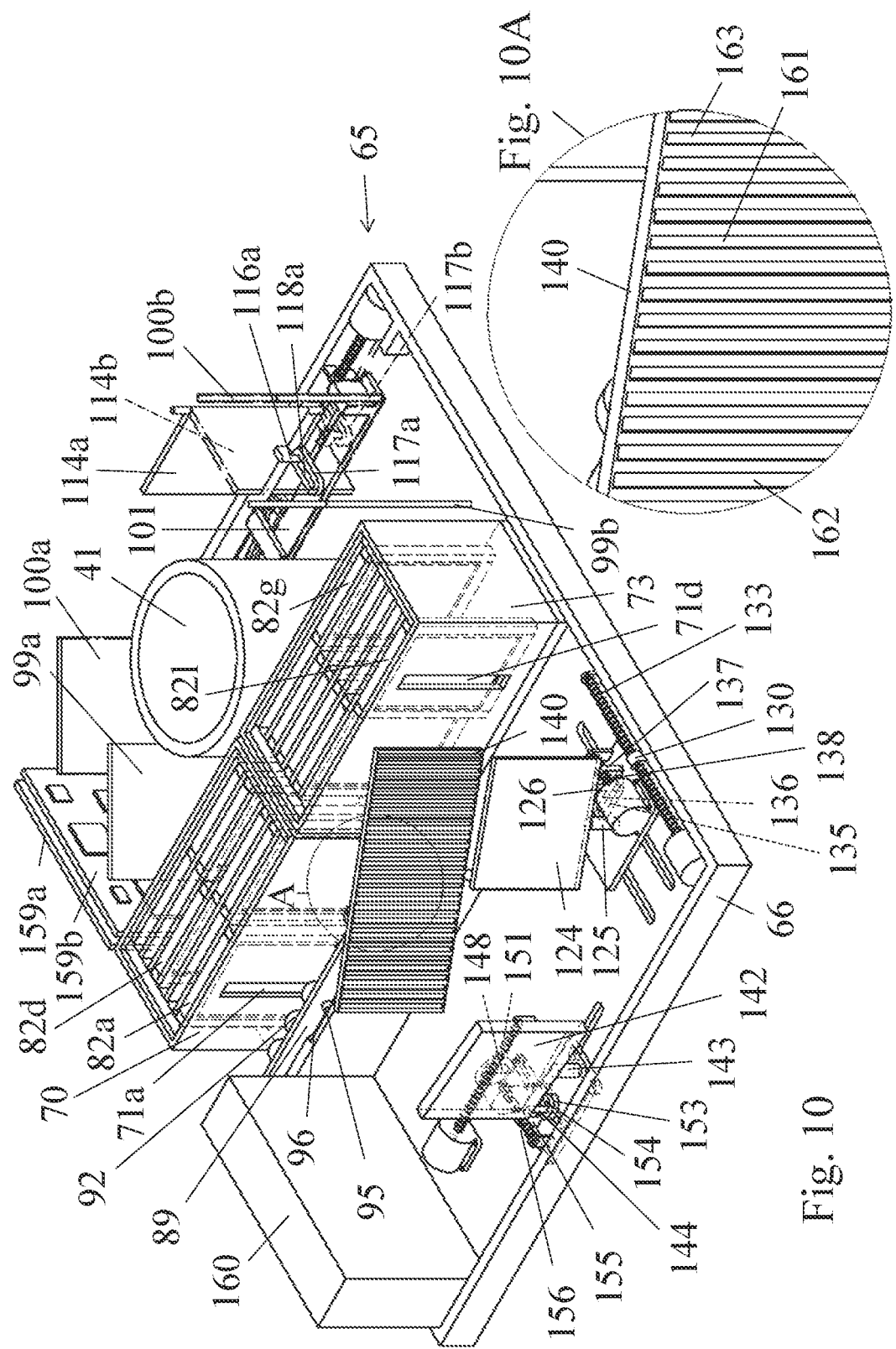
FIG. 10 is an isometric overlayed view of the first embodiment of the analyzer device of the of the present invention showing internal components and an embodiment of a beam stopper.

FIG. 10 shows an isometric cutout view of the analyzer device 65 with the vertical walls of the analyzer body 66 cut at a small distance to the bottom base to facilitate the view of the other components of the analyzer device 65. FIG. 10 also shows an overlaid view of the beam stopper 114a and 114b and provides a better viewing angle to some components that are not easily seen in the viewing angles of FIG. 8 and FIG. 9. To avoid clutter only the most relevant components needed to explain the functioning of the analyzer device 65 and the ones that are better seen in the viewing angle of FIG. 10 are identified.

The sampling cavity 41 is at the centerline of the analyzer device 65. The optical cartridge A 70 and the optical cartridge B 73 are shown without their respective optical cartridge lids 72 to allow the view of their respective optical devices 82. In the position shown in FIG. 10 the optical devices 82a and 82d in the optical cartridge A 70 and the optical devices 82g and 82l in the optical cartridge B 73 are active.

The laser tray guide pin 95 at the opposite face of the laser tray 89 that contains the set of laser diodes fits and slides inside the laser tray guide rail 96 in the analyzer body 66. The laser tray guide pin 95 stays restrained inside the laser tray guide rail 96 ensuring that the laser tray 89 stays leveled and that the movement of the laser tray 89 stays restrained to the intended linear direction.

In the position shown in FIG. 10 the laser tray 89 is positioned in such a way that the visible laser emitter 92 is located in front of the optical cartridge slits 71a and 71b of the optical cartridge A 70 or stated in a more concise way, the visible laser emitter 92 is selected. In this position, the laser tray guide pin 95 is at the center of the laser tray guide rail 96.

As the optical cartridge slits 71a and 71b are in the same line, to avoid clutter only the optical cartridge slit 71a is indicated (see FIG. 8 and FIG. 9). When the visible laser emitter 92 is turned on, the emitted visible laser light passes through the optical cartridge slit 71a in front of the visible laser emitter 92, is modified by the active optical devices 82a and 82d inside the optical cartridge A 70 and passes through the optical cartridge slit 71b. The visible laser light is also collimated as it passes through both optical cartridge slits 71a and 71b and continues inside the analyzer device 65 following a controlled path.

One pair of partial mirrors 99a and 99b is placed at a 90 degree angle with respect to each other and with the center of the partial mirror 99a positioned at a 45 degree angle to the path of the laser light exiting the optical cartridge slit 71b in the optical cartridge A 70.

The laser light exiting the optical cartridge slit 71b in the optical cartridge A 70 hits the center of the partial mirror 99a causing the reflected part to pass through the center of the sampling cavity 41. The laser light as modified by the optical devices 82a and 82d interacts with the substances present in a sample located inside the sampling cavity 41 and is further modified producing a sample spectrum of laser light that continues to hit the center of the partial mirror 99b. The partial mirror 99b then reflects the light to the center of the optical cartridge slit 71c in the optical cartridge B 73.

The sample spectrum of laser light enters the optical cartridge slit 71c and is modified again by the active optical devices 82g and 82l inside the optical cartridge B 73 and exits through the optical cartridge slit 71d being collimated a second time in the process of passing through the optical cartridge slits 71c and 71d. As the optical cartridge slits 71c and 71d are in the same line, to avoid clutter only the optical cartridge slit 71d is indicated (see FIG. 8 and FIG. 9).

One pair of interference mirrors 100a and 100b is mounted on the interference mirror positioning device 101 in such a way that the interference mirrors 100a and 100b are at a 90 degree angle with respect to each other, the interference mirror 100a is parallel to the partial mirror 99a and the interference mirror 100b is parallel to the partial mirror 99b. The interference mirror positioning device 101 holds and positions the interference mirrors 100a and 100b at the precise required distance to the partial mirrors 99a and 99b respectively to produce destructive interference in certain operation conditions (see FIG. 8 and FIG. 9).

The laser light exiting the optical cartridge slit 71b in the optical cartridge A 70 hits the center of the partial mirror 99a and the transmitted part continues until it hits the center of the interference mirror 100a and is reflected 90 degrees towards the center of the interference mirror 100b. As the beam stopper 114a is out of the interference light path the transmitted part of the laser light is not affected by the beam stopper 114a and reaches the interference mirror 100b enabling destructive interference to be produced.

In the overlaid position shown in dash dotted lines, the beam stopper 114b is in the interference light path and stops the laser light from reaching the interference mirror 100b and no interference is possible.

The position of the beam stopper 114a is controlled by the beam stopper actuator 117a that pushes the beam stopper handle 116a causing the beam stopper 114a to pivot in the clockwise direction out of the interference light path. Similarly, in the overlaid position the beam stopper 114b was pivoted in the counterclockwise direction into the interference light path.

FIG. 10 also shows the selection mirror 124 that is fitted with the selection mirror pivoting shaft 125 at the center and the selection mirror angle control handle 126 at a distance to the selection mirror pivoting shaft 125.

The position of the selection mirror 124 is controlled by the selection mirror rail positioning screw 133 that pulls or pushes the selection mirror rail nut 130. The angle of the selection mirror 124 is controlled by the selection mirror angle control actuator positioning screw 138 that pulls or pushes the selection mirror angle control actuator nut 137 attached to the selection mirror angle control actuator 135 to the desired position. As the selection mirror angle control actuator 135 moves, the selection mirror angle control actuator slot 136 forces the selection mirror angle control handle 126 to slide pivoting the selection mirror 124 the desired amount (see FIG. 8 and FIG. 9).

The sample spectrum of laser light that exits through the optical cartridge slit 71d of the optical cartridge B 73 continues until it reaches the center of the selection mirror 124 that is held at a precise position and at a precise angle to reflect the incoming laser light towards the desired region of the reflective diffraction grating 140.

FIG. 10 also shows the moving detector 142 that is fitted with the moving detector pivoting shaft 143 at the center and the moving detector angle control handle 144 at a distance to the moving detector pivoting shaft 143.

The position of the moving detector 142 is controlled by the moving detector rail positioning screw 151 that pulls or pushes the moving detector rail nut 148. The angle of the moving detector 142 is controlled by the moving detector rail angle control actuator positioning screw 156 that pulls or pushes the moving detector rail angle control actuator nut 155 attached to the moving detector rail angle control actuator 153 to the desired position. As the moving detector rail angle control actuator 153 moves, the moving detector rail angle control actuator slot 154 forces the moving detector angle control handle 144 to slide, pivoting the moving detector 142 the desired amount (see FIG. 8 and FIG. 9).

The sample spectrum of laser light that is diffracted by the reflective diffraction grating 140 continues until it reaches the center of the moving detector 142 that is held at the optimum precise position and at the optimum precise angle to receive and process the incoming diffracted laser light.

The electronic boards 159a and 159b contain all the electronics necessary to operate the analyzer device 65 performing all tasks including but not limited to the control of all components, connection to the internet and other devices, storage of information downloaded from the internet or generated inside the analyzer device 65 as results of tests or calculations, processing of the information, preparation of reports and presentations of the results. The battery 160 provides the energy to run the analyzer device 65 and perform all the functions for the desired duration of the operation. The battery 160 must be recharged from time to time using a standard AC to DC charger.

Detail FIG. 10A shows the reflective diffraction grating 140 in greater magnification to show three different regions:
  A first region located in the center of the reflective diffraction grating 140 is constructed with a plurality of medium standard indentations 161 adequate to refract the wavelengths of visible light;
  A second region located at the left of the reflective diffraction grating 140 is constructed with a plurality of coarse deeper indentations 162 adequate to refract the wavelengths of infrared light;
  And a third region located at the right of the reflective diffraction grating 140 is constructed with a plurality of fine shallower indentations 163 adequate to refract the wavelengths of ultraviolet light.

Figure 11:
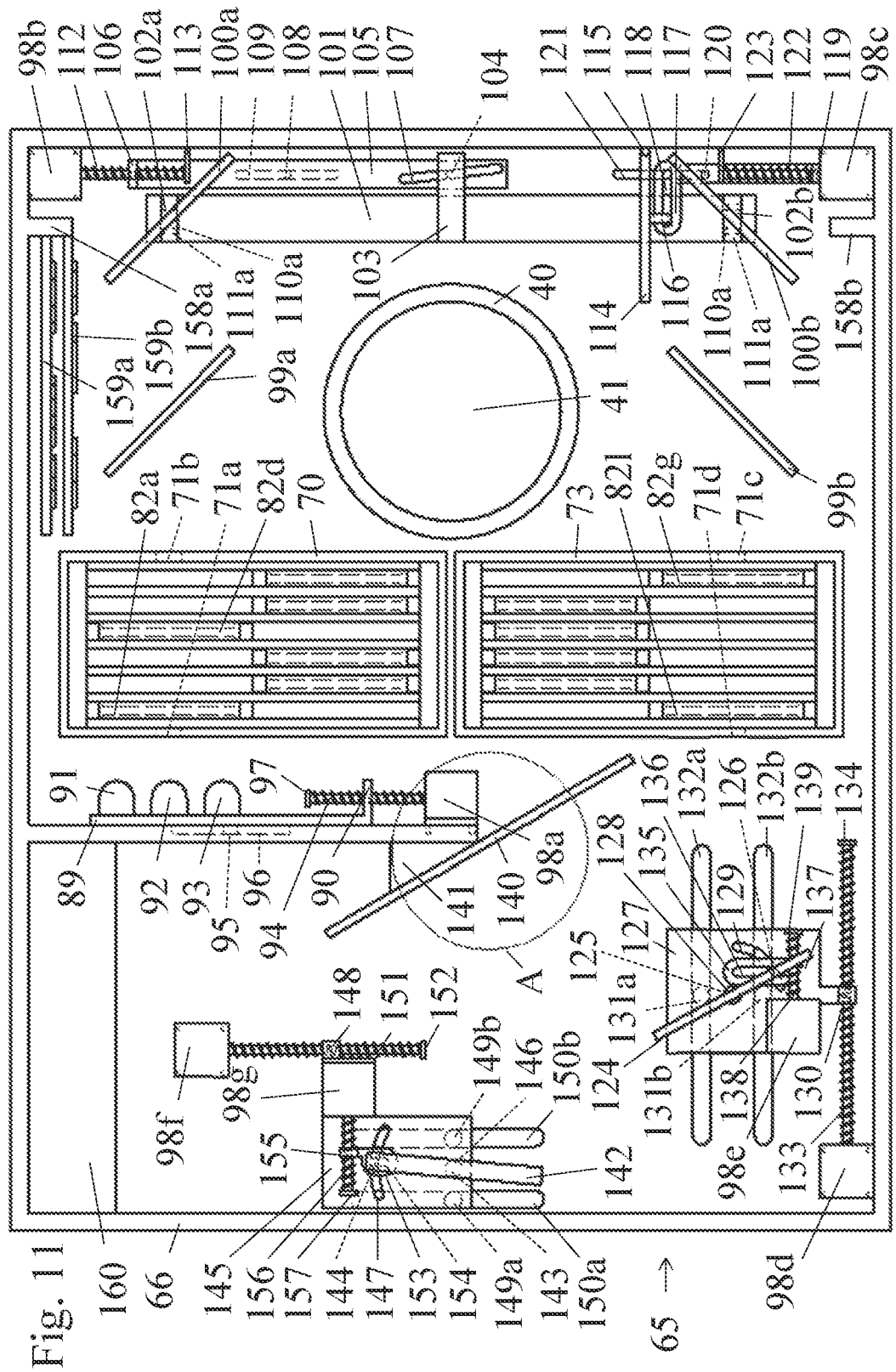
FIG. 11 is a top view of the first embodiment of the analyzer device of the present invention showing internal components.

FIG. 11 shows a top view of the first embodiment of the analyzer device 65 of the present invention with the analyzer lid 67 removed to show the internal components inside the analyzer body 66.

The sampling cavity 41 inside the sampling window 40 is at the centerline of the analyzer device 65. The optical cartridge A 70 and the optical cartridge B 73 are shown without their respective optical cartridge lids 72 to allow the view of their respective optical devices 82. In the position shown in FIG. 11 the optical devices 82a and 82d in the optical cartridge A 70 and the optical devices 82g and 82l in the optical cartridge B 73 are active.

The laser tray 89 with the laser tray rim 90 provides support and positioning for the set of laser diodes: the infrared laser emitter 91, the visible laser emitter 92, and the ultraviolet laser emitter 93.

The laser tray guide pin 95 at the opposite face of the laser tray 89 that contains the set of laser diodes fits and slides inside the laser tray guide rail 96 in the analyzer body 66. The position of the laser tray 89 is controlled by the laser tray positioning screw 94 driven by the micro motor 98a.

The laser tray positioning screw support 97 attached to the analyzer body 66 provides additional support to prevent wobbling of the laser tray positioning screw 94 as it turns.

In the position shown in FIG. 11 the laser tray 89 is positioned in such a way that the visible laser emitter 92 is located in front of the optical cartridge slits 71a and 71b of the optical cartridge A 70 or stated in a more concise way, the visible laser emitter 92 is selected. When the visible laser emitter 92 is turned on, the emitted visible laser light passes through the optical cartridge slit 71a in front of the visible laser emitter 92, gets modified by the active optical devices 82a and 82d inside the optical cartridge A 70 and passes through the optical cartridge slit 71b. The visible laser light is also collimated as it passes through both optical cartridge slits 71a and 71b and continues inside the analyzer device 65 following a controlled path.

The partial mirrors 99a and 99b are placed facing the sampling window 40 at a 90 degree angle with respect to each other and with the center of the partial mirror 99a positioned at a 45 degree angle to the path of the laser light exiting the optical cartridge slit 71b in the optical cartridge A 70.

The laser light exiting the optical cartridge slit 71b in the optical cartridge A 70 hits the center of the partial mirror 99a causing the reflected part to pass through the center of the sampling cavity 41. The laser light as modified by the optical cartridge slits 71a and 71b interacts with the substances present in a sample located inside the sampling cavity 41 and is further modified producing a sample spectrum of laser light that continues to hit the center of the partial mirror 99b. The partial mirror 99b then reflects the light to hit the center of the optical cartridge slit 71c in the optical cartridge B 73.

The laser light enters the optical cartridge slit 71c and is modified again by the active optical devices 82g and 82l inside the optical cartridge B 73 and exits through the optical cartridge slit 71d being collimated a second time in the process of passing through the optical cartridge slits 71c and 71d.

The interference mirrors 100a and 100b are mounted on the interference mirror positioning device 101 in the corresponding mirror supports 102a and 102b in such a way that the interference mirrors 100a and 100b are at a 90 degree angle with respect to each other, the interference mirror 100a is parallel to the partial mirror 99a and the interference mirror 100b is parallel to the partial mirror 99b. The interference mirror positioning device arm 103 attached to the center of the top face of the interference mirror positioning device 101 extends some length to the right and is fitted with the interference mirror positioning device pin 104 at the edge that extends towards the bottom and reaches the level of the bottom face of the interference mirror positioning device 101.

FIG. 11 also shows the beam stopper 114 that is a moving barrier that pivots 90 degrees around the beam stopper shaft 115 located at the right edge of the beam stopper 114. The beam stopper handle 116 allows the position of the beam stopper 114 to be controlled.

The laser light exiting the optical cartridge slit 71b in the optical cartridge A 70 hits the center of the partial mirror 99a and the transmitted part continues until it hits the center of the interference mirror 100a and is reflected 90 degrees towards the center of the interference mirror 100b but in the position shown in FIG. 11 the transmitted part of the laser light hits the beam stopper 114 and does not reach the interference mirror 100b.

FIG. 11 also shows the selection mirror 124 that is fitted with the selection mirror pivoting shaft 125 at the center and the selection mirror angle control handle 126 at a distance to the selection mirror pivoting shaft 125.

The laser light that exits through the optical cartridge slit 71d of the optical cartridge B 73 continues until it reaches the center of the selection mirror 124 that is held at a precise position and at a precise angle to reflect the incoming laser light towards the desired region of the reflective diffraction grating 140. The reflective diffraction grating 140 is fixed, mounted at the reflective diffraction grating support 141 in the analyzer body 66.

The position of the center of the selection mirror 124 is defined by the position of the selection mirror rail 127 that is controlled by the selection mirror rail positioning screw 133 driven by the micro motor 98d.

The angle of the selection mirror 124 is defined by the position of the selection mirror angle control handle 126 that fits and is held inside the selection mirror rail guide slot 129 on the selection mirror rail 127 and the selection mirror angle control actuator slot 136 on the selection mirror angle control actuator 135. The position of the selection mirror angle control actuator 135 is controlled by the selection mirror angle control actuator positioning screw 138 driven by the micro motor 98e.

FIG. 11 also shows the moving detector 142 that is fitted with the moving detector pivoting shaft 143 at the center and the moving detector angle control handle 144 at a distance to the moving detector pivoting shaft 143.

The moving detector 142 is mounted on the moving detector rail 145 by means of inserting the moving detector pivoting shaft 143 into the moving detector rail central pivot 146 and the moving detector angle control handle 144 into the moving detector rail guide slot 147 in the moving detector rail 145.

As the moving detector 142 pivots around the moving detector rail central pivot 146, the range of movement of the moving detector angle control handle 144 is limited by the moving detector rail guide slot 147 restricting the range of pivoting movement of the moving detector 142.

The laser light that is diffracted by the reflective diffraction grating 140 continues until it reaches the center of the moving detector 142 that is held at the optimum precise position and at the optimum precise angle to receive and process the incoming diffracted laser light.

The position of the center of the moving detector 142 is defined by the position of the moving detector rail 145 that is controlled by the moving detector rail positioning screw 151 driven by the micro motor 98f.

The angle of the moving detector 142 is defined by the position of the moving detector angle control handle 144 that fits and is held inside the moving detector rail guide slot 147 on the moving detector rail 145 and the moving detector rail angle control actuator slot 154 on the moving detector rail angle control actuator 153. The position of the moving detector rail angle control actuator 153 is controlled by the moving detector rail angle control actuator positioning screw 156 driven by the micro motor 98g.

FIG. 11 also shows the case fixation supports 158a and 158b located at the rims of the analyzer body 66 away from the light path that are available to hold additional components. The case fixation support 158a provides fixation support to the electronic boards 159a and 159b that contain all the electronics necessary to operate the analyzer device 65 performing all tasks including but not limited to the control of all components, connection to the internet and other devices, storage of information downloaded from the internet or generated inside the analyzer device 65 as results of tests or calculations, processing of the information, preparation of reports and presentations of the results.

The battery 160 provides the energy to run the analyzer device 65 and perform all the functions for the duration that the analyzer device 65 is switched on. The unused case fixation support 158b can be used to provide support for the installation of additional electronic boards 159 or one additional battery 160 in the event that a future upgrade of the analyzer device 65 requires more electronics or power respectively.

Detail FIG. 11A shows the reflective diffraction grating 140 mounted at the reflective diffraction grating support 141 in greater magnification to show the path that light rays hitting the three regions of the reflective diffraction grating 140 follow.

The first region located in the center of the reflective diffraction grating 140 is constructed with a plurality of medium standard indentations 161 adequate to refract the wavelengths of visible light. A visible laser light incident ray 164 coming from the selection mirror 124 hits the reflective diffraction grating 140 at a 90 degree angle. As the medium standard indentations 161 have a triangular cross section, the visible laser light incident ray 164 is partially reflected at an angle less than 90 degrees to the reflective diffraction grating 140 and a visible laser light reflected ray 165 is produced. A visible laser light diffracted ray 166 is produced at the first diffraction angle.

Figure 14:
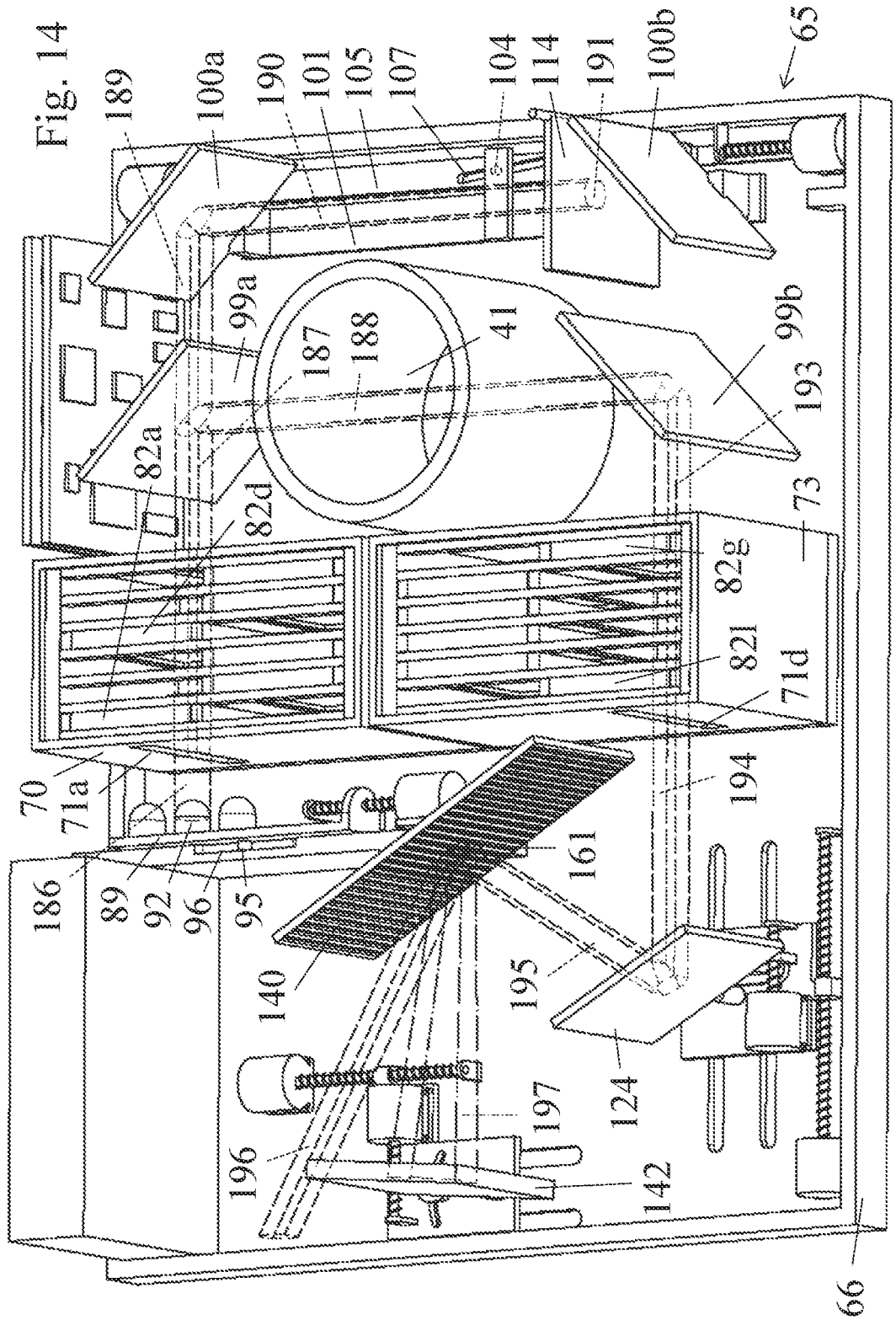
FIG. 14 is an isometric view of an embodiment of a visible light path in the first embodiment of the analyzer device of the present invention.
Figure 15:
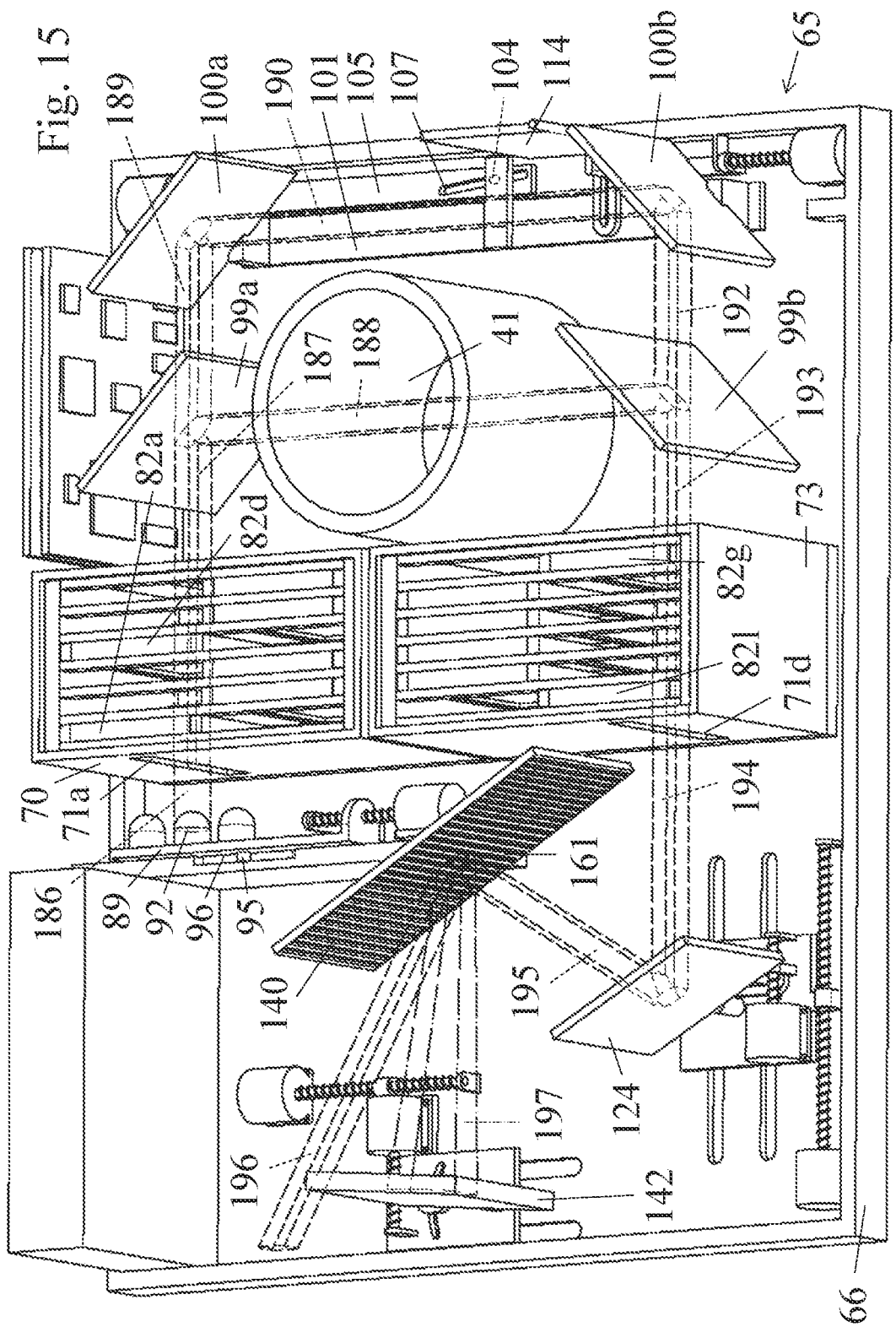
FIG. 15 is an isometric view of an embodiment of an interfered visible light path in the first embodiment of the analyzer device of the present invention.

The moving detector 142 is positioned at the optimum position and at the optimum angle to capture the visible laser light diffracted ray 166 and allow the visible laser light reflected ray 165 to miss and pass to the right of the moving detector 142 (see FIG. 14 and FIG. 15).

The second region located at the left of the reflective diffraction grating 140 is constructed with a plurality of coarse deeper indentations 162 adequate to refract the wavelengths of infrared light. An infrared laser light incident ray 167 coming from the selection mirror 124 hits the reflective diffraction grating 140 at a 90 degree angle. As the coarse deeper indentations 162 have a triangular cross section, the infrared laser light incident ray 167 is partially reflected at an angle less than 90 degrees to the reflective diffraction grating 140 and an infrared laser light reflected ray 168 is produced. An infrared laser light diffracted ray 169 is produced at the first diffraction angle. As the infrared light has a longer wavelength than the visible light, the first diffraction angle of the infrared light occurs at a slightly larger angle than the first diffraction angle of the visible light. To ascertain this difference, a parallel direction to the visible laser light diffracted ray 170a is drawn in Detail FIG. 11A.

Figure 13:
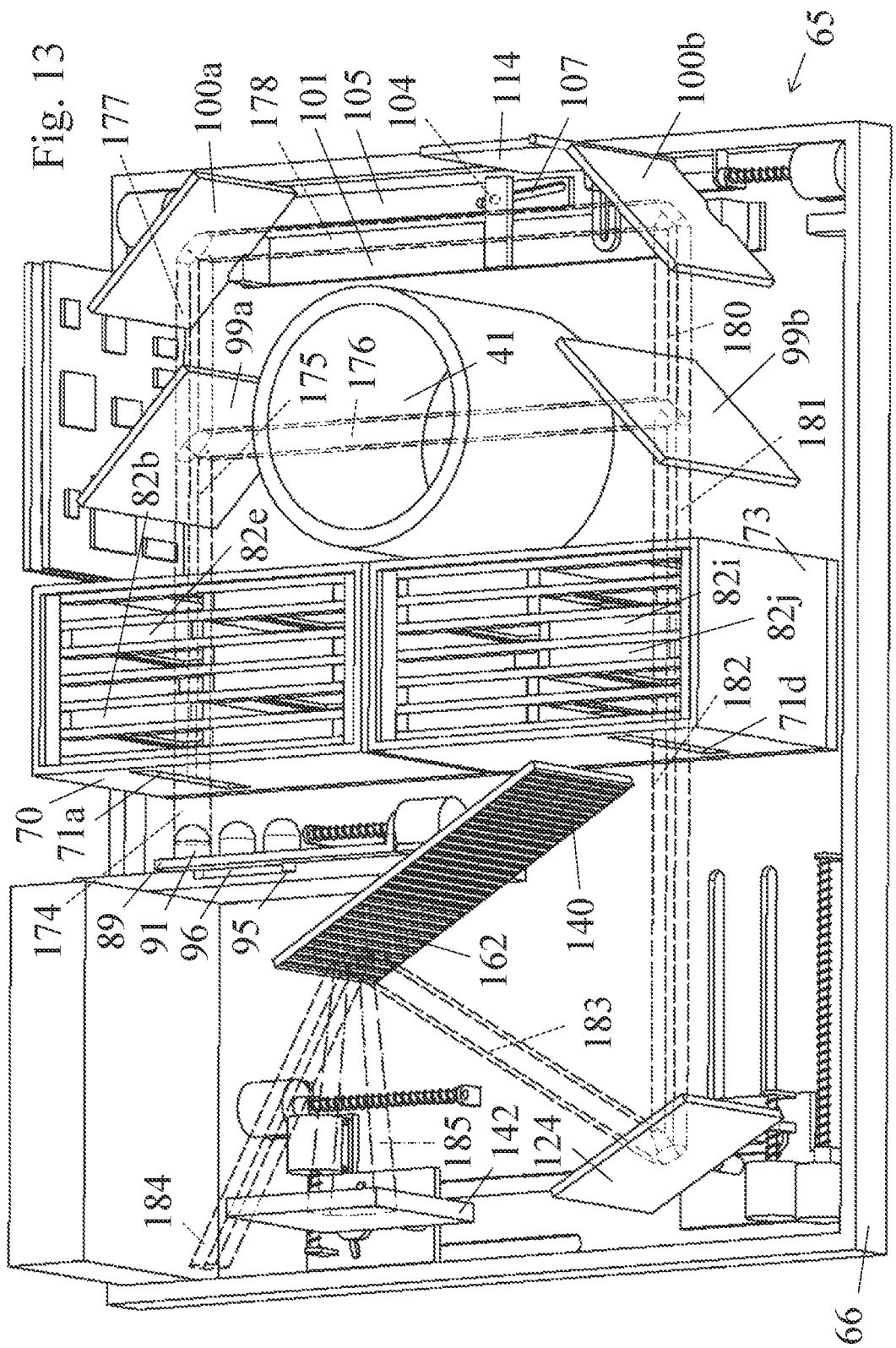
FIG. 13 is an isometric view of an embodiment of an interfered infrared light path in the first embodiment of the analyzer device of the present invention.

The moving detector 142 is positioned at the optimum position and at the optimum angle taking into account the slightly larger angle of diffraction of the infrared light to capture the infrared laser light diffracted ray 169 and allow the infrared laser light reflected ray 168 to miss and pass to the right of the moving detector 142 (see FIG. 12 and FIG. 13).

The second region of the reflective diffraction grating 140 with coarse deeper indentations 162 is designed to be located at the left side of the reflective diffraction grating 140, closer to the moving detector 142 than the other regions because the larger angle of diffraction of the infrared light causes the one infrared laser light reflected ray 168 and the infrared laser light diffracted ray 169 to diverge more rapidly enabling the infrared laser light reflected ray 168 to miss the moving detector 142 despite the shorter travel distance available.

The third region located at the right of the reflective diffraction grating 140 is constructed with a plurality of fine shallower indentations 163 adequate to refract the wavelengths of ultraviolet light. An ultraviolet laser light incident ray 171 coming from the selection mirror 124 hits the reflective diffraction grating 140 at a 90 degree angle. As the fine shallower indentations 163 have a triangular cross section, the ultraviolet laser light incident ray 171 is partially reflected at an angle less than 90 degrees to the reflective diffraction grating 140 and an ultraviolet laser light reflected ray 172 is produced. An ultraviolet laser light diffracted ray 173 is produced at the first diffraction angle. As the ultraviolet light has a shorter wavelength than the visible light, the first diffraction angle of the ultraviolet light occurs at a slightly smaller angle than the first diffraction angle of the visible light. To ascertain this difference, the parallel direction to the visible laser light diffracted ray 170b is drawn in Detail FIG. 11A.

Figure 16:
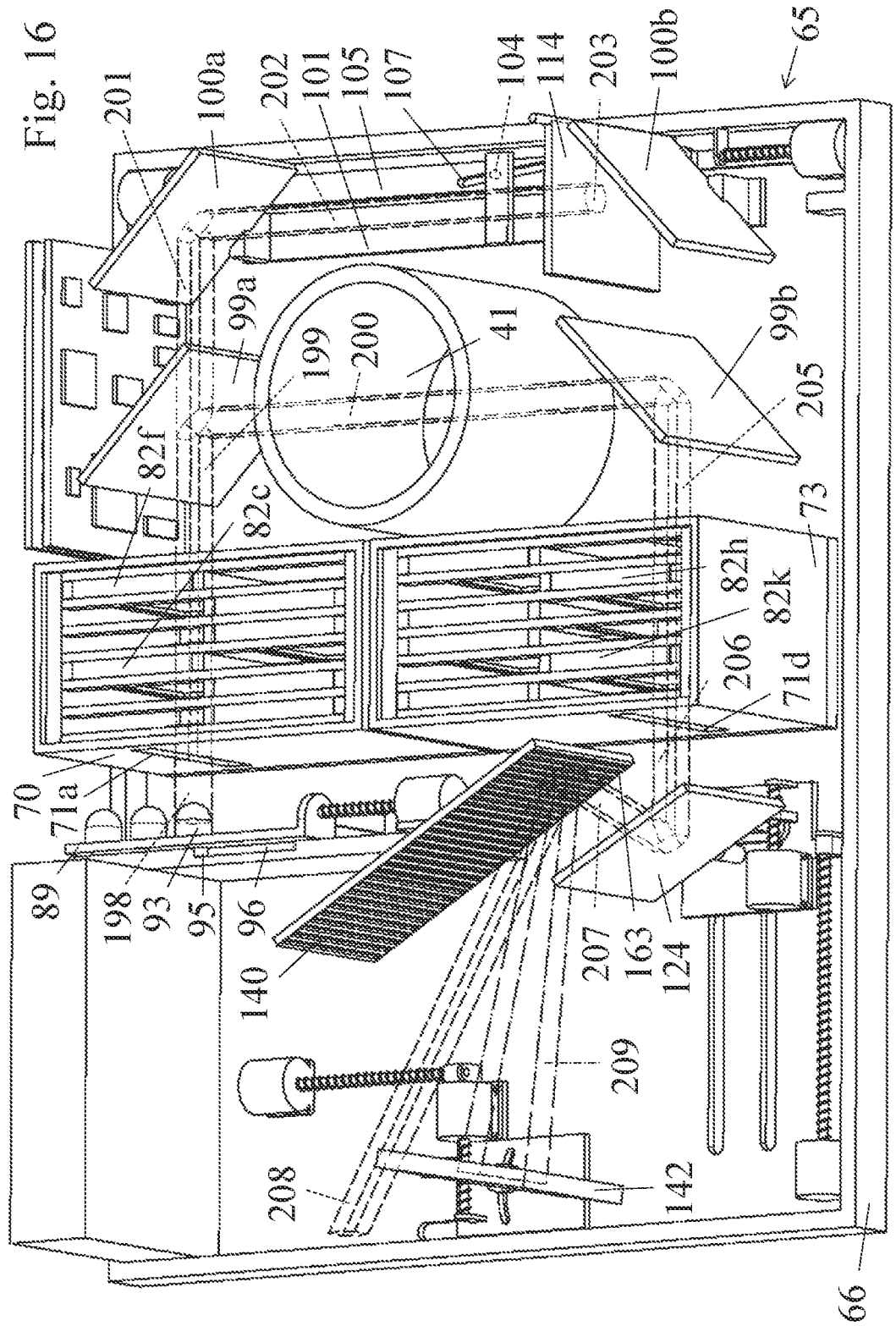
FIG. 16 is an isometric view of an embodiment of an ultraviolet light path in the first embodiment of the analyzer device of the present invention.
Figure 17:
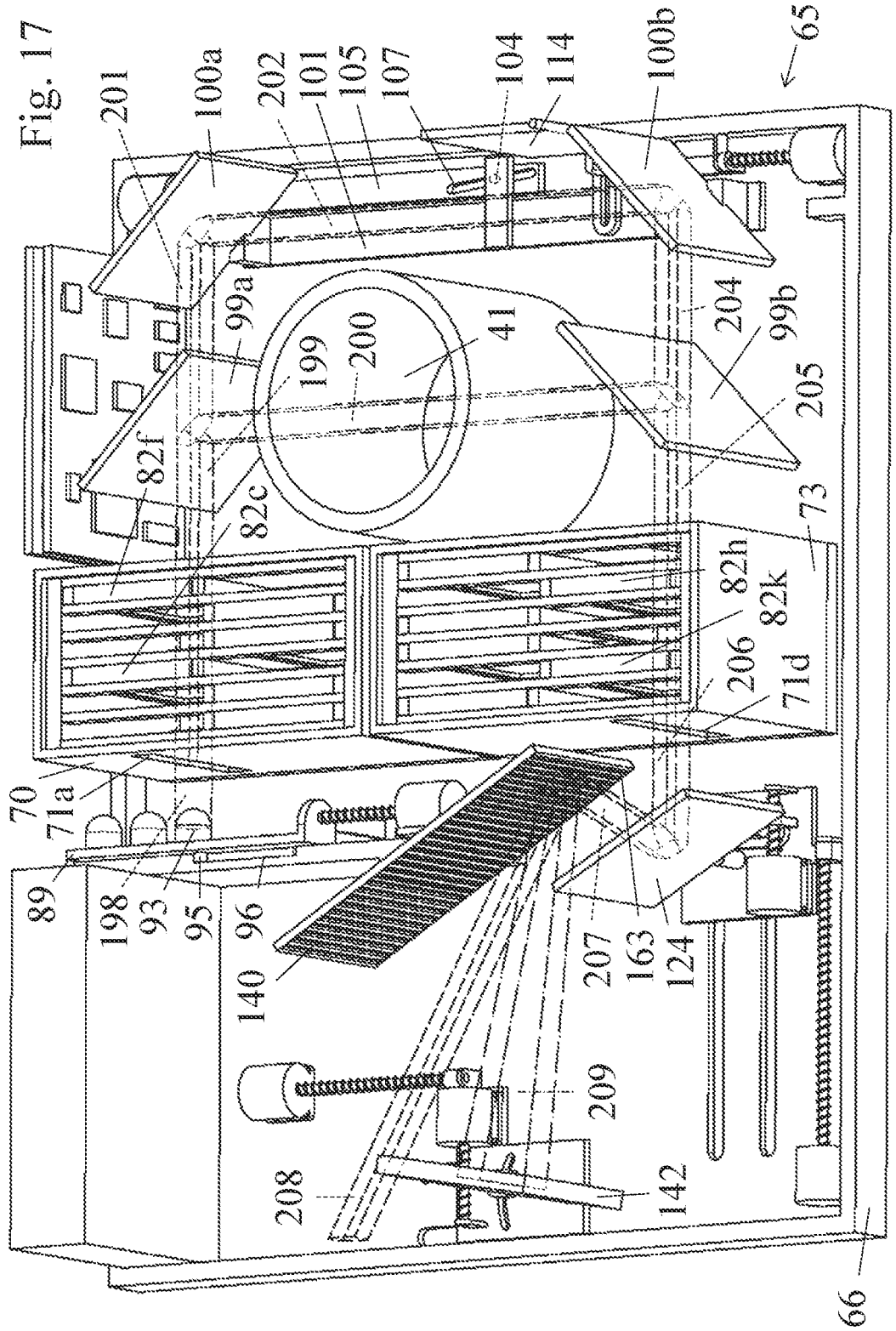
FIG. 17 is an isometric view of an embodiment of an interfered ultraviolet light path in the first embodiment of the analyzer device of the present invention.

The moving detector 142 is positioned at the optimum position and at the optimum angle taking into account the slightly smaller angle of diffraction of the ultraviolet light to capture the ultraviolet laser light diffracted ray 173 and allow the ultraviolet laser light reflected ray 172 to miss and pass to the right of the moving detector 142 (see FIG. 16 and FIG. 17).

The third region of the reflective diffraction grating 140 with fine shallower indentations 163 is designed to be located at the right side of the reflective diffraction grating 140, further away from the moving detector 142 than the other regions because the smaller angle of diffraction of the ultraviolet light causes the ultraviolet laser light reflected ray 172 and the infrared laser light diffracted ray 169 to diverge more slowly requiring the ultraviolet laser light reflected ray 172 to travel a longer distance to miss the moving detector 142.

Detail FIG. 11A also shows the micro motor 98a and the laser tray positioning screw 94 in additional detail.

FIG. 12 shows an isometric cutout view of the analyzer device 65 with the vertical walls of the analyzer body 66 cut at a small distance to the bottom base to facilitate the view of the other components of the analyzer device 65 in operation using infrared light beams without interferometry.

The laser tray 89 is positioned to select the infrared laser emitter 91, that is moved to the position in front of the optical cartridge slit 71a of the optical cartridge A 70. In this position, the laser tray guide pin 95 is at the right end of the laser tray guide rail 96.

The infrared laser emitter 91 is turned on and an infrared laser light emitted beam 174 is produced. The infrared laser light emitted beam 174 passes through the optical cartridge slit 71a, is modified by the active optical devices 82b and 82e inside the optical cartridge A 70 in this example and passes through the optical cartridge slit 71b that collimates the infrared laser light emitted beam 174 producing an infrared laser light collimated and preprocessed beam 175 that continues inside the analyzer device 65 until it hits the center of the partial mirror 99*a*.

The infrared laser light collimated and preprocessed beam 175 is partially reflected producing an infrared laser light beam passing through the sampling cavity 176 that passes through the center of the sampling cavity 41. The infrared laser light beam passing through the sampling cavity 176 as modified by the active optical devices 82*b* and 82*e* interacts with the substances present in a sample located inside the sampling cavity 41 and is further modified producing a sample spectrum of infrared laser light that continues to hit the center of the partial mirror 99*b*.

The infrared laser light collimated and preprocessed beam 175 is also partially transmitted at the partial mirror 99*a* producing an infrared laser light beam transmitted to interferometer 177. The infrared laser light beam transmitted to interferometer 177 continues and hits the center of the interference mirror 100*a* and an infrared laser light beam reflected in the interferometer 178 is produced towards the center of the interference mirror 100*b*. The beam stopper 114 is in the interference light path resulting in an infrared laser light beam absorbed by beam stopper 179 and nothing reaches the interference mirror 100*b* to be reflected towards the partial mirror 99*b*.

The partial mirror 99*b* then reflects only the sample spectrum of infrared laser light coming from the sampling cavity 41 into an infrared laser light modified beam 181 that hits the center of the optical cartridge slit 71*c* in the optical cartridge B 73. The infrared laser light modified beam 181 enters the optical cartridge slit 71*c* and is modified again by the active optical devices 82*i* and 82*j* inside the optical cartridge B 73 in this example and exits through the optical cartridge slit 71*d* being collimated a second time in the process of passing through the optical cartridge slits 71*c* and 71*d* resulting in an infrared laser light modified and post processed beam 182.

The infrared laser light modified and post processed beam 182 hits the center of the selection mirror 124 that is located at the right position and at the right angle to reflect the infrared laser light modified and post processed beam 182 producing an infrared laser light incident beam 183 aimed into the second region at the left side of the reflective diffraction grating 140 that is constructed with coarse deeper indentations 162 adequate to refract the wavelengths of infrared light. The reflective diffraction grating 140 produces an infrared laser light reflected beam 184 and an infrared laser light diffracted beam 185 that diverge as they follow their paths.

The infrared laser light diffracted beam 185 hits the center of the moving detector 142 that is held at the optimum precise position and at the optimum precise angle to receive and process the infrared laser light diffracted beam 185 based on the specific tests desired for the analysis of the sample. The infrared laser light reflected beam 184 on the other hand misses the moving detector 142 and is absorbed at the inner wall of the analyzer body 66 at the right side of the moving detector 142.

FIG. 13 shows an isometric cutout view of the analyzer device 65 with the vertical walls of the analyzer body 66 cut at a small distance to the bottom base to facilitate the view of the other components of the analyzer device 65 in operation using infrared light beams with interferometry.

The laser tray 89 is positioned to select the infrared laser emitter 91, that is moved to the position in front of the optical cartridge slit 71*a* of the optical cartridge A 70. In this position, the laser tray guide pin 95 is at the right end of the laser tray guide rail 96.

The infrared laser emitter 91 is turned on and the infrared laser light emitted beam 174 is produced. The infrared laser light emitted beam 174 passes through the optical cartridge slit 71*a*, is modified by the active optical devices 82*b* and 82*e* inside the optical cartridge A 70 in this example and passes through the optical cartridge slit 71*b* that collimates the infrared laser light emitted beam 174 producing the infrared laser light collimated and preprocessed beam 175 that continues inside the analyzer device 65 until it hits the center of the partial mirror 99*a*.

The infrared laser light collimated and preprocessed beam 175 is partially reflected producing the infrared laser light beam passing through the sampling cavity 176 that passes through the center of the sampling cavity 41. The infrared laser light beam passing through the sampling cavity 176 as modified by the optical devices 82*b* and 82*e* interacts with the substances present in a sample located inside the sampling cavity 41 and is further modified producing a sample spectrum of infrared laser light that continues to the center of the partial mirror 99*b*.

The infrared laser light collimated and preprocessed beam 175 is also partially transmitted at the partial mirror 99*a* producing the infrared laser light beam transmitted to interferometer 177. The infrared laser light beam transmitted to interferometer 177 continues and hits the center of the interference mirror 100*a* and the infrared laser light beam reflected in the interferometer 178 is produced towards the center of the interference mirror 100*b*. The beam stopper 114 is out of the interference light path and the infrared laser light beam reflected in the interferometer 178 is reflected at the interference mirror 100*b* resulting in an infrared laser light beam exiting the interferometer 180 that hits the partial mirror 99*b*.

The interference mirror positioning device control bar 105 is moved up or down accordingly and the interference mirror positioning device control bar slot 107 pulls or pushes the interference mirror positioning device pin 104 resulting in a small adjustment in the position of the interference mirror positioning device 101 that shortens or increases the length of the interferometer light path to the exact amount to achieve destructive interference with the sample spectrum of infrared laser light path going through the sampling cavity 41.

The partial mirror 99*b* then combines the sample spectrum of infrared laser light beam passing through the sampling cavity 176 and the infrared laser light beam exiting the interferometer 180 and the infrared laser light modified beam 181 is directed to the center of the optical cartridge slit 71*c* in the optical cartridge B 73. The infrared laser light modified beam 181 enters the optical cartridge slit 71*c* and is modified again by the active optical devices 82*i* and 82*j* inside the optical cartridge B 73 in this example and exits through the optical cartridge slit 71*d* being collimated a second time in the process of passing through the optical cartridge slits 71*c* and 71*d* resulting in the infrared laser light modified and post processed beam 182.

The infrared laser light modified and post processed beam 182 hits the center of the selection mirror 124 that is located at the right position and at the right angle to reflect the infrared laser light modified and post processed beam 182 producing the infrared laser light incident beam 183 aimed into the second region at the left side of the reflective diffraction grating 140 that is constructed with coarse deeper indentations 162 adequate to refract the wavelengths of infrared light. The reflective diffraction grating 140 produces the infrared laser light reflected beam 184 and the infrared laser light diffracted beam 185 that diverge as they follow their paths.

The infrared laser light diffracted beam 185 hits the center of the moving detector 142 that is held at the optimum precise position and at the optimum precise angle to receive, detect an interference pattern, and process the infrared laser light diffracted beam 185 based on the specific tests desired for the analysis of the sample. The infrared laser light reflected beam 184 on the other hand misses the moving detector 142 and is absorbed at the inner wall of the analyzer body 66 at the right side of the moving detector 142.

FIG. 14 shows an isometric cutout view of the analyzer device 65 with the vertical walls of the analyzer body 66 cut at a small distance to the bottom base to facilitate the view of the other components of the analyzer device 65 in operation using visible light beams without interferometry.

The laser tray 89 is positioned to select the visible laser emitter 92, that is moved to the position in front of the optical cartridge slit 71*a* of the optical cartridge A 70. In this position, the laser tray guide pin 95 is at the center of the laser tray guide rail 96.

The visible laser emitter 92 is turned on and a visible laser light emitted beam 186 is produced. The visible laser light emitted beam 186 passes through the optical cartridge slit 71*a*, is modified by the active optical devices 82*a* and 82*d* inside the optical cartridge A 70 in this example and passes through the optical cartridge slit 71*b* that collimates the visible laser light emitted beam 186 producing a visible laser light collimated and preprocessed beam 187 that continues inside the analyzer device 65 until it hits the center of the partial mirror 99*a*.

The visible laser light collimated and preprocessed beam 187 is partially reflected producing a visible laser light beam passing through the sampling cavity 188 that passes through the center of the sampling cavity 41. The visible laser light beam passing through the sampling cavity 188 as modified by the optical devices 82*a* and 82*d* interacts with the substances present in a sample located inside the sampling cavity 41 and is further modified producing a sample spectrum of visible laser light that continues to the center of the partial mirror 99*b*.

The visible laser light collimated and preprocessed beam 187 is also partially transmitted at the partial mirror 99*a* producing a visible laser light beam transmitted to interferometer 189. The visible laser light beam transmitted to interferometer 189 continues and hits the center of the interference mirror 100*a* and a visible laser light beam reflected in the interferometer 190 is produced towards the center of the interference mirror 100*b*. The beam stopper 114 is in the interference light path resulting in a visible laser light beam absorbed by beam stopper 191 causing none of the light within the interference light path to reach the interference mirror 100*b* to be reflected towards the partial mirror 99*b*.

The partial mirror 99*b* then reflects only the sample spectrum of visible laser light coming from the sampling cavity 41 into a visible laser light modified beam 193 that is directed at the center of the optical cartridge slit 71*c* in the optical cartridge B 73. The visible laser light modified beam 193 enters the optical cartridge slit 71*c* and is modified again by the active optical devices 82*g* and 82*l* inside the optical cartridge B 73 in this example and exits through the optical cartridge slit 71*d* being collimated a second time in the process of passing through the optical cartridge slits 71*c* and 71*d* resulting in a visible laser light modified and post processed beam 194.

The visible laser light modified and post processed beam 194 hits the center of the selection mirror 124 that is located at the right position and at the right angle to reflect the visible laser light modified and post processed beam 194 producing a visible laser light incident beam 195 aimed into the first region at the center of the reflective diffraction grating 140 that is constructed with medium standard indentations 161 adequate to refract the wavelengths of visible light. The reflective diffraction grating 140 produces a visible laser light reflected beam 196 and a visible laser light diffracted beam 197 that diverge as they follow their paths.

The visible laser light diffracted beam 197 hits the center of the moving detector 142 that is held at the optimum precise position and at the optimum precise angle to receive and process the visible laser light diffracted beam 197 based on specific tests desired for the analysis of the sample. The visible laser light reflected beam 196 on the other hand misses the moving detector 142 and is absorbed at the inner wall of the analyzer body 66 at the right side of the moving detector 142.

FIG. 15 shows an isometric cutout view of the analyzer device 65 with the vertical walls of the analyzer body 66 cut at a small distance to the bottom base to facilitate the view of the other components of the analyzer device 65 in operation using visible light beams with interferometry.

The laser tray 89 is positioned to select the visible laser emitter 92, that is moved to the position in front of the optical cartridge slit 71*a* of the optical cartridge A 70. In this position, the laser tray guide pin 95 is at the center of the laser tray guide rail 96.

The visible laser emitter 92 is turned on and the visible laser light emitted beam 186 is produced. The visible laser light emitted beam 186 passes through the optical cartridge slit 71*a*, is modified by the active optical devices 82*a* and 82*d* inside the optical cartridge A 70 in this example and passes through the optical cartridge slit 71*b* that collimates the visible laser light emitted beam 186 producing the visible laser light collimated and preprocessed beam 187 that continues inside the analyzer device 65 until it hits the center of the partial mirror 99*a*.

The visible laser light collimated and preprocessed beam 187 is partially reflected producing the visible laser light beam passing through the sampling cavity 188 that passes through the center of the sampling cavity 41. The visible laser light beam passing through the sampling cavity 188 as modified by the optical devices 82*a* and 82*d* interacts with the substances present in a sample located inside the sampling cavity 41 and is further modified producing a sample spectrum of visible laser light that continues to hit the center of the partial mirror 99*b*.

The visible laser light collimated and preprocessed beam 187 is also partially transmitted at the partial mirror 99*a* producing the visible laser light beam transmitted to interferometer 189. The visible laser light beam transmitted to interferometer 189 continues and hits the center of the interference mirror 100*a* and the visible laser light beam reflected in the interferometer 190 is produced towards the center of the interference mirror 100*b*. The beam stopper 114 is out of the interference light path and the visible laser light beam reflected in the interferometer 190 is reflected at the interference mirror 100*b* resulting in a visible laser light beam exiting the interferometer 192 and being directed to the partial mirror 99*b*.

The interference mirror positioning device control bar 105 is moved up or down accordingly and the interference mirror positioning device control bar slot 107 pulls or pushes the interference mirror positioning device pin 104 resulting in a small adjustment in the position of the interference mirror positioning device 101 that shortens or increases the length of the interferometer light path to the exact amount to achieve destructive interference with the sample spectrum of visible light path going through the sampling cavity 41.

The partial mirror 99b then combines the sample spectrum of visible laser light beam passing through the sampling cavity 188 and the visible laser light beam exiting the interferometer 192 producing the visible laser light modified beam 193 that is directed to the center of the optical cartridge slit 71c in the optical cartridge B 73. The visible laser light modified beam 193 enters the optical cartridge slit 71c and is modified again by the active optical devices 82g and 82l inside the optical cartridge B 73 in this example and exits through the optical cartridge slit 71d being collimated a second time in the process of passing through the optical cartridge slits 71c and 71d resulting in the visible laser light modified and post processed beam 194.

The visible laser light modified and post processed beam 194 hits the center of the selection mirror 124 that is located at the right position and at the right angle to reflect the visible laser light modified and post processed beam 194 producing the visible laser light incident beam 195 aimed into the first region at the center of the reflective diffraction grating 140 that is constructed with medium standard indentations 161 adequate to refract the wavelengths of visible light. The reflective diffraction grating 140 produces the visible laser light reflected beam 196 and the visible laser light diffracted beam 197 that diverge as they follow their paths.

The visible laser light diffracted beam 197 hits the center of the moving detector 142 that is held at the optimum precise position and at the optimum precise angle to receive, detect an interference pattern, and process the visible laser light diffracted beam 197 based on specific tests desired for analysis of the sample. The visible laser light reflected beam 196 on the other hand misses the moving detector 142 and is absorbed at the inner wall of the analyzer body 66 at the right side of the moving detector 142.

FIG. 16 shows an isometric cutout view of the analyzer device 65 with the vertical walls of the analyzer body 66 cut at a small distance to the bottom base to facilitate the view of the other components of the analyzer device 65 in operation using ultraviolet light beams without interferometry.

The laser tray 89 is positioned to select the ultraviolet laser emitter 93, that is moved to the position in front of the optical cartridge slit 71a of the optical cartridge A 70. In this position, the laser tray guide pin 95 is at the left end of the laser tray guide rail 96.

The ultraviolet laser emitter 93 is turned on and an ultraviolet laser light emitted beam 198 is produced. The ultraviolet laser light emitted beam 198 passes through the optical cartridge slit 71a, is modified by the active optical devices 82c and 82f inside the optical cartridge A 70 in this example and passes through the optical cartridge slit 71b that collimates the ultraviolet laser light emitted beam 198 producing an ultraviolet laser light collimated and preprocessed beam 199 that continues inside the analyzer device 65 until it hits the center of the partial mirror 99a.

The ultraviolet laser light collimated and preprocessed beam 199 is partially reflected producing an ultraviolet laser light beam passing through the sampling cavity 200 that passes through the center of the sampling cavity 41. The ultraviolet laser light beam passing through the sampling cavity 200 as modified by the optical devices 82c and 82f interacts with the substances present in a sample located inside the sampling cavity 41 and is further modified producing a sample spectrum of ultraviolet laser light that continues to hit the center of the partial mirror 99b.

The ultraviolet laser light collimated and preprocessed beam 199 is also partially transmitted at the partial mirror 99a producing an ultraviolet laser light beam transmitted to interferometer 201. The ultraviolet laser light beam transmitted to interferometer 201 continues and hits the center of the interference mirror 100a and an ultraviolet laser light beam reflected in the interferometer 202 is produced towards the center of the interference mirror 100b. The beam stopper 114 is in the interference light path resulting in an ultraviolet laser light beam absorbed by beam stopper 203 causing none of the light of the interference light path to reach the interference mirror 100b to be reflected towards the partial mirror 99b.

The partial mirror 99b then reflects only the sample spectrum of ultraviolet laser light coming from the sampling cavity 41 into an ultraviolet laser light modified beam 205 that hits the center of the optical cartridge slit 71c in the optical cartridge B 73. The ultraviolet laser light modified beam 205 enters the optical cartridge slit 71c and is modified again by the active optical devices 82h and 82k inside the optical cartridge B 73 in this example and exits through the optical cartridge slit 71d being collimated a second time in the process of passing through the optical cartridge slits 71c and 71d resulting in an ultraviolet laser light modified and post processed beam 206.

The ultraviolet laser light modified and post processed beam 206 hits the center of the selection mirror 124 that is located at the right position and at the right angle to reflect the ultraviolet laser light modified and post processed beam 206 producing an ultraviolet laser light incident beam 207 aimed into the third region at the right side of the reflective diffraction grating 140 that is constructed with fine shallower indentations 163 adequate to refract the wavelengths of ultraviolet light. The reflective diffraction grating 140 produces an ultraviolet laser light reflected beam 208 and an ultraviolet laser light diffracted beam 209 that diverge as they follow their paths.

The ultraviolet laser light diffracted beam 209 hits the center of the moving detector 142 that is held at the optimum precise position and at the optimum precise angle to receive and process the ultraviolet laser light diffracted beam 209 based on the specific tests desired for analysis of the sample. The ultraviolet laser light reflected beam 208 on the other hand misses the moving detector 142 and is absorbed at the inner wall of the analyzer body 66 at the right side of the moving detector 142.

FIG. 17 shows an isometric cutout view of the analyzer device 65 with the vertical walls of the analyzer body 66 cut at a small distance to the bottom base to facilitate the view of the other components of the analyzer device 65 in operation using ultraviolet light beams with interferometry.

The laser tray 89 is positioned to select the ultraviolet laser emitter 93, that is moved to the position in front of the optical cartridge slit 71a of the optical cartridge A 70. In this position, the laser tray guide pin 95 is at the left end of the laser tray guide rail 96.

The ultraviolet laser emitter 93 is turned on and the ultraviolet laser light emitted beam 198 is produced. The ultraviolet laser light emitted beam 198 passes through the optical cartridge slit 71a, is modified by the active optical devices 82*c* and 82*f* inside the optical cartridge A 70 in this example and passes through the optical cartridge slit 71*b* that collimates the ultraviolet laser light emitted beam 198 producing the ultraviolet laser light collimated and preprocessed beam 199 that continues inside the analyzer device 65 until it hits the center of the partial mirror 99*a*.

The ultraviolet laser light collimated and preprocessed beam 199 is partially reflected producing the ultraviolet laser light beam passing through the sampling cavity 200 that passes through the center of the sampling cavity 41. The ultraviolet laser light beam passing through the sampling cavity 200 as modified by the optical devices 82*c* and 82*f* interacts with the substances present in a sample located inside the sampling cavity 41 and is further modified producing a sample spectrum of ultraviolet laser light that continues to hit the center of the partial mirror 99*b*.

The ultraviolet laser light collimated and preprocessed beam 199 is also partially transmitted at the partial mirror 99*a* producing the ultraviolet laser light beam transmitted to interferometer 201. The ultraviolet laser light beam transmitted to interferometer 201 continues and hits the center of the interference mirror 100*a* and the ultraviolet laser light beam reflected in the interferometer 202 is produced towards the center of the interference mirror 100*b*. The beam stopper 114 is out of the interference light path and the ultraviolet laser light beam reflected in the interferometer 202 is reflected at the interference mirror 100*b* resulting in an ultraviolet laser light beam exiting the interferometer 204 that is directed at the partial mirror 99*b*.

The interference mirror positioning device control bar 105 is moved up or down accordingly and the interference mirror positioning device control bar slot 107 pulls or pushes the interference mirror positioning device pin 104 resulting in a small adjustment in the position of the interference mirror positioning device 101 that shortens or increases the length of the interferometer light path to the exact amount to achieve destructive interference with the sample spectrum of ultraviolet laser light path going through the sampling cavity 41.

The partial mirror 99*b* then combines the sample spectrum of ultraviolet laser light beam passing through the sampling cavity 200 and the ultraviolet laser light beam exiting the interferometer 204 and the ultraviolet laser light modified beam 205 hits the center of the optical cartridge slit 71*c* in the optical cartridge B 73. The ultraviolet laser light modified beam 205 enters the optical cartridge slit 71*c* and is modified again by the active optical devices 82*h* and 82*k* inside the optical cartridge B 73 in this example and exits through the optical cartridge slit 71*d* being collimated a second time in the process of passing through the optical cartridge slits 71*c* and 71*d* resulting in the ultraviolet laser light modified and post processed beam 206.

The ultraviolet laser light modified and post processed beam 206 hits the center of the selection mirror 124 that is located at the right position and at the right angle to reflect the ultraviolet laser light modified and post processed beam 206 producing the ultraviolet laser light incident beam 207 aimed into the third region at the right side of the reflective diffraction grating 140 that is constructed with fine shallower indentations 163 adequate to refract the wavelengths of ultraviolet light. The reflective diffraction grating 140 produces the ultraviolet laser light reflected beam 208 and the ultraviolet laser light diffracted beam 209 that diverge as they follow their paths.

The ultraviolet laser light diffracted beam 209 hits the center of the moving detector 142 that is held at the optimum precise position and at the optimum precise angle to receive, detect an interference pattern, and process the ultraviolet laser light diffracted beam 209 based on specific tests desired for analysis of the sample. The ultraviolet laser light reflected beam 208 on the other hand misses the moving detector 142 and is absorbed at the inner wall of the analyzer body 66 at the right side of the moving detector 142.

Operation—First Embodiment

Before the execution of a test the analyzer device 65 needs to be fully charged or attached to a power source to ensure it has sufficient power to conduct the tests. It is also recommended to download eventual updates to the configuration files containing new updated information on new tests, new detectable substances, pathogens, etc. to ensure best results.

FIG. 1 shows the basic options to conduct tests. Before the test, the appropriate container must be selected to hold the sample so it can be introduced in the sampling cavity 41. An exception being if the user sticks one finger 42 or other body part into the sampling cavity 41 and tests may be performed on the skin or through the tissue of the skin on the blood inside the veins and other biological matter of the body thus requiring no container. A pet's tail or paw can also be inserted by adjusting dimensions of the sampling cavity 41 to meet the dimensions of the sample of the body part.

FIG. 1A shows the container 44 that can be used to hold liquids or solids or a mixture of both. The sample may contain body fluids such as urine, vomit, etc. available in large volumes as well as solids such as feces. The sample may also contain any other liquid or solid of interest such as food, water, and beverage samples to verify its components, nutritional value, contaminants, detect pathogens or poisons, etc. Once the sample has been inserted into the container sampling cavity 45, the container lid 48 must be placed sealing the container 44 before inserting it into the sampling cavity 41.

FIG. 1B shows the thin container 50 that can be used to hold liquids or solids that are available in small quantities. The thin container 50 can hold a variety of body fluids such as blood, saliva, mucus, pus, etc. that are available in small volumes. It is also possible to insert the tip of a swabber that was used to collect material from the nose, mouth, other tissue samples, and other small objects.

The sample may also contain any other liquid or solid of interest such as small samples of food, beverage and medicines to verify its components, nutritional value, contaminants, pathogens, poisons, etc. Once the sample has been inserted into the thin container sampling cavity 52, the thin container lid 57 must be placed sealing the thin container 50 before inserting it into the sampling cavity 41.

FIG. 1C shows the blower device 59 that can be used to do a variety of tests involving the contents of the exhale such as alcohol detection, oxygenation levels, detection of pathogens, etc. The blower device 59 may also be filled with air or other gases to detect carbon monoxide, carbon dioxide, acetylene, methane, etc.

The blower device 59 is simply inserted into the sampling cavity 41 and is ready to be used. The user only has to blow in the blower mouthpiece 64 with intensity and speed according to the test being conducted. As the user blows through the blower mouthpiece 64 the exhaled air goes through the blower sampling cavity 60 and exits though the blower cavity exit hole 61 at the bottom. The blower cavity exit hole 61 creates some restriction to the air flow and ensures that the sample is held inside the blower sampling cavity 60 long enough to be analyzed and enables tests to be conducted as the exhale process unfolds and capture eventual variations in the sample.

FIG. 2 shows the container 44 and the container lid 48 ready to be inserted into the sampling window 40 of the analyzer device 65 for testing.

FIG. 3 shows the thin container 50 and the thin container lid 57 ready to be inserted into the sampling window 40 of the analyzer device 65 for testing.

FIG. 4 shows the blower device 59 inserted into the sampling window 40 of the analyzer device 65 ready for testing.

FIG. 5 shows the analyzer device 65 with the analyzer lid opening cover 68 open to allow the installation and or replacement of the optical cartridge A 70 and the optical cartridge B 73.

A variety of optical cartridge As 70 and optical cartridge Bs 73 can be made available and be interchanged to allow the analyzer device 65 to be configured for the execution of specific, common, and not so common tests. The possibility of replacing the optical cartridge A 70 and/or the optical cartridge B 73 also allows the analyzer device 65 to be upgraded to execute new tests not yet conceived to detect new substances for example present in a new virus not yet known.

The possibility of replacing the optical cartridge A 70 and/or the optical cartridge B 73 also allows the reduction of the size, weight and cost of the analyzer device 65 limiting the number of optical components inside the optical cartridge As 70 and optical cartridge Bs 73 to a basic set of the most useful optical components. This does not limit the capabilities and the flexibility of the analyzer device 65 as specific sets of optical cartridge A 70 and optical cartridge B 73 can be made for any specific test needed and special versions of the analyzer device 65 can be constructed with larger versions of the optical cartridge A 70 and optical cartridge B 73 containing a full set of optical devices inside to satisfy the requirements of more demanding users at home or medical personnel in clinics.

FIG. 6 shows an isometric exploded view of the optical cartridge A 70 to allow a better view of its internal components and explain their operation.

The optical cartridge case 74 has one optical cartridge slit 71a in the front and one optical cartridge slit 71b in the back. The optical cartridge slit 71a and the optical cartridge slit 71b are placed in perfect alignment, at the same distance to the optical cartridge case 74 edges.

The incident laser beam 75 aimed at the optical cartridge slit 71a is able to pass through the optical cartridge A 70. The laser beam chopped portion 76 that misses optical cartridge slit 71a hits the optical cartridge A 70 and is absorbed allowing only the collimated laser beam 77 to pass. The collimated laser beam 77 continues through the optical cartridge A 70 and is able to pass through the optical cartridge slit 71a provided that it is in perfect alignment with both the optical cartridge slit 71a in the front and one optical cartridge slit 71b in the back. Any divergence in the incident laser beam 75 is absorbed inside the optical cartridge A 70 producing the recollimated laser beam 78 exiting the optical cartridge A 70.

One set of optical cartridge guide rails 79a, 79b, . . . 79g is placed at the bottom of the optical cartridge case 74 and another set of optical cartridge guide rails 79h, 79i, . . . 79n is placed at the top of the optical cartridge case 74.

The optical cartridge guide rails 79b, 79c, . . . , 79f at the center of the set of optical cartridge guide rails 79a, 79b, . . . 79g at the bottom are fitted with one pair of optical cartridge guide rail contacts $80b_1$ and $80b_2$, $80c_1$ and $80c_2$, . . . , $80f_1$ and $80f_2$ respectively.

The optical cartridge guide rails 79a and 79g at the extremities of the set of optical cartridge guide rails 79a, 79b, . . . 79g at the bottom are fitted with one optical cartridge guide rail contact $80a_2$ and $80g_1$ respectively at the side of the respective optical cartridge guide rails 79a and 79g oriented towards the center of the set.

The optical cartridge guide rail contacts $80b_1$, $80c_1$, . . . , $80g_1$ are at the front of the corresponding optical cartridge guide rails 79b, 79c, . . . , 79g, and the optical cartridge guide rail contacts $80a_2$, $80b_2$, . . . , $80f_2$ are at the back of the corresponding optical cartridge guide rails 79a, 79b, . . . , 79f.

The optical cartridge guide rails 79h, 79i, . . . 79n at the top are also fitted with one or two optical cartridge guide rail contacts $80h_2$, $80i_1$ and $80i_2$, . . . , $80n_1$ respectively in the same arrangement as the optical cartridge guide rails 79a, 79b, . . . , 79g at the bottom.

One pair of permanent magnets 81a and 81b with the same orientation for the magnetic field with either both North Poles facing the left and the South Poles facing the right or both South Poles facing the left and the North Poles facing the right is placed at the optical cartridge case 74 one permanent magnet 81a in contact with the inner left face of the optical cartridge case 74 and one permanent magnet 81b in contact with the inner right face of the optical cartridge case 74.

The orientation of the permanent magnets 81a and 81b installed in the optical cartridge A 70 must be the opposite of the orientation of the permanent magnets 81a and 81b installed in the optical cartridge B 73. In this way, when the optical cartridge A 70 and the optical cartridge B 73 are installed in the analyzer device 65 with the optical cartridge A 70 and the optical cartridge B 73 oriented in opposite directions, the orientation of the magnetic field is the same and the magnetic field does not weaken between the optical cartridge A 70 and the optical cartridge B 73 (see FIG. 5).

The optical cartridge guide rails 79a, 79b, . . . 79g and the optical cartridge guide rails 79h, 79i, . . . 79n span the distance between the permanent magnets 81a and 81b (see FIG. 7).

Between each two consecutive optical cartridge guide rails 79a and 79b, 79b and 79c, . . . , 79f and 79g below and the optical cartridge guide rails 79h and 79i, 79i and 79j, . . . , 79m and 79n at the top one optical device 82 is installed. In the first embodiment of the optical cartridge A 70 as shown in FIG. 6 a total of six optical devices 82 are installed (see FIG. 7).

The optical device frame 83 has one pair of electromagnets 84a and 84b at the sides, one electromagnet 84a at the left and one electromagnet 84b at the right. The electromagnet 84a at the left is attached to one pair of optical device bottom contacts 85 at the front and at the back of the bottom portion of the optical device frame 83 and is powered by electric current flowing from the pair of optical device bottom contacts 85. The electromagnet 84a can be switched off or switched on producing a magnetic field oriented to the left or to the right depending on the status and polarity of the electric potential available at the pair of optical device bottom contacts 85.

Similarly, the electromagnet 84b at the right is attached to one pair of optical device top contacts 86 at the front and at the back of the top portion of the optical device frame 83 and the electromagnet 84b can be switched off or switched on producing a magnetic field oriented to the left or to the right depending on the status and polarity of the electric potential available at the pair of optical device top contacts 86.

As the electromagnet 84a and the electromagnet 84b are switched on or off with a certain polarity, the magnetic fields they produce interact with the magnetic fields of the permanent magnets 81a and 81b allowing the optical device 82 to move to the left or to the right. The electromagnet 84a and the electromagnet 84b can be individually controlled with more or less current to produce a stronger magnetic field necessary to move the optical device 82 from one side to the other or a weaker magnetic field sufficient to keep the optical device 82 in contact with the permanent magnet 81a or 81b where the optical device 82 is located at a certain point in time.

The optical device frame 83 holds the optical device active part 87 that is designed to perform specific tasks individually or working together with other optical device active parts 87. The optical device active part 87 can be a lens, a filter, a polarizer, and many other optical devices.

The optical cartridge lid 72 closes the optical cartridge case 74 at the top keeping the other components of the optical cartridge A 70 safe and properly placed inside the optical cartridge case 74.

FIG. 7 shows an isometric view of the optical cartridge A 70 with all components in place. The optical cartridge lid 72 is not drawn to facilitate the view of the other components.

The permanent magnet 81a is installed in contact with the inner left face of the optical cartridge case 74 and the permanent magnet 81b is installed in contact with the inner right face of the optical cartridge case 74.

Six optical devices 82a, 82b, 82c, 82d, 82e, and 82f are installed and their corresponding electromagnets 84a$_1$ and 84a$_2$, 84b$_1$ and 84b$_2$, 84c$_1$ and 84c$_2$, 84d$_1$ and 84d$_2$, 84e$_1$ and 84e$_2$, and 84f$_1$ and 84f$_2$, are indicated to better ascertain the position of each individual optical device.

The optical cartridge guide rails 79a, 79b, . . . 79g on top as well as the optical cartridge guide rails 79h, 79i on the bottom are visible.

The optical device 82a is in contact with the adjacent optical cartridge guide rail contacts 80h$_2$ and 80i$_1$ at the bottom that power the electromagnet 84a$_1$ and with the adjacent optical cartridge guide rail contacts 80a$_2$ and 80b$_1$ at the top that power the electromagnet 84a$_2$. The other optical devices 82b, 82c, 82d, 82e, and 82f are also in contact with their respective adjacent optical cartridge guide rail contacts at the bottom and at the top to power their respective electromagnets.

The optical cartridge slit 71a in the front and the optical cartridge slit 71b in the back are located in perfect alignment, at the center of the position occupied by the optical devices 82a, 82d at the left side of the optical cartridge case 74. The optical device active part 87a at the left side of the optical cartridge case 74 is on the light path and produces an effect on a light beam passing through and collimated by the optical cartridge slit 71a and the optical cartridge slit 71b whereas the optical device active part 87b at the right side of the optical cartridge case 74. Stays out of the light path and does not produce any effect.

In FIG. 7, the optical devices 82a, 82d that are at the left side of the optical cartridge case 74 are active and produce effects on a light beam passing through the optical cartridge A 70 while the remaining optical devices 82b, 82c, 82e, and 82f that are at the right side of the optical cartridge case 74 are inactive and do not produce any effect on a light beam passing through the optical cartridge A 70.

To change the selection of active optical devices 82, the corresponding electromagnets 84 are energized with the suitable polarity to move the optical devices 82 into the light path to activate it or with the suitable polarity to move the optical devices 82 out of the light path to inactivate it.

FIG. 8, FIG. 9, FIG. 10 and FIG. 11 show the first embodiment of the analyzer device 65 of the present invention with the analyzer lid 67 removed from different angles and with the analyzer body 66 cut at a convenient height or transparent, drawn in dash dotted lines to better illustrate all components. The operation is the same for all these figures and is described once to avoid unnecessary redundancy.

The sampling cavity 41 inside the sampling window 40 is at the centerline of the analyzer device 65. The optical cartridge A 70 and the optical cartridge B 73 are shown without their respective optical cartridge lids 72 to allow the view of their respective optical devices 82. In the position represented, the optical devices 82a and 82d in the optical cartridge A 70 and the optical devices 82g and 82l in the optical cartridge B 73 are active.

The laser tray 89 with the laser tray rim 90 provides support and positioning for the set of laser diodes: the infrared laser emitter 91, the visible laser emitter 92, and the ultraviolet laser emitter 93.

The laser tray guide pin 95 at the opposite face of the laser tray 89 that contains the set of laser diodes fits and slides inside the laser tray guide rail 96 in the analyzer body 66. The position of the laser tray 89 is controlled by the laser tray positioning screw 94 driven by the micro motor 98a.

The laser tray positioning screw support 97 attached to the analyzer body 66 provides additional support to prevent wobbling of the laser tray positioning screw 94 as it turns.

As the micro motor 98a turns the laser tray positioning screw 94 clockwise or counterclockwise, the laser tray positioning screw 94 pulls or pushes the laser tray rim 90 attached to the laser tray 89 to the desired position. The laser tray guide pin 95 stays restrained inside the laser tray guide rail 96 ensuring that the laser tray 89 stays leveled and that the movement of the laser tray 89 stays restrained to the intended linear direction.

In the position represented, the laser tray 89 is positioned in such a way that the visible laser emitter 92 is located in front of the optical cartridge slits 71a and 71b of the optical cartridge A 70 or stated in a more concise way, the visible laser emitter 92 is selected.

To select the infrared laser emitter 91, the micro motor 98a turns the laser tray positioning screw 94 clockwise pulling the laser tray rim 90 attached to the laser tray 89 until the infrared laser emitter 91 is located in front of the optical cartridge slits 71a and 71b.

Similarly, to select the ultraviolet laser emitter 93, the micro motor 98a turns the laser tray positioning screw 94 counterclockwise pushing the laser tray rim 90 attached to the laser tray 89 until the ultraviolet laser emitter 93 is located in front of the optical cartridge slits 71a and 71b.

When the visible laser emitter 92 is turned on, the emitted visible laser light passes through the optical cartridge slit 71a in front of the visible laser emitter 92, gets modified by one or more of the selected active optical devices 82 that in this example are optical devices 82a and 82d inside the optical cartridge A 70 and passes through the optical cartridge slit 71b. The visible laser light is also collimated as it passes through both optical cartridge slits 71a and 71b and continues inside the analyzer device 65 following a controlled path.

The partial mirrors 99a and 99b are placed facing the sampling window 40 at a 90 degree angle with respect to each other and with the center of the partial mirror 99a positioned at a 45 degree angle to the path of the laser light exiting the optical cartridge slit 71b in the optical cartridge A 70.

The laser light modified by the optical devices 82a and 82d in this example and collimated exits the optical cartridge slit 71b in the optical cartridge A 70 with all or a portion of the laser light reflecting off the center of the partial mirror 99a causing all or a portion of the laser light to pass through the center of the sampling cavity 41. The laser light is modified by the optical devices 82 to have specific characteristics related to frequency, intensity, polarization, and/or other optical features as specified for one or more specific tests selected for analysis and/or identification of a sample or substances within a sample, and/or to determine proportions of one or more substances within a sample, The laser light as modified by the optical devices 82a and 82d interacts with the substances present in a sample located inside the sampling cavity 41 such as through the absorption of energy from the laser light. The molecular characteristics of the sample through this interaction alter the characteristics of the laser light producing a sample spectrum. All or a portion of the sample spectrum of laser light reflects off the center of the partial mirror 99b with the partial mirror 99b directing all or a portion of the sample spectrum of laser light to hit the center of the optical cartridge slit 71c in the optical cartridge B 73.

The sample spectrum of laser light enters the optical cartridge slit 71c and is modified again by the active optical devices 82g and 82l inside the optical cartridge B 73 in this example and exits through the optical cartridge slit 71d being collimated a second time in the process of passing through the optical cartridge slits 71c and 71d.

The pair of interference mirrors 100a and 100b is mounted on the interference mirror positioning device 101 in one pair of mirror supports 102a and 102b in such a way that the interference mirrors 100a and 100b are at a 90 degree angle with respect to each other. The interference mirror positioning device arm 103 attached to the center of the top face of the interference mirror positioning device 101 extends some length to the right and is linked to the interference mirror positioning device pin 104 that extends towards the bottom and reaches the level of the bottom face of the interference mirror positioning device 101.

The interference mirror positioning device 101 is fitted with one pair of interference mirror positioning device guide pins 110a and 110b that fit and slide inside the corresponding interference mirror positioning device guide slots 111a and 111b in the analyzer body 66 allowing the interference mirror positioning device 101 to have only a short range of movement in the horizontal direction parallel to the interference mirror positioning device guide slots 111a and 111b. This range of movement is however more than sufficient to adjust the light path in one wavelength to achieve destructive interference between the sample spectrum laser light that goes through the sampling cavity 41 and the laser light adjusted by the interference mirror positioning device 101.

The interference mirror positioning device control bar 105 is located parallel to the interference mirror positioning device 101 that is fitted with the interference mirror positioning device control bar rim 106 at one end and the interference mirror positioning device control bar slot 107 at the other end.

The interference mirror positioning device guide pin 108 at the bottom face of the interference mirror positioning device control bar 105 fits and slides inside the interference mirror positioning device guide rail 109 in the analyzer body 66. The position of the interference mirror positioning device control bar 105 is controlled by the interference mirror positioning device control bar positioning screw 112 driven by the micro motor 98b. The interference mirror positioning device control bar positioning screw support 113 attached to the analyzer body 66 provides additional support to prevent wobbling of the interference mirror positioning device control bar positioning screw 112 as it turns.

As the micro motor 98b turns the interference mirror positioning device control bar positioning screw 112 clockwise or counterclockwise, the interference mirror positioning device control bar positioning screw 112 pulls or pushes the interference mirror positioning device control bar rim 106 attached to the interference mirror positioning device control bar 105 to the desired position. The interference mirror positioning device guide pin 108 stays restrained inside the interference mirror positioning device guide rail 109 ensuring that the interference mirror positioning device control bar 105 stays leveled and that the movement of the interference mirror positioning device control bar 105 stays restrained to the intended linear direction.

The interference mirror positioning device pin 104 fits and slides inside the interference mirror positioning device control bar slot 107. As the interference mirror positioning device control bar 105 moves up or down, the interference mirror positioning device control bar slot 107 forces the interference mirror positioning device pin 104 right or left respectively.

As the interference mirror positioning device control bar slot 107 is constructed at a small angle to the center line of the interference mirror positioning device control bar 105, a large vertical movement of the interference mirror positioning device control bar 105 is translated into a small horizontal movement of the interference mirror positioning device pin 104 in the interference mirror positioning device 101 allowing an increased level of precision in the positioning of the interference mirrors 100a and 100b with respect to the partial mirrors 99a and 99b that are fixed.

The beam stopper 114 is a moving barrier that pivots 90 degrees around the beam stopper shaft 115 located at the right edge of the beam stopper 114. The beam stopper handle 116 allows the position of the beam stopper 114 to be controlled.

The beam stopper actuator 117 has a beam stopper actuator slot 118 at a 90 degree angle in one end and the beam stopper actuator rim 119 at the other end.

The beam stopper actuator guide pin 120 at the bottom face of the beam stopper actuator 117 fits and slides inside the beam stopper actuator guide rail 121 in the analyzer body 66. The position of the beam stopper actuator 117 is controlled by the beam stopper actuator positioning screw 122 driven by the micro motor 98c. The beam stopper actuator positioning screw support 123 attached to the analyzer body 66 provides additional support to prevent wobbling of the beam stopper actuator positioning screw 122 as it turns.

As the micro motor 98c turns the beam stopper actuator positioning screw 122 clockwise or counterclockwise, the beam stopper actuator positioning screw 122 pulls or pushes the beam stopper actuator rim 119 attached to the beam stopper actuator 117 to the desired position. The beam stopper actuator guide pin 120 stays restrained inside the beam stopper actuator guide rail 121 ensuring that the beam stopper actuator 117 stays leveled and that the movement of the beam stopper actuator 117 stays restrained to the intended linear direction.

The beam stopper handle 116 fits inside the beam stopper actuator slot 118. As the beam stopper actuator 117 moves up or down, the beam stopper actuator slot 118 forces the beam stopper handle 116 to describe an arch around the beam stopper shaft 115 pivoting the beam stopper 114 in the clockwise or counterclockwise directions respectively.

The laser light exiting the optical cartridge slit 71b in the optical cartridge A 70 hits the center of the partial mirror 99a and all or a portion of the laser light is reflected towards the sampling cavity 41. The non-reflected portion of the laser light continues to the center of the interference mirror 100a and is reflected 90 degrees towards the center of the interference mirror 100b but in the position represented the transmitted part of the laser light hits the beam stopper 114 and does not reach the interference mirror 100b.

The sample spectrum of laser light further altered by the optical devices 82g and 82l exits through the optical cartridge slit 71d of the optical cartridge B 73 and continues until it reaches the center of the selection mirror 124 that is held at a precise position and at a precise angle to reflect the altered sample spectrum of laser light towards the desired region of the reflective diffraction grating 140. The reflective diffraction grating 140 is fixed, mounted at the reflective diffraction grating support 141 in the analyzer body 66.

The selection mirror 124 is mounted on the selection mirror rail 127 by means of inserting the selection mirror pivoting shaft 125 into the selection mirror rail central pivot 128 and the selection mirror angle control handle 126 into the selection mirror rail guide slot 129 in the selection mirror rail 127.

As the selection mirror 124 pivots around the selection mirror rail central pivot 128, the range of movement of the selection mirror angle control handle 126 is limited by the selection mirror rail guide slot 129 restricting the range of pivoting movement of the selection mirror 124.

The selection mirror rail 127 is also fitted with the selection mirror rail nut 130 and one pair of selection mirror rail alignment pins 131a and 131b underneath that fit and slide inside one corresponding pair of selection mirror rail alignment guides 132a and 132b respectively on the analyzer body 66.

The position of the selection mirror rail 127 is controlled by the selection mirror rail positioning screw 133 driven by the micro motor 98d. As the micro motor 98d turns the selection mirror rail positioning screw 133 clockwise or counterclockwise, the selection mirror rail positioning screw 133 pulls or pushes the selection mirror rail nut 130 attached to the selection mirror rail 127 to the desired position. The selection mirror rail alignment pins 131a and 131b stay restrained inside the respective selection mirror rail alignment guides 132a and 132b on the analyzer body 66 ensuring that the selection mirror rail 127 stays leveled and that the movement of the selection mirror rail 127 stays restrained to the intended linear direction.

The selection mirror rail positioning screw support 134 attached to the analyzer body 66 provides additional support to prevent wobbling of the selection mirror rail positioning screw 133 as it turns.

The angle of the selection mirror 124 is controlled by the position of the selection mirror angle control actuator 135 that is fitted with the selection mirror angle control actuator slot 136 and the selection mirror angle control actuator nut 137. The position of the selection mirror angle control actuator 135 is controlled by the selection mirror angle control actuator positioning screw 138 driven by the micro motor 98e. The selection mirror angle control handle 126 fits and is held inside the selection mirror rail guide slot 129 on the selection mirror rail 127 and the selection mirror angle control actuator slot 136 on the selection mirror angle control actuator 135.

As the micro motor 98e turns the selection mirror angle control actuator positioning screw 138 clockwise or counterclockwise, the selection mirror angle control actuator positioning screw 138 pulls or pushes the selection mirror angle control actuator nut 137 attached to the selection mirror angle control actuator 135 to the desired position. As the selection mirror angle control actuator 135 moves, the selection mirror angle control actuator slot 136 forces the selection mirror angle control handle 126 to slide and assume the position defined by the intersection of the selection mirror rail guide slot 129 and the selection mirror angle control actuator slot 136 pivoting the selection mirror 124 to the desired amount.

The selection mirror angle control actuator positioning screw support 139 attached to the selection mirror rail 127 provides additional support to prevent wobbling of the selection mirror angle control actuator positioning screw 138 as it turns.

The altered sample spectrum laser light that is diffracted by the reflective diffraction grating 140 continues until it reaches the center of the moving detector 142 that is held at the optimum precise position and at the optimum precise angle to receive and process the incoming diffracted altered sample spectrum of laser light based on the specific tests desired for the analysis of the sample.

The moving detector 142 is mounted on the moving detector rail 145 by means of inserting the moving detector pivoting shaft 143 into the moving detector rail central pivot 146 and the moving detector angle control handle 144 into the moving detector rail guide slot 147 in the moving detector rail 145.

As the moving detector 142 pivots around the moving detector rail central pivot 146, the range of movement of the moving detector angle control handle 144 is limited by the moving detector rail guide slot 147 restricting the range of pivoting movement of the moving detector 142.

The moving detector rail 145 is also fitted with the moving detector rail nut 148 and one pair of moving detector rail alignment pins 149a and 149b underneath that fit and slide inside one corresponding pair of moving detector rail alignment guides 150a and 150b respectively on the analyzer body 66.

The position of the moving detector rail 145 is controlled by the moving detector rail positioning screw 151 driven by the micro motor 98f. As the micro motor 98f turns the moving detector rail positioning screw 151 clockwise or counterclockwise, the moving detector rail positioning screw 151 pulls or pushes the moving detector rail nut 148 attached to the moving detector rail 145 to the desired position. The moving detector rail alignment pins 149a and 149b stay restrained inside the respective moving detector rail alignment guides 150a and 150b on the analyzer body 66 ensuring that the moving detector rail 145 stays leveled and that the movement of the moving detector rail 145 stays restrained to the intended linear direction.

The moving detector rail positioning screw support 152 attached to the analyzer body 66 provides additional support to prevent wobbling of the moving detector rail positioning screw 151 as it turns.

The angle of the moving detector 142 is controlled by the position of the moving detector rail angle control actuator 153 that is fitted with the moving detector rail angle control actuator slot 154 and the moving detector rail angle control actuator nut 155. The position of the moving detector rail angle control actuator 153 is controlled by the moving detector rail angle control actuator positioning screw 156 driven by the micro motor 98g. The moving detector angle control handle 144 fits and is held inside the moving detector rail guide slot 147 on the moving detector rail 145 and the moving detector rail angle control actuator slot 154 on the moving detector rail angle control actuator 153.

As the micro motor 98g turns the moving detector rail angle control actuator positioning screw 156 clockwise or counterclockwise, the moving detector rail angle control actuator positioning screw 156 pulls or pushes the moving detector rail angle control actuator nut 155 attached to the moving detector rail angle control actuator 153 to the desired position. As the moving detector rail angle control actuator 153 moves, the moving detector rail angle control actuator slot 154 forces the moving detector angle control handle 144 to slide and assume the position defined by the intersection of the moving detector rail guide slot 147 and the moving detector rail angle control actuator slot 154 pivoting the moving detector 142 the desired amount.

The moving detector rail angle control actuator positioning screw support 157 attached to the moving detector rail 145 provides additional support to prevent wobbling of the moving detector rail angle control actuator positioning screw 156 as it turns.

The electronic boards 159a and 159b contain all the electronics necessary to operate the analyzer device 65 performing all tasks including but not limited to the control of all components, connection to the internet and other devices, storage of information downloaded from the internet or generated inside the analyzer device 65 as results of tests or calculations, processing of the information, preparation of reports and presentations of the results. The battery 160 provides the energy to run the analyzer device 65 and perform all the functions for the desired duration of the operation. The battery 160 must be recharged from time to time using a standard AC to DC charger.

Detail FIG. 11A shows the reflective diffraction grating 140 mounted at the reflective diffraction grating support 141 in greater magnification to show the path that light rays hitting the three regions of the reflective diffraction grating 140 follow.

The first region located in the center of the reflective diffraction grating 140 is constructed with medium standard indentations 161 adequate to refract the wavelengths of visible light. One visible laser light incident ray 164 coming from the selection mirror 124 hits the reflective diffraction grating 140 at a 90 degree angle. As the medium standard indentations 161 have a triangular cross section, the visible laser light incident ray 164 is partially reflected at an angle less than 90 degrees to the reflective diffraction grating 140 and one visible laser light reflected ray 165 is produced. One visible laser light diffracted ray 166 is produced at the first diffraction angle.

The moving detector 142 is positioned at the optimum position and at the optimum angle to capture the visible laser light diffracted ray 166 and allow the visible laser light reflected ray 165 to miss and pass to the right of the moving detector 142.

The second region located at the left of the reflective diffraction grating 140 is constructed with coarse deeper indentations 162 adequate to refract the wavelengths of infrared light. One infrared laser light incident ray 167 coming from the selection mirror 124 hits the reflective diffraction grating 140 at a 90 degree angle. As the coarse deeper indentations 162 have a triangular cross section, the infrared laser light incident ray 167 is partially reflected at an angle less than 90 degrees to the reflective diffraction grating 140 and one infrared laser light reflected ray 168 is produced. One infrared laser light diffracted ray 169 is produced at the first diffraction angle. As the infrared light has a longer wavelength than the visible light, the first diffraction angle of the infrared light occurs at a slightly larger angle than the first diffraction angle of the visible light. The difference can be ascertained using the parallel direction to the visible laser light diffracted ray 170a drawn in Detail FIG. 11A.

The moving detector 142 is positioned at the optimum position and at the optimum angle taking into account the slightly larger angle of diffraction of the infrared light to capture the infrared laser light diffracted ray 169 and allow the infrared laser light reflected ray 168 to miss and pass to the right of the moving detector 142.

The second region of the reflective diffraction grating 140 with coarse deeper indentations 162 is designed to be located at the left side of the reflective diffraction grating 140, closer to the moving detector 142 than the other regions because the larger angle of diffraction of the infrared light causes the infrared laser light reflected ray 168 and the infrared laser light diffracted ray 169 to diverge more rapidly enabling the infrared laser light reflected ray 168 to miss the moving detector 142 despite the shorter travel distance available.

The third region located at the right of the reflective diffraction grating 140 is constructed with fine shallower indentations 163 adequate to refract the wavelengths of ultraviolet light. One ultraviolet laser light incident ray 171 coming from the selection mirror 124 hits the reflective diffraction grating 140 at a 90 degree angle. As the fine shallower indentations 163 have a triangular cross section, the ultraviolet laser light incident ray 171 is partially reflected at an angle less than 90 degrees to the reflective diffraction grating 140 and one ultraviolet laser light reflected ray 172 is produced. One ultraviolet laser light diffracted ray 173 is produced at the first diffraction angle. As the ultraviolet light has a shorter wavelength than the visible light, the first diffraction angle of the ultraviolet light occurs at a slightly smaller angle than the first diffraction angle of the visible light. The difference can be ascertained using the parallel direction to the visible laser light diffracted ray 170b drawn in Detail FIG. 11A.

The moving detector 142 is positioned at the optimum position and at the optimum angle taking into account the slightly smaller angle of diffraction of the ultraviolet light to capture the ultraviolet laser light diffracted ray 173 and allow the ultraviolet laser light reflected ray 172 to miss and pass to the right of the moving detector 142.

The third region of the reflective diffraction grating 140 with fine shallower indentations 163 is designed to be located at the right side of the reflective diffraction grating 140, further away from the moving detector 142 than the other regions because the smaller angle of diffraction of the ultraviolet light causes the ultraviolet laser light reflected ray 172 and the ultraviolet laser light diffracted ray 173 to diverge more slowly requiring the ultraviolet laser light reflected ray 172 to travel a longer distance to miss the moving detector 142.

FIG. 12 shows an isometric cutout view of the analyzer device 65 with the vertical walls of the analyzer body 66 cut at a small distance to the bottom base to facilitate the view of the other components of the analyzer device 65 in operation using infrared light beams without interferometry.

The laser tray 89 is positioned to select the infrared laser emitter 91, that is moved to the position in front of the optical cartridge slit 71a of the optical cartridge A 70. In this position, the laser tray guide pin 95 is at the right end of the laser tray guide rail 96.

The infrared laser emitter 91 is turned on and the infrared laser light emitted beam 174 is produced. The infrared laser light emitted beam 174 passes through the optical cartridge slit 71a, is modified by the active optical devices 82b and 82e inside the optical cartridge A 70 in this example and passes through the optical cartridge slit 71b that collimates the infrared laser light emitted beam 174 producing the infrared laser light collimated and preprocessed beam 175 that continues inside the analyzer device 65 until it hits the center of the partial mirror 99a.

The infrared laser light collimated and preprocessed beam 175 is partially reflected producing the infrared laser light beam passing through the sampling cavity 176 that passes through the center of the sampling cavity 41. The infrared laser light beam passing through the sampling cavity 176 as modified by the optical devices 82b and 82e interacts with the substances present in a sample located inside the sampling cavity 41 further altering the characteristics of the infrared laser light producing a sample spectrum of infrared laser light that continues to the center of the partial mirror 99b.

The infrared laser light collimated and preprocessed beam 175 is also partially transmitted at the partial mirror 99a producing the infrared laser light beam transmitted to interferometer 177. The infrared laser light beam transmitted to interferometer 177 continues and hits the center of the interference mirror 100a and the infrared laser light beam reflected in the interferometer 178 is produced and directed towards the center of the interference mirror 100b. The beam stopper 114 is in the interference light path resulting in the infrared laser light beam absorbed by beam stopper 179 so that none of the infrared laser light beam reflected in the interferometer 178 reaches the interference mirror 100b to be reflected towards the partial mirror 99b.

It is therefore not necessary to adjust the position of the interference mirror positioning device 101 and the interference mirror positioning device control bar 105 is left at its last position in this case with the interference mirror positioning device pin 104 positioned at the center of the interference mirror positioning device control bar slot 107.

The partial mirror 99b then reflects only the sample spectrum of infrared laser light coming from the sampling cavity 41 producing the infrared laser light modified beam 181 that is directed to the center of the optical cartridge slit 71c in the optical cartridge B 73. The infrared laser light modified beam 181 enters the optical cartridge slit 71c and is modified again by the active optical devices 82i and 82j inside the optical cartridge B 73 in this example and exits through the optical cartridge slit 71d being collimated a second time in the process of passing through the optical cartridge slits 71c and 71d resulting in the infrared laser light modified and post processed beam 182.

The infrared laser light modified and post processed beam 182 hits the center of the selection mirror 124 that is located at the right position and at the right angle to reflect the infrared laser light modified and post processed beam 182 producing the infrared laser light incident beam 183 aimed into the second region at the left side of the reflective diffraction grating 140 that is constructed with coarse deeper indentations 162 adequate to refract the wavelengths of infrared light. The reflective diffraction grating 140 produces the infrared laser light reflected beam 184 and the infrared laser light diffracted beam 185 that diverge as they follow their paths.

The infrared laser light diffracted beam 185 hits the center of the moving detector 142 that is held at the optimum precise position and at the optimum precise angle to receive and process the infrared laser light diffracted beam 185 based on the specific tests desired for the analysis of the sample. The infrared laser light reflected beam 184 on the other hand misses the moving detector 142 and is absorbed at the inner wall of the analyzer body 66 at the right side of the moving detector 142.

FIG. 13 shows an isometric cutout view of the analyzer device 65 with the vertical walls of the analyzer body 66 cut at a small distance to the bottom base to facilitate the view of the other components of the analyzer device 65 in operation using infrared light beams with interferometry.

The laser tray 89 is positioned to select the infrared laser emitter 91, that is moved to the position in front of the optical cartridge slit 71a of the optical cartridge A 70. In this position, the laser tray guide pin 95 is at the right end of the laser tray guide rail 96.

The infrared laser emitter 91 is turned on and the infrared laser light emitted beam 174 is produced. The infrared laser light emitted beam 174 passes through the optical cartridge slit 71a, is modified by the active optical devices 82b and 82e inside the optical cartridge A 70 in this example and passes through the optical cartridge slit 71b that collimates the infrared laser light emitted beam 174 producing the infrared laser light collimated and preprocessed beam 175 that continues inside the analyzer device 65 until it hits the center of the partial mirror 99a.

The infrared laser light collimated and preprocessed beam 175 is partially reflected producing the infrared laser light beam passing through the sampling cavity 176 that passes through the center of the sampling cavity 41. The infrared laser light beam passing through the sampling cavity 176 as modified by the optical devices 82b and 82e interacts with the substances present in a sample located inside the sampling cavity 41 further altering the characteristics of the infrared laser light producing a sample spectrum of infrared laser light that continues to the center of the partial mirror 99b.

The infrared laser light collimated and preprocessed beam 175 is also partially transmitted at the partial mirror 99a producing the infrared laser light beam transmitted to interferometer 177. The infrared laser light beam transmitted to interferometer 177 continues to the center of the interference mirror 100a and the infrared laser light beam reflected in the interferometer 178 is produced and directed towards the center of the interference mirror 100b. The beam stopper 114 is out of the interference light path and the infrared laser light beam reflected in the interferometer 178 is reflected at the interference mirror 100b resulting in the infrared laser light beam exiting the interferometer 180 and being directed to the partial mirror 99b.

The interference mirror positioning device control bar 105 is moved up or down accordingly and the interference mirror positioning device control bar slot 107 pulls or pushes the interference mirror positioning device pin 104 resulting in a small adjustment in the position of the interference mirror positioning device 101 that shortens or increases the length of the interferometer light path the exact amount to achieve destructive interference with the sample spectrum of infrared laser light path going through the sampling cavity 41.

The partial mirror 99b then combines the sample spectrum of infrared laser light beam passing through the sampling cavity 176 and the infrared laser light beam exiting the interferometer 180 producing the infrared laser light modified beam 181 that is directed to the center of the optical cartridge slit 71c in the optical cartridge B 73. The infrared laser light modified beam 181 enters the optical cartridge slit 71c and is modified again by the active optical devices 82i and 82*j* inside the optical cartridge B 73 in this example and exits through the optical cartridge slit 71*d* being collimated a second time in the process of passing through the optical cartridge slits 71*c* and 71*d* resulting in the infrared laser light modified and post processed beam 182.

The infrared laser light modified and post processed beam 182 hits the center of the selection mirror 124 that is located at the right position and at the right angle to reflect the infrared laser light modified and post processed beam 182 producing the infrared laser light incident beam 183 aimed into the second region at the left side of the reflective diffraction grating 140 that is constructed with coarse deeper indentations 162 adequate to refract the wavelengths of infrared light. The reflective diffraction grating 140 produces the infrared laser light reflected beam 184 and the infrared laser light diffracted beam 185 that diverge as they follow their paths.

The infrared laser light diffracted beam 185 hits the center of the moving detector 142 that is held at the optimum precise position and at the optimum precise angle to receive, detect an interference pattern, and process the infrared laser light diffracted beam 185 based on the specific tests desired for the analysis of the sample. The infrared laser light reflected beam 184 on the other hand misses the moving detector 142 and is absorbed at the inner wall of the analyzer body 66 at the right side of the moving detector 142.

FIG. 14 shows an isometric cutout view of the analyzer device 65 with the vertical walls of the analyzer body 66 cut at a small distance to the bottom base to facilitate the view of the other components of the analyzer device 65 in operation using visible light beams without interferometry.

The laser tray 89 is positioned to select the visible laser emitter 92, that is moved to the position in front of the optical cartridge slit 71*a* of the optical cartridge A 70. In this position, the laser tray guide pin 95 is at the center of the laser tray guide rail 96.

The visible laser emitter 92 is turned on and the visible laser light emitted beam 186 is produced. The visible laser light emitted beam 186 passes through the optical cartridge slit 71*a*, is modified by the active optical devices 82*a* and 82*d* inside the optical cartridge A 70 in this example and passes through the optical cartridge slit 71*b* that collimates the visible laser light emitted beam 186 producing the visible laser light collimated and preprocessed beam 187 that continues inside the analyzer device 65 until it hits the center of the partial mirror 99*a*.

The visible laser light collimated and preprocessed beam 187 is partially reflected producing the visible laser light beam passing through the sampling cavity 188 that passes through the center of the sampling cavity 41. The visible laser light beam passing through the sampling cavity 188 as modified by the optical devices 82*a* and 82*d* interacts with the substances present in a sample located inside the sampling cavity 41 further altering the characteristics of the visible laser light producing a sample spectrum of visible light that continues to the center of the partial mirror 99*b*.

The visible laser light collimated and preprocessed beam 187 is also partially transmitted at the partial mirror 99*a* producing the visible laser light beam transmitted to interferometer 189. The visible laser light beam transmitted to interferometer 189 continues and hits the center of the interference mirror 100*a* and the visible laser light beam reflected in the interferometer 190 is produced and directed towards the center of the interference mirror 100*b*. The beam stopper 114 is in the interference light path resulting in the visible laser light beam absorbed by beam stopper 191 so that none of the visible laser light beam reflected in the interferometer 190 reaches the interference mirror 100*b* to be reflected towards the partial mirror 99*b*.

It is therefore not necessary to adjust the position of the interference mirror positioning device 101 and the interference mirror positioning device control bar 105 is left at its last position in this case with the interference mirror positioning device pin 104 positioned at the center of the interference mirror positioning device control bar slot 107.

The partial mirror 99*b* then reflects only the sample spectrum of visible laser light coming from the sampling cavity 41 producing the visible laser light modified beam 193 that is directed to the center of the optical cartridge slit 71*c* in the optical cartridge B 73. The visible laser light modified beam 193 enters the optical cartridge slit 71*c* and is modified again by the active optical devices 82*g* and 82*l* inside the optical cartridge B 73 in this example and exits through the optical cartridge slit 71*d* being collimated a second time in the process of passing through the optical cartridge slits 71*c* and 71*d* resulting in the visible laser light modified and post processed beam 194.

The visible laser light modified and post processed beam 194 hits the center of the selection mirror 124 that is located at the right position and at the right angle to reflect the visible laser light modified and post processed beam 194 producing the visible laser light incident beam 195 aimed into the first region at the center of the reflective diffraction grating 140 that is constructed with medium standard indentations 161 adequate to refract the wavelengths of visible light. The reflective diffraction grating 140 produces the visible laser light reflected beam 196 and the visible laser light diffracted beam 197 that diverge as they follow their paths.

The visible laser light diffracted beam 197 hits the center of the moving detector 142 that is held at the optimum precise position and at the optimum precise angle to receive and process the visible laser light diffracted beam 197 based on the specific tests desired for the analysis of the sample. The visible laser light reflected beam 196 on the other hand misses the moving detector 142 and is absorbed at the inner wall of the analyzer body 66 at the right side of the moving detector 142.

FIG. 15 shows an isometric cutout view of the analyzer device 65 with the vertical walls of the analyzer body 66 cut at a small distance to the bottom base to facilitate the view of the other components of the analyzer device 65 in operation using visible light beams with interferometry.

The laser tray 89 is positioned to select the visible laser emitter 92, that is moved to the position in front of the optical cartridge slit 71*a* of the optical cartridge A 70. In this position, the laser tray guide pin 95 is at the center of the laser tray guide rail 96.

The visible laser emitter 92 is turned on and the visible laser light emitted beam 186 is produced. The visible laser light emitted beam 186 passes through the optical cartridge slit 71*a*, is modified by the active optical devices 82*a* and 82*d* inside the optical cartridge A 70 in this example and passes through the optical cartridge slit 71*b* that collimates the visible laser light emitted beam 186 producing the visible laser light collimated and preprocessed beam 187 that continues inside the analyzer device 65 until it hits the center of the partial mirror 99*a*.

The visible laser light collimated and preprocessed beam 187 is partially reflected producing the visible laser light beam passing through the sampling cavity 188 that passes through the center of the sampling cavity 41. The visible laser light beam passing through the sampling cavity 188 as modified by the optical devices 82*a* and 82*d* interacts with the substances present in a sample located inside the sampling cavity 41 further altering the characteristics of the visible laser light producing a sample spectrum of visible laser light that continues to the center of the partial mirror 99b.

The visible laser light collimated and preprocessed beam 187 is also partially transmitted at the partial mirror 99a producing the visible laser light beam transmitted to interferometer 189. The visible laser light beam transmitted to interferometer 189 continues to the center of the interference mirror 100a and the visible laser light beam reflected in the interferometer 190 is produced and directed towards the center of the interference mirror 100b. The beam stopper 114 is out of the interference light path and the visible laser light beam reflected in the interferometer 190 is reflected at the interference mirror 100b resulting in the visible laser light beam exiting the interferometer 192 and being directed to the partial mirror 99b.

The interference mirror positioning device control bar 105 is moved up or down accordingly and the interference mirror positioning device control bar slot 107 pulls or pushes the interference mirror positioning device pin 104 resulting in a small adjustment in the position of the interference mirror positioning device 101 that shortens or increases the length of the interferometer light path the exact amount to achieve destructive interference with the sample spectrum of visible laser light path going through the sampling cavity 41.

The partial mirror 99b then combines the sample spectrum of visible laser light beam passing through the sampling cavity 188 and the visible laser light beam exiting the interferometer 192 producing the visible laser light modified beam 193 that is directed to the center of the optical cartridge slit 71c in the optical cartridge B 73. The visible laser light modified beam 193 enters the optical cartridge slit 71c and is modified again by the active optical devices 82g and 82l inside the optical cartridge B 73 in this example and exits through the optical cartridge slit 71d being collimated a second time in the process of passing through the optical cartridge slits 71c and 71d resulting in the visible laser light modified and post processed beam 194.

The visible laser light modified and post processed beam 194 hits the center of the selection mirror 124 that is located at the right position and at the right angle to reflect the visible laser light modified and post processed beam 194 producing the visible laser light incident beam 195 aimed into the first region at the center of the reflective diffraction grating 140 that is constructed with medium standard indentations 161 adequate to refract the wavelengths of visible light. The reflective diffraction grating 140 produces the visible laser light reflected beam 196 and the visible laser light diffracted beam 197 that diverge as they follow their paths.

The visible laser light diffracted beam 197 hits the center of the moving detector 142 that is held at the optimum precise position and at the optimum precise angle to receive, detect an interference pattern, and process the visible laser light diffracted beam 197 based on the specific tests desired for the analysis of the sample. The visible laser light reflected beam 196 on the other hand misses the moving detector 142 and is absorbed at the inner wall of the analyzer body 66 at the right side of the moving detector 142.

FIG. 16 shows an isometric cutout view of the analyzer device 65 with the vertical walls of the analyzer body 66 cut at a small distance to the bottom base to facilitate the view of the other components of the analyzer device 65 in operation using ultraviolet light beams without interferometry.

The laser tray 89 is positioned to select the ultraviolet laser emitter 93, that is moved to the position in front of the optical cartridge slit 71a of the optical cartridge A 70. In this position, the laser tray guide pin 95 is at the left end of the laser tray guide rail 96.

The ultraviolet laser emitter 93 is turned on and the ultraviolet laser light emitted beam 198 is produced. The ultraviolet laser light emitted beam 198 passes through the optical cartridge slit 71a, is modified by the active optical devices 82c and 82f inside the optical cartridge A 70 in this example and passes through the optical cartridge slit 71b that collimates the ultraviolet laser light emitted beam 198 producing the ultraviolet laser light collimated and preprocessed beam 199 that continues inside the analyzer device 65 until it hits the center of the partial mirror 99a.

The ultraviolet laser light collimated and preprocessed beam 199 is partially reflected producing the ultraviolet laser light beam passing through the sampling cavity 200 that passes through the center of the sampling cavity 41. The ultraviolet laser light beam passing through the sampling cavity 200 as modified by the optical devices 82c and 82f interacts with the substances present in a sample located inside the sampling cavity 41 further altering the characteristics of the ultraviolet laser light producing a sample spectrum of ultraviolet laser light that continues to the center of the partial mirror 99b.

The ultraviolet laser light collimated and preprocessed beam 199 is also partially transmitted at the partial mirror 99a producing the ultraviolet laser light beam transmitted to interferometer 201. The ultraviolet laser light beam transmitted to interferometer 201 continues and hits the center of the interference mirror 100a and the ultraviolet laser light beam reflected in the interferometer 202 is produced and directed towards the center of the interference mirror 100b. The beam stopper 114 is in the interference light path resulting in the ultraviolet laser light beam absorbed by beam stopper 203 so that none of the ultraviolet laser light beam reflected in the interferometer 202 reaches the interference mirror 100b to be reflected towards the partial mirror 99b.

It is therefore not necessary to adjust the position of the interference mirror positioning device 101 and the interference mirror positioning device control bar 105 is left at its last position in this case with the interference mirror positioning device pin 104 positioned at the center of the interference mirror positioning device control bar slot 107.

The partial mirror 99b then reflects only the sample spectrum of ultraviolet laser light coming from the sampling cavity 41 as the ultraviolet laser light modified beam 205 that is directed to the center of the optical cartridge slit 71c in the optical cartridge B 73. The ultraviolet laser light modified beam 205 enters the optical cartridge slit 71c and is modified again by the active optical devices 82h and 82k inside the optical cartridge B 73 in this example and exits through the optical cartridge slit 71d being collimated a second time in the process of passing through the optical cartridge slits 71c and 71d resulting in the ultraviolet laser light modified and post processed beam 206.

The ultraviolet laser light modified and post processed beam 206 hits the center of the selection mirror 124 that is located at the right position and at the right angle to reflect the ultraviolet laser light modified and post processed beam 206 producing the ultraviolet laser light incident beam 207 aimed into the third region at the right side of the reflective diffraction grating 140 that is constructed with fine shallower indentations 163 adequate to refract the wavelengths of ultraviolet light. The reflective diffraction grating 140 produces the ultraviolet laser light reflected beam 208 and the ultraviolet laser light diffracted beam 209 that diverge as they follow their paths.

The ultraviolet laser light diffracted beam 209 hits the center of the moving detector 142 that is held at the optimum precise position and at the optimum precise angle to receive and process the ultraviolet laser light diffracted beam 209 based on the specific tests desired for analysis of the sample. The ultraviolet laser light reflected beam 208 on the other hand misses the moving detector 142 and is absorbed at the inner wall of the analyzer body 66 at the right side of the moving detector 142.

FIG. 17 shows an isometric cutout view of the analyzer device 65 with the vertical walls of the analyzer body 66 cut at a small distance to the bottom base to facilitate the view of the other components of the analyzer device 65 in operation using ultraviolet light beams with interferometry.

The laser tray 89 is positioned to select the ultraviolet laser emitter 93, that is moved to the position in front of the optical cartridge slit 71a of the optical cartridge A 70. In this position, the laser tray guide pin 95 is at the left end of the laser tray guide rail 96.

The ultraviolet laser emitter 93 is turned on and the ultraviolet laser light emitted beam 198 is produced. The ultraviolet laser light emitted beam 198 passes through the optical cartridge slit 71a, is modified by the active optical devices 82c and 82f inside the optical cartridge A 70 in this example and passes through the optical cartridge slit 71b that collimates the ultraviolet laser light emitted beam 198 producing the ultraviolet laser light collimated and preprocessed beam 199 that continues inside the analyzer device 65 until it hits the center of the partial mirror 99a.

The ultraviolet laser light collimated and preprocessed beam 199 is partially reflected producing the ultraviolet laser light beam passing through the sampling cavity 200 that passes through the center of the sampling cavity 41. The ultraviolet laser light beam passing through the sampling cavity 200 as modified by optical devices 82c and 82f interacts with the substances present in a sample located inside the sampling cavity 41 further altering the characteristics of the ultraviolet laser light producing a sample spectrum of ultraviolet laser light that continues to the center of the partial mirror 99b.

The ultraviolet laser light collimated and preprocessed beam 199 is also partially transmitted at the partial mirror 99a producing the ultraviolet laser light beam transmitted to interferometer 201. The ultraviolet laser light beam transmitted to interferometer 201 continues and hits the center of the interference mirror 100a and the ultraviolet laser light beam reflected in the interferometer 202 is produced and directed towards the center of the interference mirror 100b. The beam stopper 114 is out of the interference light path and the ultraviolet laser light beam reflected in the interferometer 202 is reflected at the interference mirror 100b resulting in the ultraviolet laser light beam exiting the interferometer 204 and being directed to the partial mirror 99b.

The interference mirror positioning device control bar 105 is moved up or down accordingly and the interference mirror positioning device control bar slot 107 pulls or pushes the interference mirror positioning device pin 104 resulting in a small adjustment in the position of the interference mirror positioning device 101 that shortens or increases the length of the interferometer light path the exact amount to achieve destructive interference with the sample spectrum of ultraviolet laser light path going through the sampling cavity 41.

The partial mirror 99b then combines the sample spectrum of ultraviolet laser light beam passing through the sampling cavity 200 and the ultraviolet laser light beam exiting the interferometer 204 producing the ultraviolet laser light modified beam 205 that is directed to the center of the optical cartridge slit 71c in the optical cartridge B 73. The ultraviolet laser light modified beam 205 enters the optical cartridge slit 71c and is modified again by the active optical devices 82h and 82k inside the optical cartridge B 73 in this example and exits through the optical cartridge slit 71d being collimated a second time in the process of passing through the optical cartridge slits 71c and 71d resulting in the ultraviolet laser light modified and post processed beam 206.

The ultraviolet laser light modified and post processed beam 206 hits the center of the selection mirror 124 that is located at the right position and at the right angle to reflect the ultraviolet laser light modified and post processed beam 206 producing the ultraviolet laser light incident beam 207 aimed into the third region at the right side of the reflective diffraction grating 140 that is constructed with fine shallower indentations 163 adequate to refract the wavelengths of ultraviolet light. The reflective diffraction grating 140 produces the ultraviolet laser light reflected beam 208 and the ultraviolet laser light diffracted beam 209 that diverge as they follow their paths.

The ultraviolet laser light diffracted beam 209 hits the center of the moving detector 142 that is held at the optimum precise position and at the optimum precise angle to receive, detect an interference pattern, and process the ultraviolet laser light diffracted beam 209 based on the specific tests desired for the analysis of the sample. The ultraviolet laser light reflected beam 208 on the other hand misses the moving detector 142 and is absorbed at the inner wall of the analyzer body 66 at the right side of the moving detector 142.

Second Embodiment

Figure 18:
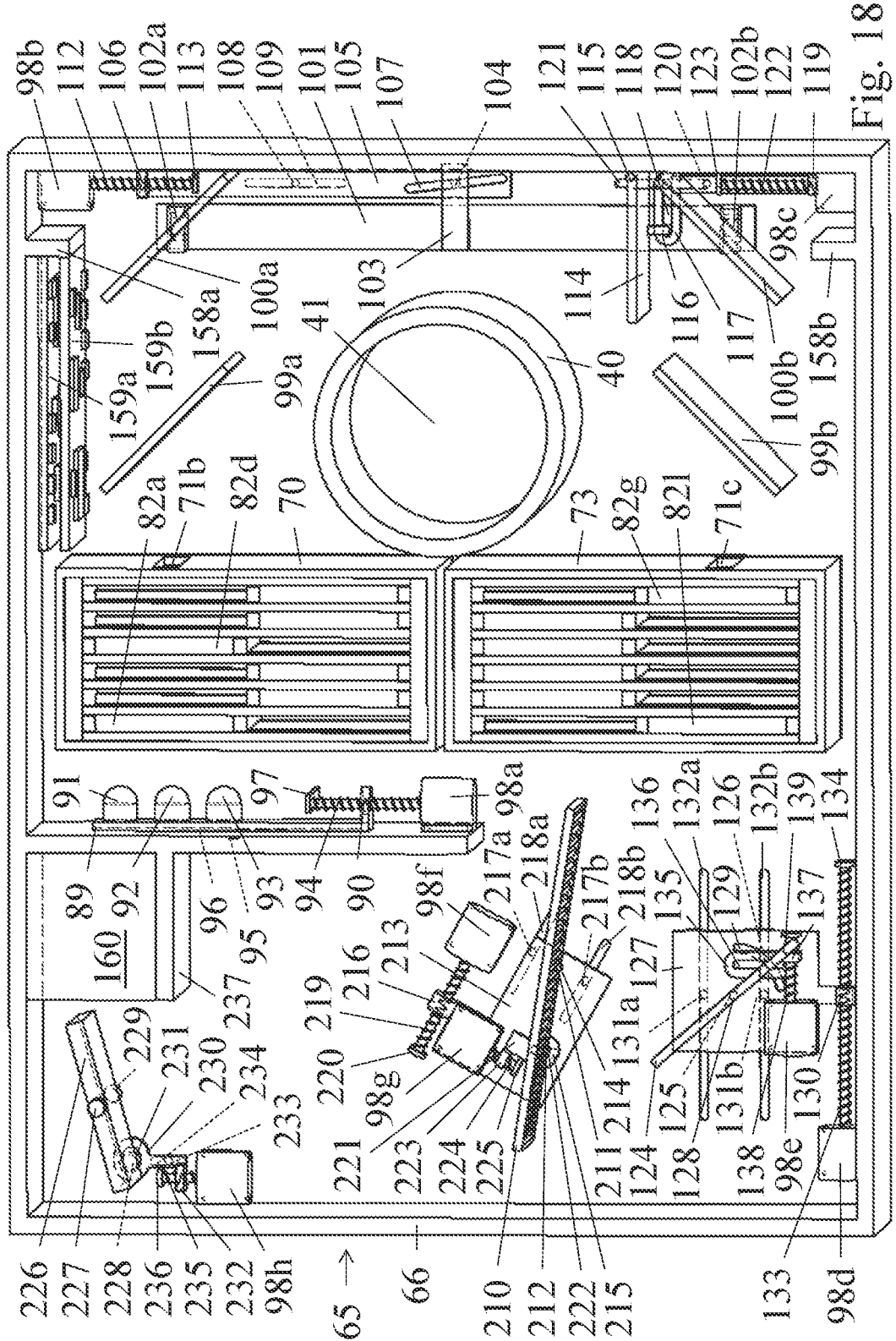
FIG. 18 is an isometric top view of a second embodiment of the analyzer device of the present invention showing internal components.

FIG. 18 shows an isometric top view of the second embodiment of the analyzer device 65 of the present invention with the analyzer lid 67 removed to show the internal components inside the analyzer body 66.

The second embodiment of the analyzer device 65 uses a transmission diffraction grating 210 instead of the reflective diffraction grating 140 used in the first embodiment. As the diffraction grating is a key component, some components and the layout of the analyzer device 65 are adjusted to cope with this change. Many components of the second embodiment of the analyzer device 65 remain the same and the descriptions of FIG. 1, FIG. 1A, FIG. 1B, FIG. 1C, FIG. 2, FIG. 3, FIG. 4, FIG. 5, FIG. 6, and FIG. 7 are the same for both embodiments.

The sampling cavity 41 inside the sampling window 40 is at the centerline of the analyzer device 65. The optical cartridge A 70 and the optical cartridge B 73 are shown without their respective optical cartridge lids 72 to allow the view of their respective optical devices 82. In the position shown in FIG. 18 the optical devices 82a and 82d in the optical cartridge A 70 and the optical devices 82g and 82l in the optical cartridge B 73 are active.

The laser tray 89 with the laser tray rim 90 provides support and positioning for the set of laser diodes: the infrared laser emitter 91, the visible laser emitter 92, and the ultraviolet laser emitter 93.

The laser tray guide pin 95 at the opposite face of the laser tray 89 that contains the set of laser diodes fits and slides inside the laser tray guide rail 96 in the analyzer body 66. The position of the laser tray 89 is controlled by the laser tray positioning screw 94 driven by the micro motor 98*a*.

The laser tray positioning screw support 97 attached to the analyzer body 66 provides additional support to prevent wobbling of the laser tray positioning screw 94 as it turns.

As the micro motor 98*a* turns the laser tray positioning screw 94 clockwise or counterclockwise, the laser tray positioning screw 94 pulls or pushes the laser tray rim 90 attached to the laser tray 89 to the desired position. The laser tray guide pin 95 stays restrained inside the laser tray guide rail 96 ensuring that the laser tray 89 stays leveled and that the movement of the laser tray 89 stays restrained to the intended linear direction.

In the position shown in FIG. 18 the laser tray 89 is positioned in such a way that the visible laser emitter 92 is located in front of the optical cartridge slits 71*a* and 71*b* of the optical cartridge A 70 or stated in a more concise way, the visible laser emitter 92 is selected. As the optical cartridge slits 71*a* and 71*b* are in the same line, to avoid clutter only the optical cartridge slit 71*b* is indicated (see FIG. 20). When the visible laser emitter 92 is turned on, the emitted visible laser light passes through the optical cartridge slit 71*a* in front of the visible laser emitter 92, gets modified by the active optical devices 82*a* and 82*d* inside the optical cartridge A 70 in this example and passes through the optical cartridge slit 71*b*. The visible laser light is also collimated as it passes through both optical cartridge slits 71*a* and 71*b* and continues inside the analyzer device 65 following a controlled path.

One pair of partial mirrors 99*a* and 99*b* is placed facing the sampling window 40 at a 90 degree angle with respect to each other and with the center of the partial mirror 99*a* positioned at a 45 degree angle to the path of the laser light exiting the optical cartridge slit 71*b* in the optical cartridge A 70.

The laser light exiting the optical cartridge slit 71*b* in the optical cartridge A 70 hits the center of the partial mirror 99*a* causing the reflected part to pass through the center of the sampling cavity 41. The laser light as modified by the optical devices 82*a* and 82*d* interacts with the substances present in a sample located inside the sampling cavity 41 further altering the characteristics of the laser light producing a sample spectrum of laser light that continues to the center of the partial mirror 99*b*. The partial mirror 99*b* then reflects the sample spectrum of laser light to the center of the optical cartridge slit 71*c* in the optical cartridge B 73.

The sample spectrum of laser light enters the optical cartridge slit 71*c* and is modified again by the active optical devices 82*g* and 82*l* inside the optical cartridge B 73 in this example and exits through the optical cartridge slit 71*d* being collimated a second time in the process of passing through the optical cartridge slits 71*c* and 71*d*. As the optical cartridge slits 71*c* and 71*d* are in the same line, to avoid clutter only the optical cartridge slit 71*c* is indicated (see FIG. 20).

The pair of interference mirrors 100*a* and 100*b* is mounted on the interference mirror positioning device 101 in one pair of mirror supports 102*a* and 102*b* in such a way that the interference mirrors 100*a* and 100*b* are at a 90 degree angle with respect to each other. The interference mirror positioning device arm 103 attached to the center of the top face of the interference mirror positioning device 101 extends some length to the right and is linked to the interference mirror positioning device pin 104 that extends towards the bottom and reaches the level of the bottom face of the interference mirror positioning device 101.

FIG. 18 also shows the interference mirror positioning device control bar 105 located parallel to the interference mirror positioning device 101 that is fitted with the interference mirror positioning device control bar rim 106 at one end and the interference mirror positioning device control bar slot 107 at the other end.

The interference mirror positioning device guide pin 108 at the bottom face of the interference mirror positioning device control bar 105 fits and slides inside the interference mirror positioning device guide rail 109 in the analyzer body 66. The position of the interference mirror positioning device control bar 105 is controlled by the interference mirror positioning device control bar positioning screw 112 driven by the micro motor 98*b*. The interference mirror positioning device control bar positioning screw support 113 attached to the analyzer body 66 provides additional support to prevent wobbling of the interference mirror positioning device control bar positioning screw 112 as it turns.

As the micro motor 98*b* turns the interference mirror positioning device control bar positioning screw 112 clockwise or counterclockwise, the interference mirror positioning device control bar positioning screw 112 pulls or pushes the interference mirror positioning device control bar rim 106 attached to the interference mirror positioning device control bar 105 to the desired position. The interference mirror positioning device guide pin 108 stays restrained inside the interference mirror positioning device guide rail 109 ensuring that the interference mirror positioning device control bar 105 stays leveled and that the movement of the interference mirror positioning device control bar 105 stays restrained to the intended linear direction.

The interference mirror positioning device pin 104 fits and slides inside the interference mirror positioning device control bar slot 107. As the interference mirror positioning device control bar 105 moves up or down, the interference mirror positioning device control bar slot 107 forces the interference mirror positioning device pin 104 right or left respectively.

As the interference mirror positioning device control bar slot 107 is constructed at a small angle to the center line of the interference mirror positioning device control bar 105, a large vertical movement of the interference mirror positioning device control bar 105 is translated into a small horizontal movement of the interference mirror positioning device pin 104 in the interference mirror positioning device 101 allowing an increased level of precision in the positioning of the interference mirrors 100*a* and 100*b* with respect to the partial mirrors 99*a* and 99*b* that are fixed.

The beam stopper 114 is a moving barrier that pivots 90 degrees around the beam stopper shaft 115 located at the right edge of the beam stopper 114. The beam stopper handle 116 allows the position of the beam stopper 114 to be controlled.

The beam stopper actuator 117 has a beam stopper actuator slot 118 at a 90 degree angle in one end and the beam stopper actuator rim 119 at the other end.

The beam stopper actuator guide pin 120 at the bottom face of the beam stopper actuator 117 fits and slides inside the beam stopper actuator guide rail 121 in the analyzer body 66. The position of the beam stopper actuator 117 is controlled by the beam stopper actuator positioning screw 122 driven by the micro motor 98*c*. The beam stopper actuator positioning screw support 123 attached to the analyzer body 66 provides additional support to prevent wobbling of the beam stopper actuator positioning screw 122 as it turns.

As the micro motor 98*c* turns the beam stopper actuator positioning screw 122 clockwise or counterclockwise, the beam stopper actuator positioning screw 122 pulls or pushes the beam stopper actuator rim 119 attached to the beam stopper actuator 117 to the desired position. The beam stopper actuator guide pin 120 stays restrained inside the beam stopper actuator guide rail 121 ensuring that the beam stopper actuator 117 stays leveled and that the movement of the beam stopper actuator 117 stays restrained to the intended linear direction.

The beam stopper handle 116 fits inside the beam stopper actuator slot 118. As the beam stopper actuator 117 moves up or down, the beam stopper actuator slot 118 forces the beam stopper handle 116 to describe an arch around the beam stopper shaft 115 pivoting the beam stopper 114 in the clockwise or counterclockwise directions respectively.

The laser light exiting the optical cartridge slit 71*b* in the optical cartridge A 70 hits the center of the partial mirror 99*a* and the transmitted part continues until it hits the center of the interference mirror 100*a* and is reflected 90 degrees towards the center of the interference mirror 100*b* but in the position shown in FIG. 18 the transmitted part of the laser light hits the beam stopper 114 and does not reach the interference mirror 100*b*.

FIG. 18 also shows the selection mirror 124 that is fitted with the selection mirror pivoting shaft 125 at the center and the selection mirror angle control handle 126 at a distance to the selection mirror pivoting shaft 125.

The selection mirror 124 is mounted on the selection mirror rail 127 by means of inserting the selection mirror pivoting shaft 125 into the selection mirror rail central pivot 128 and the selection mirror angle control handle 126 into the selection mirror rail guide slot 129 in the selection mirror rail 127.

As the selection mirror 124 pivots around the selection mirror rail central pivot 128, the range of movement of the selection mirror angle control handle 126 is limited by the selection mirror rail guide slot 129 restricting the range of pivoting movement of the selection mirror 124.

The selection mirror rail 127 is also fitted with the selection mirror rail nut 130 and one pair of selection mirror rail alignment pins 131*a* and 131*b* underneath that fit and slide inside one corresponding pair of selection mirror rail alignment guides 132*a* and 132*b* respectively on the analyzer body 66.

The position of the selection mirror rail 127 is controlled by the selection mirror rail positioning screw 133 driven by the micro motor 98*d*. As the micro motor 98*d* turns the selection mirror rail positioning screw 133 clockwise or counterclockwise, the selection mirror rail positioning screw 133 pulls or pushes the selection mirror rail nut 130 attached to the selection mirror rail 127 to the desired position. The selection mirror rail alignment pins 131*a* and 131*b* stay restrained inside the respective selection mirror rail alignment guides 132*a* and 132*b* on the analyzer body 66 ensuring that the selection mirror rail 127 stays leveled and that the movement of the selection mirror rail 127 stays restrained to the intended linear direction.

The selection mirror rail positioning screw support 134 attached to the analyzer body 66 provides additional support to prevent wobbling of the selection mirror rail positioning screw 133 as it turns.

The angle of the selection mirror 124 is controlled by the position of the selection mirror angle control actuator 135 that is fitted with the selection mirror angle control actuator slot 136 and the selection mirror angle control actuator nut 137. The position of the selection mirror angle control actuator 135 is controlled by the selection mirror angle control actuator positioning screw 138 driven by the micro motor 98*e*. The selection mirror angle control handle 126 fits and is held inside the selection mirror rail guide slot 129 on the selection mirror rail 127 and the selection mirror angle control actuator slot 136 on the selection mirror angle control actuator 135.

As the micro motor 98*e* turns the selection mirror angle control actuator positioning screw 138 clockwise or counterclockwise, the selection mirror angle control actuator positioning screw 138 pulls or pushes the selection mirror angle control actuator nut 137 attached to the selection mirror angle control actuator 135 to the desired position. As the selection mirror angle control actuator 135 moves, the selection mirror angle control actuator slot 136 forces the selection mirror angle control handle 126 to slide and assume the position defined by the intersection of the selection mirror rail guide slot 129 and the selection mirror angle control actuator slot 136 pivoting the selection mirror 124 the desired amount.

The selection mirror angle control actuator positioning screw support 139 attached to the selection mirror rail 127 provides additional support to prevent wobbling of the selection mirror angle control actuator positioning screw 138 as it turns.

The laser light that exits through the optical cartridge slit 71*d* of the optical cartridge B 73 continues until it reaches the center of the selection mirror 124 that is held at a precise position and at a precise angle to reflect the incoming sample spectrum of laser light towards the desired region of a transmission diffraction grating 210.

The transmission diffraction grating 210 has a transmission diffraction grating pivoting shaft 211 at the center and a transmission diffraction grating angle control handle 212 at a distance to the transmission diffraction grating pivoting shaft 211.

The transmission diffraction grating 210 is mounted on a transmission diffraction grating rail 213 by means of inserting the transmission diffraction grating pivoting shaft 211 into a transmission diffraction grating rail central pivot 214 and the transmission diffraction grating angle control handle 212 into a transmission diffraction grating rail guide slot 215 in the transmission diffraction grating rail 213.

As the transmission diffraction grating 210 pivots around the transmission diffraction grating rail central pivot 214, the range of movement of the transmission diffraction grating angle control handle 212 is limited by the transmission diffraction grating rail guide slot 215 restricting the range of pivoting movement of the transmission diffraction grating 210.

The transmission diffraction grating rail 213 also has a transmission diffraction grating rail nut 216 and a pair of transmission diffraction grating rail alignment pins 217*a* and 217*b* underneath that fit and slide inside a corresponding pair of transmission diffraction grating rail alignment guides 218*a* and 218*b* respectively on the analyzer body 66.

The position of the transmission diffraction grating rail 213 is controlled by a transmission diffraction grating rail positioning screw 219 driven by the micro motor 98*f*. As the micro motor 98*f* turns the transmission diffraction grating rail positioning screw 219 clockwise or counterclockwise, the transmission diffraction grating rail positioning screw 219 pulls or pushes the transmission diffraction grating rail nut 216 attached to the transmission diffraction grating rail 213 to the desired position. The transmission diffraction grating rail alignment pins 217*a* and 217*b* stay restrained inside the respective transmission diffraction grating rail alignment guides 218*a* and 218*b* on the analyzer body 66 ensuring that the transmission diffraction grating rail 213 stays leveled and that the movement of the transmission diffraction grating rail 213 stays restrained to the intended linear direction.

A transmission diffraction grating rail positioning screw support 220 attached to the analyzer body 66 provides additional support to prevent wobbling of the transmission diffraction grating rail positioning screw 219 as it turns.

Figure 21A:
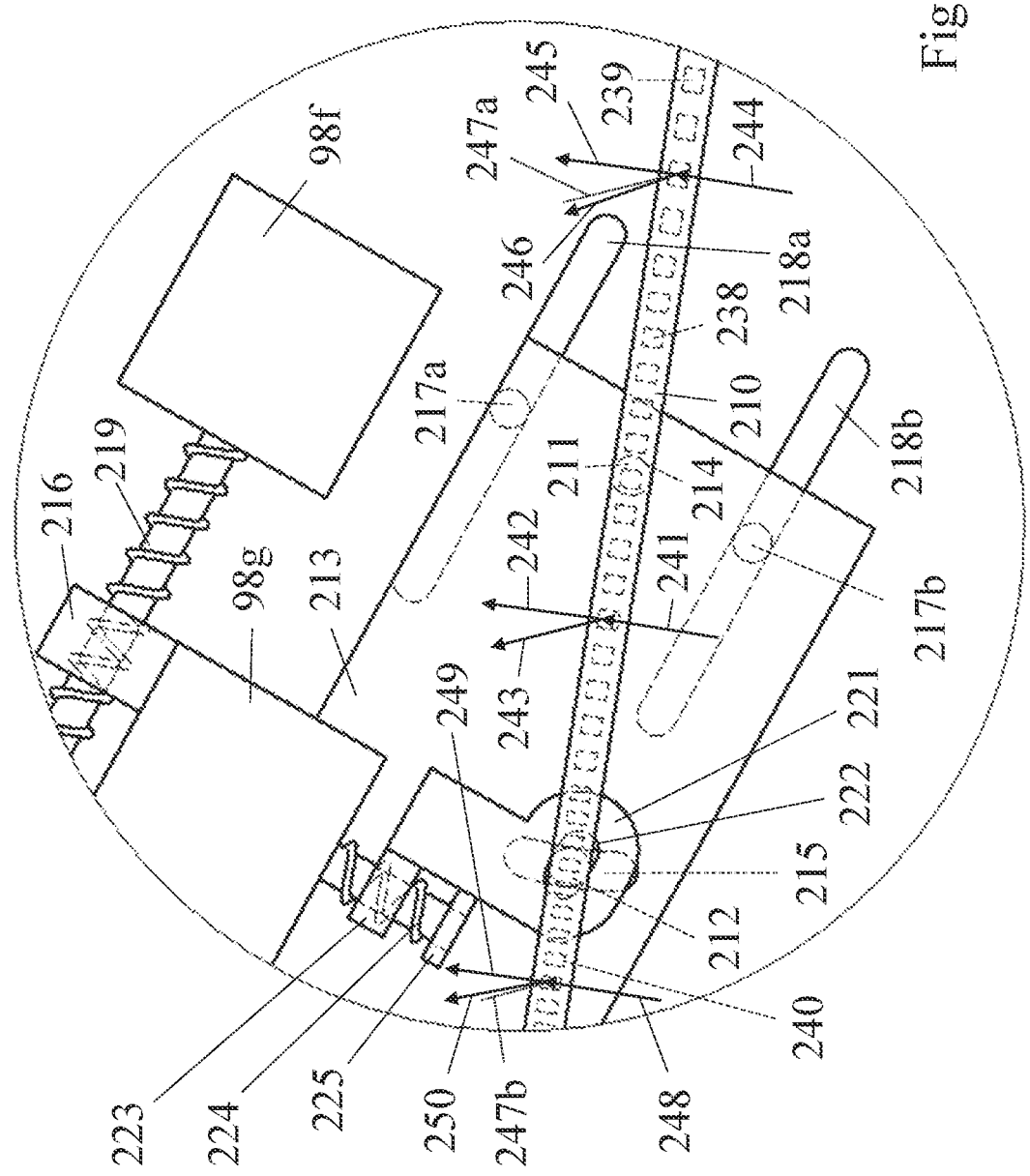
FIG. 21A is a detailed view of the transmission diffraction grating of the present invention showing the direction of reflection and diffraction of light rays through and away from the transmission diffraction grating.

The angle of the transmission diffraction grating 210 is controlled by the position of a transmission diffraction grating angle control actuator 221 that has a transmission diffraction grating angle control actuator slot 222 and a transmission diffraction grating angle control actuator nut 223 (see Detail FIG. 21A).

The position of the transmission diffraction grating angle control actuator 221 is controlled by a transmission diffraction grating angle control actuator positioning screw 224 driven by the micro motor 98g. The transmission diffraction grating angle control handle 212 fits and is held inside the transmission diffraction grating rail guide slot 215 on the transmission diffraction grating rail 213 and the transmission diffraction grating angle control actuator slot 222 on the transmission diffraction grating angle control actuator 221.

As the micro motor 98g turns the transmission diffraction grating angle control actuator positioning screw 224 clockwise or counterclockwise, the transmission diffraction grating angle control actuator positioning screw 224 pulls or pushes the transmission diffraction grating angle control actuator nut 223 attached to the transmission diffraction grating angle control actuator 221 to the desired position. As the transmission diffraction grating angle control actuator 221 moves, the transmission diffraction grating angle control actuator slot 222 forces the transmission diffraction grating angle control handle 212 to slide and assume the position defined by the intersection of the transmission diffraction grating rail guide slot 215 and the transmission diffraction grating angle control actuator slot 222 pivoting the transmission diffraction grating 210 the desired amount (see Detail FIG. 21A).

A transmission diffraction grating angle control actuator positioning screw support 225 attached to the transmission diffraction grating rail 213 provides additional support to prevent wobbling of the transmission diffraction grating angle control actuator positioning screw 224 as it turns.

The laser light that is diffracted by the transmission diffraction grating 210 continues until it reaches the center of a pivoting detector 226 that is held at the optimum precise angle to receive and process the incoming diffracted laser light.

The pivoting detector 226 has a pivoting detector pivoting shaft 227 at the center and a pivoting detector angle control handle 228 at a distance to the pivoting detector pivoting shaft 227.

The pivoting detector pivoting shaft 227 is inserted into a pivoting detector insertion hole 229 in the analyzer body 66. The pivoting detector insertion hole 229 provides the fixed axis around which the pivoting detector 226 is able to pivot.

A pivoting detector angle control actuator 230 has a pivoting detector angle control actuator slot 231 at a 90 degree angle in one end and a pivoting detector angle control actuator nut 232 at the other end.

The pivoting detector angle control actuator 230 also has a pivoting detector angle control actuator guide pin 233 at the bottom face that fits and slides inside a pivoting detector angle control actuator guide rail 234 in the analyzer body 66.

The position of the pivoting detector angle control actuator 230 is controlled by a pivoting detector angle control actuator positioning screw 235 driven by the micro motor 98h. As the micro motor 98h turns the pivoting detector angle control actuator positioning screw 235 clockwise or counterclockwise, the pivoting detector angle control actuator positioning screw 235 pulls or pushes the pivoting detector angle control actuator nut 232 attached to the pivoting detector angle control actuator 230 to the desired position.

The pivoting detector angle control actuator guide pin 233 stays restrained inside the pivoting detector angle control actuator guide rail 234 ensuring that the pivoting detector angle control actuator 230 stays leveled and that the movement of the pivoting detector angle control actuator 230 stays restrained to the intended linear direction.

A pivoting detector angle control actuator positioning screw support 236 attached to the analyzer body 66 provides additional support to prevent wobbling of the pivoting detector angle control actuator positioning screw 235 as it turns.

The pivoting detector angle control handle 228 fits inside the pivoting detector angle control actuator slot 231. As the pivoting detector angle control actuator 230 moves up or down, the pivoting detector angle control actuator slot 231 forces the pivoting detector angle control handle 228 to describe an arch around the pivoting detector pivoting shaft 227 pivoting the pivoting detector 226 in the clockwise or counterclockwise directions respectively.

FIG. 18 also shows the case fixation supports 158a and 158b located at the rims of the analyzer body 66 away from the light path that are available to hold additional components. The case fixation support 158a provides fixation support to one set of electronic boards 159a and 159b that contain all the electronics necessary to operate the analyzer device 65 performing all tasks including but not limited to the control of all components, connection to the internet and other devices, storage of information downloaded from the internet or generated inside the analyzer device 65 as results of tests or calculations, processing of the information, preparation of reports and presentations of the results.

The battery 160 provides the energy to run the analyzer device 65 and perform all the functions for the duration that the analyzer device 65 is switched on. The battery 160 must be recharged from time to time using a standard AC to DC charger.

The unused case fixation support 158b can be used to provide support for the installation of additional electronic boards 159 or one additional battery 160 in the event that a future upgrade of the analyzer device 65 requires more electronics or power respectively.

A laser absorption barrier 237 is placed in front of the battery 160 to absorb any laser beam that would otherwise hit the battery 160 potentially causing undesired heating or damage to the battery 160.

Figure 19:
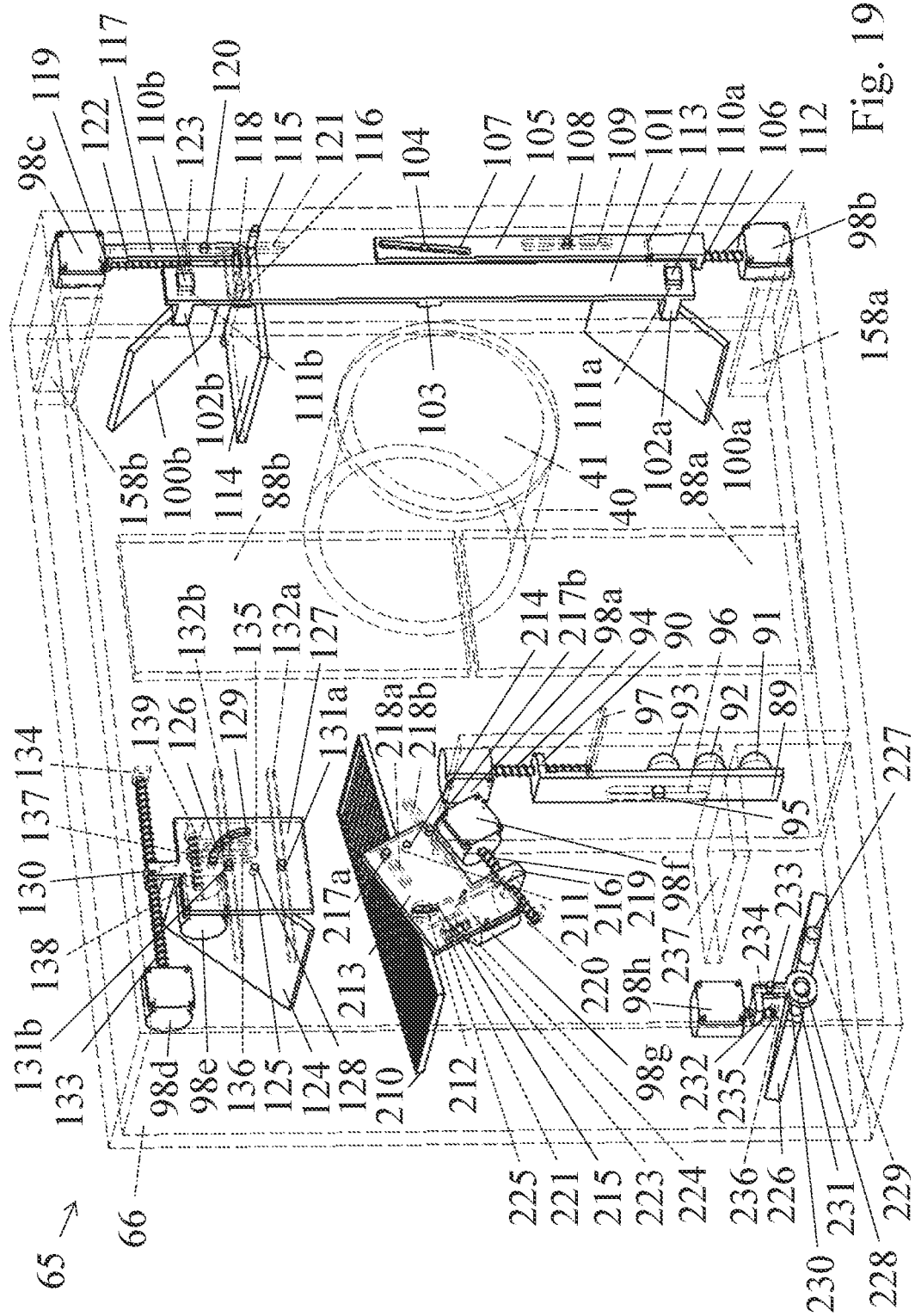
FIG. 19 is an isometric bottom view of the second embodiment of the analyzer device of the present invention showing moving components.

FIG. 19 shows an isometric view of the moving components of the analyzer device 65 seen from below with the analyzer body 66 drawn transparent in dash dotted lines to allow better visualization of the underside of the moving components and provides another viewing angle to the analyzer device 65 to show additional detail.

The sampling cavity 41 inside the sampling window 40 is at the centerline of the analyzer device 65. The cartridge installation sites 88a and 88b where the optical cartridge A 70 and the optical cartridge B 73 are installed are located next to the sampling window 40.

The laser tray 89 with the laser tray rim 90 provides support and positioning for the set of laser diodes: the infrared laser emitter 91, the visible laser emitter 92, and the ultraviolet laser emitter 93.

The pair of interference mirrors 100*a* and 100*b* is mounted on the interference mirror positioning device 101 in one pair of mirror supports 102*a* and 102*b* in such a way that the interference mirrors 100*a* and 100*b* are at a 90 degree angle with respect to each other. The interference mirror positioning device arm 103 attached to the center of the top face of the interference mirror positioning device 101 extends some length to the right and is linked to the interference mirror positioning device pin 104 that extends towards the bottom and reaches the level of the bottom face of the interference mirror positioning device 101.

The interference mirror positioning device 101 also has one pair of interference mirror positioning device guide pins 110*a* and 110*b* that fit and slide inside one pair of interference mirror positioning device guide slots 111*a* and 111*b* in the analyzer body 66 allowing the interference mirror positioning device 101 to have only a short range of movement in the horizontal direction parallel to the interference mirror positioning device guide slots 111*a* and 111*b*. This range of movement is however more than sufficient to adjust the light path in one wavelength to achieve destructive interference between the light path that goes through the sampling cavity 41 and the light path adjusted by the interference mirror positioning device 101.

FIG. 19 also shows the interference mirror positioning device control bar 105 located parallel to the interference mirror positioning device 101 that is fitted with the interference mirror positioning device control bar rim 106 at one end and the interference mirror positioning device control bar slot 107 at the other end.

The interference mirror positioning device guide pin 108 at the bottom face of the interference mirror positioning device control bar 105 fits and slides inside the interference mirror positioning device guide rail 109 in the analyzer body 66. The position of the interference mirror positioning device control bar 105 is controlled by the interference mirror positioning device control bar positioning screw 112 driven by the micro motor 98*b*. The interference mirror positioning device control bar positioning screw support 113 attached to the analyzer body 66 provides additional support to prevent wobbling of the interference mirror positioning device control bar positioning screw 112 as it turns.

The beam stopper 114 is a moving barrier that pivots 90 degrees around the beam stopper shaft 115 located at the right edge of the beam stopper 114. The beam stopper handle 116 allows the position of the beam stopper 114 to be controlled.

The selection mirror 124 is fitted with the selection mirror pivoting shaft 125 at the center and the selection mirror angle control handle 126 at a distance to the selection mirror pivoting shaft 125.

The transmission diffraction grating 210 is fitted with the transmission diffraction grating pivoting shaft 211 at the center and the transmission diffraction grating angle control handle 212 at a distance to the transmission diffraction grating pivoting shaft 211.

FIG. 19 also shows the pivoting detector 226 that is fitted with the pivoting detector pivoting shaft 227 at the center and the pivoting detector angle control handle 228 at a distance to the pivoting detector pivoting shaft 227.

The pivoting detector pivoting shaft 227 is inserted into the pivoting detector insertion hole 229 in the analyzer body 66. The pivoting detector insertion hole 229 provides the fixed axis around which the pivoting detector 226 is able to pivot.

The pivoting detector angle control actuator 230 is fitted with the pivoting detector angle control actuator slot 231 at a 90 degree angle in one end and with the pivoting detector angle control actuator nut 232 at the other end.

The pivoting detector angle control actuator 230 is also fitted with the pivoting detector angle control actuator guide pin 233 at the bottom face that fits and slides inside the pivoting detector angle control actuator guide rail 234 in the analyzer body 66.

FIG. 19 also shows the case fixation supports 158*a* and 158*b* located at the rims of the analyzer body 66 away from the light path that hold additional components and the laser absorption barrier 237 that absorbs laser beams.

FIG. 20 shows an isometric cutout view of the analyzer device 65 with the vertical walls of the analyzer body 66 cut at a small distance to the bottom base to facilitate the view of the other components of the analyzer device 65. FIG. 20 also shows an overlaid view of the beam stopper 114*a* and 114*b* and provides a better viewing angle to some components that are not easily seen in the viewing angles of FIG. 18 and FIG. 19. To avoid clutter only the most relevant components needed to explain the functioning of the analyzer device 65 and the ones that are better seen in the viewing angle of FIG. 20 are identified.

The sampling cavity 41 is at the centerline of the analyzer device 65. The optical cartridge A 70 and the optical cartridge B 73 are shown without their respective optical cartridge lids 72 to allow the view of their respective optical devices 82. In the position shown in FIG. 20 the optical devices 82*a* and 82*d* in the optical cartridge A 70 and the optical devices 82*g* and 82*l* in the optical cartridge B 73 are active.

The laser tray guide pin 95 at the opposite face of the laser tray 89 that contains the set of laser diodes fits and slides inside the laser tray guide rail 96 in the analyzer body 66. The laser tray guide pin 95 stays restrained inside the laser tray guide rail 96 ensuring that the laser tray 89 stays leveled and that the movement of the laser tray 89 stays restrained to the intended linear direction.

In the position shown in FIG. 20 the laser tray 89 is positioned in such a way that the visible laser emitter 92 is located in front of the optical cartridge slits 71*a* and 71*b* of the optical cartridge A 70 or stated in a more concise way, the visible laser emitter 92 is selected. In this position, the laser tray guide pin 95 is at the center of the laser tray guide rail 96.

As the optical cartridge slits 71*a* and 71*b* are in the same line, to avoid clutter only the optical cartridge slit 71*a* is indicated (see FIG. 18 and FIG. 19). When the visible laser emitter 92 is turned on, the emitted visible laser light passes through the optical cartridge slit 71*a* in front of the visible laser emitter 92, is modified by the active optical devices 82*a* and 82*d* inside the optical cartridge A 70 and passes through the optical cartridge slit 71*b*. The visible laser light is also collimated as it passes through both optical cartridge slits 71*a* and 71*b* and continues inside the analyzer device 65 following a controlled path.

One pair of partial mirrors 99*a* and 99*b* is placed at a 90 degree angle with respect to each other and with the center of the partial mirror 99*a* positioned at a 45 degree angle to the path of the laser light exiting the optical cartridge slit 71*b* in the optical cartridge A 70.

The laser light exiting the optical cartridge slit 71*b* in the optical cartridge A 70 hits the center of the partial mirror 99*a* causing the reflected part to pass through the center of the sampling cavity 41. The laser light as modified by the optical devices 82*a* and 82*d* interacts with the substances present in a sample located inside the sampling cavity 41 and is further modified producing a sample spectrum of visible laser light that continues to hit the center of the partial mirror 99b. The partial mirror 99b then reflects the sample spectrum of visible light to the center of the optical cartridge slit 71c in the optical cartridge B 73.

The sample spectrum of visible laser light enters the optical cartridge slit 71c and is modified again by the active optical devices 82g and 82l inside the optical cartridge B 73 and exits through the optical cartridge slit 71d being collimated a second time in the process of passing through the optical cartridge slits 71c and 71d. As the optical cartridge slits 71c and 71d are in the same line, to avoid clutter only the optical cartridge slit 71d is indicated (see FIG. 18 and FIG. 19).

One pair of interference mirrors 100a and 100b is mounted on the interference mirror positioning device 101 in such a way that the interference mirrors 100a and 100b are at a 90 degree angle with respect to each other, the interference mirror 100a is parallel to the partial mirror 99a and the interference mirror 100b is parallel to the partial mirror 99b. The interference mirror positioning device 101 holds and positions the interference mirrors 100a and 100b at the precise required distance to the partial mirrors 99a and 99b respectively to produce destructive interference in certain operation conditions (see FIG. 18 and FIG. 19).

The laser light exiting the optical cartridge slit 71b in the optical cartridge A 70 hits the center of the partial mirror 99a and the transmitted part continues until it hits the center of the interference mirror 100a and is reflected 90 degrees towards the center of the interference mirror 100b. As the beam stopper 114a is out of the interference light path the transmitted part of the laser light is not affected by the beam stopper 114a and reaches the interference mirror 100b enabling destructive interference to be produced.

In the overlaid position shown in dash dotted lines, the beam stopper 114b is in the interference light path and stops the laser light from reaching the interference mirror 100b and no interference is possible.

The position of the beam stopper 114a is controlled by the beam stopper actuator 117a that pushes the beam stopper handle 116a causing the beam stopper 114a to pivot in the clockwise direction out of the interference light path. Similarly, in the overlaid position the beam stopper 114b was pivoted in the counterclockwise direction into the interference light path.

FIG. 20 also shows the selection mirror 124 that is fitted with the selection mirror pivoting shaft 125 at the center and the selection mirror angle control handle 126 at a distance to the selection mirror pivoting shaft 125.

The position of the selection mirror 124 is controlled by the selection mirror rail positioning screw 133 that pulls or pushes the selection mirror rail nut 130. The angle of the selection mirror 124 is controlled by the selection mirror angle control actuator positioning screw 138 that pulls or pushes the selection mirror angle control actuator nut 137 attached to the selection mirror angle control actuator 135 to the desired position. As the selection mirror angle control actuator 135 moves, the selection mirror angle control actuator slot 136 forces the selection mirror angle control handle 126 to slide pivoting the selection mirror 124 the desired amount (see FIG. 18 and FIG. 19).

The sample spectrum of visible laser light that exits through the optical cartridge slit 71d of the optical cartridge B 73 continues until it reaches the center of the selection mirror 124 that is held at a precise position and at a precise angle to reflect the incoming sample spectrum of visible laser light towards the desired region of the transmission diffraction grating 210.

The transmission diffraction grating 210 is fitted with the transmission diffraction grating pivoting shaft 211 at the center and the transmission diffraction grating angle control handle 212 at a distance to the transmission diffraction grating pivoting shaft 211.

The position of the transmission diffraction grating rail 213 is controlled by the transmission diffraction grating rail positioning screw 219 that pulls or pushes the transmission diffraction grating rail nut 216 attached to the transmission diffraction grating rail 213 to the desired position.

As the transmission diffraction grating angle control actuator 221 moves, the transmission diffraction grating angle control actuator slot 222 forces the transmission diffraction grating angle control handle 212 to slide, pivoting the transmission diffraction grating 210 the desired amount (see FIG. 18 and FIG. 19).

The sample spectrum of visible laser light that is diffracted by the transmission diffraction grating 210 continues until it reaches the center of the pivoting detector 226 that is held at the optimum precise position and at the optimum precise angle to receive and process the incoming diffracted sample spectrum of visible laser light based on the specific tests desired for the analysis of the sample.

The pivoting detector 226 is fitted with the pivoting detector pivoting shaft 227 at the center and the pivoting detector angle control handle 228 at a distance to the pivoting detector pivoting shaft 227.

The angle of the pivoting detector 226 is controlled by the pivoting detector angle control actuator positioning screw 235 that pulls or pushes the pivoting detector angle control actuator nut 232 attached to pivoting detector angle control actuator 230 to the desired position. As the pivoting detector angle control actuator 230 moves up or down, the pivoting detector angle control actuator slot 231 forces the pivoting detector angle control handle 228 to describe an arch around the pivoting detector pivoting shaft 227 pivoting the pivoting detector 226 in the clockwise or counterclockwise directions respectively (see FIG. 18 and FIG. 19).

The electronic boards 159a and 159b contain all the electronics necessary to operate the analyzer device 65 performing all tasks including but not limited to the control of all components, connection to the internet and other devices, storage of information downloaded from the internet or generated inside the analyzer device 65 as results of tests or calculations, processing of the information, preparation of reports and presentations of the results. The battery 160 provides the energy to run the analyzer device 65 and perform all the functions for the desired duration of the operation. The battery 160 must be recharged from time to time using a standard AC to DC charger.

The laser absorption barrier 237 absorbs laser beams that would otherwise hit the battery 160 protecting it from potential damage.

Detail FIG. 20A shows the transmission diffraction grating 210 in greater magnification to show three different regions:

A first region located in the center of the transmission diffraction grating 210 is constructed with a plurality of standard perforations 238 adequate to refract the wavelengths of visible light;

A second region located at the left of the transmission diffraction grating 210 is constructed with a plurality of wider perforations 239 adequate to refract the wavelengths of infrared light;

And a third region located at the right of the transmission diffraction grating 210 is constructed with a plurality of narrower perforations 240 adequate to refract the wavelengths of ultraviolet light.

FIG. 21 shows a top view of the second embodiment of the analyzer device 65 of the present invention with the analyzer lid 67 removed to show the internal components inside the analyzer body 66.

The sampling cavity 41 inside the sampling window 40 is at the centerline of the analyzer device 65. The optical cartridge A 70 and the optical cartridge B 73 are shown without their respective optical cartridge lids 72 to allow the view of their respective optical devices 82. In the position shown in FIG. 21 the optical devices 82*a* and 82*d* in the optical cartridge A 70 and the optical devices 82*g* and 82*l* in the optical cartridge B 73 are active.

The laser tray 89 with the laser tray rim 90 provides support and positioning for the set of laser diodes: the infrared laser emitter 91, the visible laser emitter 92, and the ultraviolet laser emitter 93.

The laser tray guide pin 95 at the opposite face of the laser tray 89 that contains the set of laser diodes fits and slides inside the laser tray guide rail 96 in the analyzer body 66. The position of the laser tray 89 is controlled by the laser tray positioning screw 94 driven by the micro motor 98*a*.

The laser tray positioning screw support 97 attached to the analyzer body 66 provides additional support to prevent wobbling of the laser tray positioning screw 94 as it turns.

In the position shown in FIG. 21 the laser tray 89 is positioned in such a way that the visible laser emitter 92 is located in front of the optical cartridge slits 71*a* and 71*b* of the optical cartridge A 70 or stated in a more concise way, the visible laser emitter 92 is selected. When the visible laser emitter 92 is turned on, the emitted visible laser light passes through the optical cartridge slit 71*a* in front of the visible laser emitter 92, gets modified by the active optical devices 82*a* and 82*d* inside the optical cartridge A 70 in this example and passes through the optical cartridge slit 71*b*. The visible laser light is also collimated as it passes through both optical cartridge slits 71*a* and 71*b* and continues inside the analyzer device 65 following a controlled path.

The partial mirrors 99*a* and 99*b* are placed facing the sampling window 40 at a 90 degree angle with respect to each other and with the center of the partial mirror 99*a* positioned at a 45 degree angle to the path of the laser light exiting the optical cartridge slit 71*b* in the optical cartridge A 70.

The visible laser light exiting the optical cartridge slit 71*b* in the optical cartridge A 70 hits the center of the partial mirror 99*a* causing the reflected part to pass through the center of the sampling cavity 41. The laser light as modified by the optical devices 82*a* and 82*d* interacts with the substances present in a sample located inside the sampling cavity 41 further altering the characteristics of the visible laser light producing a sample spectrum of visible laser light that continues to the center of the partial mirror 99*b*. The partial mirror 99*b* then reflects the sample spectrum of visible laser light to the center of the optical cartridge slit 71*c* in the optical cartridge B 73.

The sample spectrum of visible laser light enters the optical cartridge slit 71*c* and is modified again by the active optical devices 82*g* and 82*l* inside the optical cartridge B 73 in this example and exits through the optical cartridge slit 71*d* being collimated a second time in the process of passing through the optical cartridge slits 71*c* and 71*d*.

The interference mirrors 100*a* and 100*b* are mounted on the interference mirror positioning device 101 in the corresponding mirror supports 102*a* and 102*b* in such a way that the interference mirrors 100*a* and 100*b* are at a 90 degree angle with respect to each other, the interference mirror 100*a* is parallel to the partial mirror 99*a* and the interference mirror 100*b* is parallel to the partial mirror 99*b*. The interference mirror positioning device arm 103 attached to the center of the top face of the interference mirror positioning device 101 extends some length to the right and is fitted with the interference mirror positioning device pin 104 at the edge that extends towards the bottom and reaches the level of the bottom face of the interference mirror positioning device 101.

The beam stopper 114 is a moving barrier that pivots 90 degrees around the beam stopper shaft 115 located at the right edge of the beam stopper 114. The beam stopper handle 116 allows the position of the beam stopper 114 to be controlled.

The laser light exiting the optical cartridge slit 71*b* in the optical cartridge A 70 hits the center of the partial mirror 99*a* and a portion of the laser light is transmitted and continues to the center of the interference mirror 100*a* and is reflected 90 degrees towards the center of the interference mirror 100*b* but in the position shown in FIG. 21 the transmitted part of the laser light hits the beam stopper 114 and does not reach the interference mirror 100*b*.

FIG. 21 also shows the selection mirror 124 that is fitted with the selection mirror pivoting shaft 125 at the center and the selection mirror angle control handle 126 at a distance to the selection mirror pivoting shaft 125.

The sample spectrum of visible laser light that exits through the optical cartridge slit 71*d* of the optical cartridge B 73 continues until it reaches the center of the selection mirror 124 that is held at a precise position and at a precise angle to reflect the incoming laser light towards the desired region of the transmission diffraction grating 210.

The transmission diffraction grating 210 is fitted with the transmission diffraction grating pivoting shaft 211 at the center and the transmission diffraction grating angle control handle 212 at a distance to the transmission diffraction grating pivoting shaft 211.

The transmission diffraction grating 210 is mounted on the transmission diffraction grating rail 213 by means of inserting the transmission diffraction grating pivoting shaft 211 into the transmission diffraction grating rail central pivot 214 and the transmission diffraction grating angle control handle 212 into the transmission diffraction grating rail guide slot 215 in the transmission diffraction grating rail 213.

The sample spectrum of visible laser light that is diffracted by the transmission diffraction grating 210 continues until it reaches the center of the pivoting detector 226 that is held at the optimum precise angle to receive and process the incoming diffracted laser light based on the specific tests desired for the analysis of the sample.

The pivoting detector 226 is fitted with the pivoting detector pivoting shaft 227 at the center and the pivoting detector angle control handle 228 at a distance to the pivoting detector pivoting shaft 227.

The pivoting detector pivoting shaft 227 is inserted into the pivoting detector insertion hole 229 in the analyzer body 66. The pivoting detector insertion hole 229 provides the fixed axis around which the pivoting detector 226 is able to pivot.

FIG. 21 also shows the case fixation supports 158*a* and 158*b* located at the rims of the analyzer body 66 away from the light path that are available to hold additional components. The case fixation support 158*a* provides fixation support to the electronic boards 159a and 159b that contain all the electronics necessary to operate the analyzer device 65 performing all tasks including but not limited to the control of all components, connection to the internet and other devices, storage of information downloaded from the internet or generated inside the analyzer device 65 as results of tests or calculations, processing of the information, preparation of reports and presentations of the results.

The battery 160 provides the energy to run the analyzer device 65 and perform all the functions for the duration that the analyzer device 65 is switched on. The unused case fixation support 158b can be used to provide support for the installation of additional electronic boards 159 or one additional battery 160 in the event that a future upgrade of the analyzer device 65 requires more electronics or power respectively.

The laser absorption barrier 237 absorbs laser beams that would otherwise hit the battery 160 protecting it from potential damage.

Detail FIG. 21A shows the transmission diffraction grating 210 in greater magnification to show the path that light rays hitting the three regions of the transmission diffraction grating 210 follow.

The transmission diffraction grating 210 is fitted with the transmission diffraction grating pivoting shaft 211 at the center and the transmission diffraction grating angle control handle 212 at a distance to the transmission diffraction grating pivoting shaft 211.

The transmission diffraction grating 210 is mounted on the transmission diffraction grating rail 213 by means of inserting the transmission diffraction grating pivoting shaft 211 into the transmission diffraction grating rail central pivot 214 and the transmission diffraction grating angle control handle 212 into the transmission diffraction grating rail guide slot 215 in the transmission diffraction grating rail 213.

As the transmission diffraction grating 210 pivots around the transmission diffraction grating rail central pivot 214, the range of movement of the transmission diffraction grating angle control handle 212 is limited by the transmission diffraction grating rail guide slot 215 restricting the range of pivoting movement of the transmission diffraction grating 210.

The transmission diffraction grating rail 213 is also fitted with the transmission diffraction grating rail nut 216 and one pair of transmission diffraction grating rail alignment pins 217a and 217b underneath that fit and slide inside one corresponding pair of transmission diffraction grating rail alignment guides 218a and 218b respectively on the analyzer body 66.

The position of the transmission diffraction grating rail 213 is controlled by the transmission diffraction grating rail positioning screw 219 driven by the micro motor 98f. As the micro motor 98f turns the transmission diffraction grating rail positioning screw 219 clockwise or counterclockwise, the transmission diffraction grating rail positioning screw 219 pulls or pushes the transmission diffraction grating rail nut 216 attached to the transmission diffraction grating rail 213 to the desired position. The transmission diffraction grating rail alignment pins 217a and 217b stay restrained inside the respective transmission diffraction grating rail alignment guides 218a and 218b on the analyzer body 66 ensuring that the transmission diffraction grating rail 213 stays leveled and that the movement of the transmission diffraction grating rail 213 stays restrained to the intended linear direction.

The angle of the transmission diffraction grating 210 is controlled by the position of the transmission diffraction grating angle control actuator 221 that is fitted with the transmission diffraction grating angle control actuator slot 222 and the transmission diffraction grating angle control actuator nut 223. The position of the transmission diffraction grating angle control actuator 221 is controlled by the transmission diffraction grating angle control actuator positioning screw 224 driven by the micro motor 98g. The transmission diffraction grating angle control handle 212 fits and is held inside the transmission diffraction grating rail guide slot 215 on the transmission diffraction grating rail 213 and the transmission diffraction grating angle control actuator slot 222 on the transmission diffraction grating angle control actuator 221.

As the micro motor 98g turns the transmission diffraction grating angle control actuator positioning screw 224 clockwise or counterclockwise, the transmission diffraction grating angle control actuator positioning screw 224 pulls or pushes the transmission diffraction grating angle control actuator nut 223 attached to the transmission diffraction grating angle control actuator 221 to the desired position. As the transmission diffraction grating angle control actuator 221 moves, the transmission diffraction grating angle control actuator slot 222 forces the transmission diffraction grating angle control handle 212 to slide and assume the position defined by the intersection of the transmission diffraction grating rail guide slot 215 and the transmission diffraction grating angle control actuator slot 222 pivoting the transmission diffraction grating 210 the desired amount.

The transmission diffraction grating angle control actuator positioning screw support 225 attached to the transmission diffraction grating rail 213 provides additional support to prevent wobbling of the transmission diffraction grating angle control actuator positioning screw 224 as it turns.

The first region located in the center of the transmission diffraction grating 210 is constructed with a plurality of standard perforations 238 adequate to refract the wavelengths of visible light. A visible laser light incident ray 241 coming from the selection mirror 124 hits the transmission diffraction grating 210 at a 90 degree angle. As the standard perforations 238 have parallel openings, the visible laser light incident ray 241 is partially transmitted and a visible laser light transmitted ray 242 is produced at the other side of the transmission diffraction grating 210 at the same orientation of the visible laser light incident ray 241. A visible laser light diffracted ray 243 is produced at the first diffraction angle.

The pivoting detector 226 is positioned at the optimum angle to capture the visible laser light diffracted ray 243. The visible laser light transmitted ray 242 misses the pivoting detector 226 hitting the laser absorption barrier 237 and is absorbed (see FIG. 24 and FIG. 25).

The second region located at the right of the transmission diffraction grating 210 is constructed with a plurality of wider perforations 239 adequate to refract the wavelengths of infrared light. An infrared laser light incident ray 244 coming from the selection mirror 124 hits the transmission diffraction grating 210 at a 90 degree angle. As the wider perforations 239 have parallel openings, the infrared laser light incident ray 244 is partially transmitted and an infrared laser light transmitted ray 245 is produced at the other side of the transmission diffraction grating 210 at the same orientation of the infrared laser light incident ray 244. An infrared laser light diffracted ray 246 is produced at the first diffraction angle. As the infrared light has a longer wavelength than the visible light, the first diffraction angle of the infrared light occurs at a slightly larger angle than the first diffraction angle of the visible light. To ascertain this difference, a parallel line to the visible laser light diffracted ray 247a is drawn in Detail FIG. 21A.

The pivoting detector 226 is positioned at the optimum angle to capture the infrared laser light diffracted ray 246. The infrared laser light transmitted ray 245 misses the pivoting detector 226 hitting the laser absorption barrier 237 and is absorbed (see FIG. 22 and FIG. 23).

The second region of the transmission diffraction grating 210 with wider perforations 239 is designed to be located at the right side of the transmission diffraction grating 210, further from pivoting detector 226 than the other regions because the larger angle of diffraction of the infrared light causes the infrared laser light transmitted ray 245 and the infrared laser light diffracted ray 246 to diverge more rapidly. As a result, the infrared laser light diffracted ray 246 is able to cover the longer distance and hit the pivoting detector 226.

The third region located at the left of the transmission diffraction grating 210 is constructed with a plurality of narrower perforations 240 adequate to refract the wavelengths of ultraviolet light. An ultraviolet laser light incident ray 248 coming from the selection mirror 124 hits the transmission diffraction grating 210 at a 90 degree angle. As the narrower perforations 240 have parallel openings, the ultraviolet laser light incident ray 248 is partially transmitted and an ultraviolet laser light transmitted ray 249 is produced at the other side of the transmission diffraction grating 210 at the same orientation of the ultraviolet laser light incident ray 248. An ultraviolet laser light diffracted ray 250 is produced at the first diffraction angle. As the ultraviolet light has a shorter wavelength than the visible light, the first diffraction angle of the ultraviolet light occurs at a slightly smaller angle than the first diffraction angle of the visible light. To ascertain this difference, the parallel line to the visible laser light diffracted ray 247b is drawn in Detail FIG. 21A.

The pivoting detector 226 is positioned at the optimum angle to capture the ultraviolet laser light diffracted ray 250. The ultraviolet laser light transmitted ray 249 misses the pivoting detector 226 hitting the laser absorption barrier 237 and is absorbed (see FIG. 26 and FIG. 27).

The third region of the transmission diffraction grating 210 with narrower perforations 240 is designed to be located at the left side of the transmission diffraction grating 210, closer to the pivoting detector 226 than the other regions because the smaller angle of diffraction of the ultraviolet light causes the ultraviolet laser light transmitted ray 249 and the ultraviolet laser light diffracted ray 250 to diverge more slowly. The ultraviolet laser light diffracted ray 250 is able to hit the pivoting detector 226 due to the shorter distance it has to cover.

Figure 22:
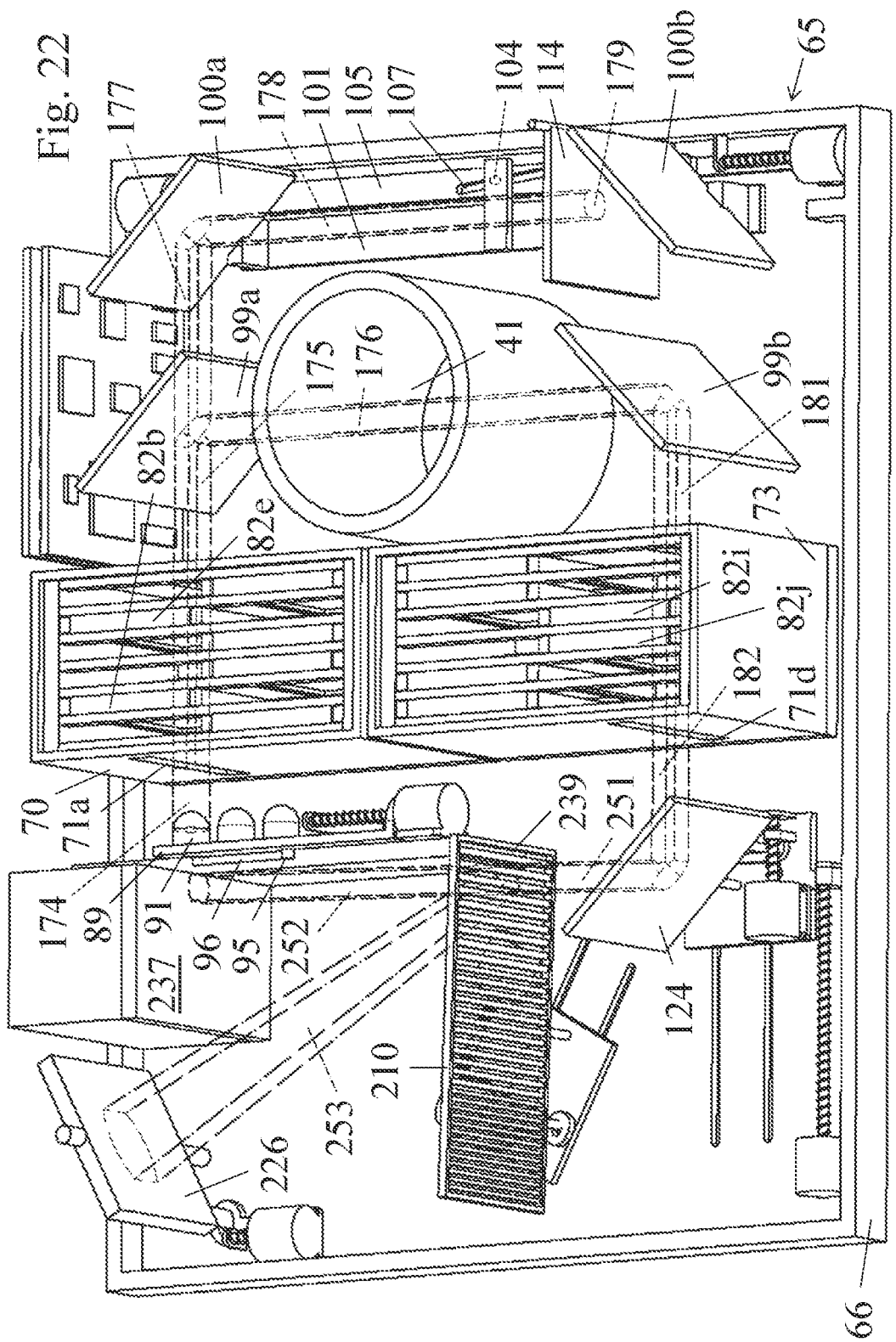
FIG. 22 is an isometric view of an embodiment of an infrared light path in the second embodiment of the analyzer device of the present invention.

FIG. 22 shows an isometric cutout view of the analyzer device 65 with the vertical walls of the analyzer body 66 cut at a small distance to the bottom base to facilitate the view of the other components of the analyzer device 65 in operation using infrared light beams without interferometry.

The laser tray 89 is positioned to select the infrared laser emitter 91, that is moved to the position in front of the optical cartridge slit 71a of the optical cartridge A 70. In this position, the laser tray guide pin 95 is at the right end of the laser tray guide rail 96.

The infrared laser emitter 91 is turned on and the infrared laser light emitted beam 174 is produced. The infrared laser light emitted beam 174 passes through the optical cartridge slit 71a, is modified by the active optical devices 82b and 82e inside the optical cartridge A 70 in this example and passes through the optical cartridge slit 71b that collimates the infrared laser light emitted beam 174 producing the infrared laser light collimated and preprocessed beam 175 that continues inside the analyzer device 65 until it hits the center of the partial mirror 99a.

The infrared laser light collimated and preprocessed beam 175 is partially reflected producing the infrared laser light beam passing through the sampling cavity 176 that passes through the center of the sampling cavity 41. The infrared laser light beam passing through the sampling cavity 176 as modified by the optical devices 82b and 82e interacts with the substances present in a sample located inside the sampling cavity 41 further altering the characteristics of the infrared laser light producing a sample spectrum of infrared laser light that continues to the center of the partial mirror 99b.

The infrared laser light collimated and preprocessed beam 175 is also partially transmitted at the partial mirror 99a producing the infrared laser light beam transmitted to interferometer 177. The infrared laser light beam transmitted to interferometer 177 continues and hits the center of the interference mirror 100a and the infrared laser light beam reflected in the interferometer 178 is produced towards the center of the interference mirror 100b. The beam stopper 114 is in the interference light path resulting in the infrared laser light beam absorbed by beam stopper 179 causing none of the light in interference light path to reach the interference mirror 100b to be reflected towards the partial mirror 99b.

The partial mirror 99b then reflects only the sample spectrum of infrared laser light coming from the sampling cavity 41 into the infrared laser light modified beam 181 that is directed to the center of the optical cartridge slit 71c in the optical cartridge B 73. The infrared laser light modified beam 181 enters the optical cartridge slit 71c and is modified again by the active optical devices 82i and 82j inside the optical cartridge B 73 in this example and exits through the optical cartridge slit 71d being collimated a second time in the process of passing through the optical cartridge slits 71c and 71d resulting in the infrared laser light modified and post processed beam 182.

The infrared laser light modified and post processed beam 182 hits the center of the selection mirror 124 that is located at the right position and at the right angle to reflect the infrared laser light modified and post processed beam 182 producing an infrared laser light incident beam 251 aimed into the second region at the right side of the transmission diffraction grating 210 that is constructed with wider perforations 239 adequate to refract the wavelengths of infrared light. The transmission diffraction grating 210 is located at the right position and at the right angle to produce an infrared laser light transmitted beam 252 aimed at the laser absorption barrier 237 and an infrared laser light diffracted beam 253 aimed at the center of the pivoting detector 226.

The infrared laser light transmitted beam 252 and the infrared laser light diffracted beam 253 diverge as they follow their paths. The infrared laser light diffracted beam 253 hits the center of the pivoting detector 226 that is held at the optimum precise angle to receive and process the infrared laser light diffracted beam 253 based on the specific tests desired for the analysis of the sample. The infrared laser light transmitted beam 252 on the other hand misses the pivoting detector 226 and is absorbed at the laser absorption barrier 237 of the analyzer body 66 at the right side of the pivoting detector 226.

FIG. 23 shows an isometric cutout view of the analyzer device 65 with the vertical walls of the analyzer body 66 cut at a small distance to the bottom base to facilitate the view of the other components of the analyzer device 65 in operation using infrared light beams with interferometry.

The laser tray 89 is positioned to select the infrared laser emitter 91, that is moved to the position in front of the optical cartridge slit 71*a* of the optical cartridge A 70. In this position, the laser tray guide pin 95 is at the right end of the laser tray guide rail 96.

The infrared laser emitter 91 is turned on and the infrared laser light emitted beam 174 is produced. The infrared laser light emitted beam 174 passes through the optical cartridge slit 71*a*, is modified by the active optical devices 82*b* and 82*e* inside the optical cartridge A 70 in this example and passes through the optical cartridge slit 71*b* that collimates the infrared laser light emitted beam 174 producing the infrared laser light collimated and preprocessed beam 175 that continues inside the analyzer device 65 until it hits the center of the partial mirror 99*a*.

The infrared laser light collimated and preprocessed beam 175 is partially reflected producing the infrared laser light beam passing through the sampling cavity 176 that passes through the center of the sampling cavity 41. The infrared laser light beam passing through the sampling cavity 176 as modified by the optical devices 82*b* and 82*e* interacts with the substances present in a sample located inside the sampling cavity 41 and is further modified producing a sample spectrum of infrared laser light that continues to the center of the partial mirror 99*b*.

The infrared laser light collimated and preprocessed beam 175 is also partially transmitted at the partial mirror 99*a* producing the infrared laser light beam transmitted to interferometer 177. The infrared laser light beam transmitted to interferometer 177 continues and hits the center of the interference mirror 100*a* and the infrared laser light beam reflected in the interferometer 178 is produced towards the center of the interference mirror 100*b*. The beam stopper 114 is out of the interference light path and the infrared laser light beam reflected in the interferometer 178 is reflected at the interference mirror 100*b* resulting in the infrared laser light beam exiting the interferometer 180 that hits the partial mirror 99*b*.

The interference mirror positioning device control bar 105 is moved up or down according and the interference mirror positioning device control bar slot 107 pulls or pushes the interference mirror positioning device pin 104 resulting in a small adjustment in the position of the interference mirror positioning device 101 that shortens or increases the length of the interferometer light path the exact amount to achieve destructive interference with the light path of the sample spectrum of infrared laser light going through the sampling cavity 41.

The partial mirror 99*b* then combines the sample spectrum of infrared laser light beam passing through the sampling cavity 176 and the infrared laser light beam exiting the interferometer 180 producing the infrared laser light modified beam 181 that is directed to the center of the optical cartridge slit 71*c* in the optical cartridge B 73. The infrared laser light modified beam 181 enters the optical cartridge slit 71*c* and is modified again by the active optical devices 82*i* and 82*j* inside the optical cartridge B 73 in this example and exits through the optical cartridge slit 71*d* being collimated a second time in the process of passing through the optical cartridge slits 71*c* and 71*d* resulting in the infrared laser light modified and post processed beam 182.

The infrared laser light modified and post processed beam 182 hits the center of the selection mirror 124 that is located at the right position and at the right angle to reflect the infrared laser light modified and post processed beam 182 producing the infrared laser light incident beam 251 aimed into the second region at the right side of the transmission diffraction grating 210 that is constructed with wider perforations 239 adequate to refract the wavelengths of infrared light. The transmission diffraction grating 210 is located at the right position and at the right angle to produce the infrared laser light transmitted beam 252 aimed at the laser absorption barrier 237 and the infrared laser light diffracted beam 253 aimed at the center of the pivoting detector 226.

The infrared laser light transmitted beam 252 and the infrared laser light diffracted beam 253 diverge as they follow their paths. The infrared laser light diffracted beam 253 hits the center of the pivoting detector 226 that is held at the optimum precise angle to receive and process the infrared laser light diffracted beam 253 based on the specific tests desired for the analysis of the sample. The infrared laser light transmitted beam 252 on the other hand misses the pivoting detector 226 and is absorbed at the laser absorption barrier 237 of the analyzer body 66 at the right side of the pivoting detector 226.

FIG. 24 shows an isometric cutout view of the analyzer device 65 with the vertical walls of the analyzer body 66 cut at a small distance to the bottom base to facilitate the view of the other components of the analyzer device 65 in operation using visible light beams without interferometry.

The laser tray 89 is positioned to select the visible laser emitter 92, that is moved to the position in front of the optical cartridge slit 71*a* of the optical cartridge A 70. In this position, the laser tray guide pin 95 is at the center of the laser tray guide rail 96.

The visible laser emitter 92 is turned on and the visible laser light emitted beam 186 is produced. The visible laser light emitted beam 186 passes through the optical cartridge slit 71*a*, is modified by the active optical devices 82*a* and 82*d* inside the optical cartridge A 70 in this example and passes through the optical cartridge slit 71*b* that collimates the visible laser light emitted beam 186 producing the visible laser light collimated and preprocessed beam 187 that continues inside the analyzer device 65 until it hits the center of the partial mirror 99*a*.

The visible laser light collimated and preprocessed beam 187 is partially reflected producing the visible laser light beam passing through the sampling cavity 188 that passes through the center of the sampling cavity 41. The visible laser light beam passing through the sampling cavity 188 as modified by the optical devices 82*a* and 82*d* interacts with the substances present in a sample located inside the sampling cavity 41 and is further modified producing a sample spectrum of visible laser light that continues to the center of the partial mirror 99*b*.

The visible laser light collimated and preprocessed beam 187 is also partially transmitted at the partial mirror 99*a* producing the visible laser light beam transmitted to interferometer 189. The visible laser light beam transmitted to interferometer 189 continues and hits the center of the interference mirror 100*a* and the visible laser light beam reflected in the interferometer 190 is produced towards the center of the interference mirror 100*b*. The beam stopper 114 is in the interference light path resulting in the visible laser light beam absorbed by beam stopper 191 causing none of the light within the interference light path to reach the interference mirror 100*b* to be reflected towards the partial mirror 99*b*.

The partial mirror 99*b* then reflects only the sample spectrum of visible laser light coming from the sampling cavity 41 into the visible laser light modified beam 193 that is directed at the center of the optical cartridge slit 71*c* in the optical cartridge B 73. The visible laser light modified beam 193 enters the optical cartridge slit 71*c* and is modified again by the active optical devices 82*g* and 82*l* inside the optical cartridge B 73 and exits through the optical cartridge slit 71*d* being collimated a second time in the process of passing through the optical cartridge slits 71*c* and 71*d* resulting in the visible laser light modified and post processed beam 194.

The visible laser light modified and post processed beam 194 hits the center of the selection mirror 124 that is located at the right position and at the right angle to reflect the visible laser light modified and post processed beam 194 producing a visible laser light incident beam 254 aimed into the first region at the center of the transmission diffraction grating 210 that is constructed with standard perforations 238 adequate to refract the wavelengths of visible light. The transmission diffraction grating 210 is located at the right position and at the right angle to produce a visible laser light transmitted beam 255 aimed at the laser absorption barrier 237 and a visible laser light diffracted beam 256 aimed at the center of the pivoting detector 226.

The visible laser light transmitted beam 255 and the visible laser light diffracted beam 256 diverge as they follow their paths. The visible laser light diffracted beam 256 hits the center of the pivoting detector 226 that is held at the optimum precise angle to receive and process the visible laser light diffracted beam 256 based on the specific tests desired for the analysis of the sample. The visible laser light transmitted beam 255 on the other hand misses the pivoting detector 226 and is absorbed at the laser absorption barrier 237 of the analyzer body 66 at the right side of the pivoting detector 226.

FIG. 25 shows an isometric cutout view of the analyzer device 65 with the vertical walls of the analyzer body 66 cut at a small distance to the bottom base to facilitate the view of the other components of the analyzer device 65 in operation using visible light beams with interferometry.

The laser tray 89 is positioned to select the visible laser emitter 92, that is moved to the position in front of the optical cartridge slit 71*a* of the optical cartridge A 70. In this position, the laser tray guide pin 95 is at the center of the laser tray guide rail 96.

The visible laser emitter 92 is turned on and the visible laser light emitted beam 186 is produced. The visible laser light emitted beam 186 passes through the optical cartridge slit 71*a*, is modified by the active optical devices 82*a* and 82*d* inside the optical cartridge A 70 in this example and passes through the optical cartridge slit 71*b* that collimates the visible laser light emitted beam 186 producing the visible laser light collimated and preprocessed beam 187 that continues inside the analyzer device 65 until it hits the center of the partial mirror 99*a*.

The visible laser light collimated and preprocessed beam 187 is partially reflected producing the visible laser light beam passing through the sampling cavity 188 that passes through the center of the sampling cavity 41. The visible laser light beam passing through the sampling cavity 188 as modified by the optical devices 82*a* and 82*d* interacts with the substances present in a sample located inside the sampling cavity 41 and is further modified producing a sample spectrum of visible laser light that continues to hit the center of the partial mirror 99*b*.

The visible laser light collimated and preprocessed beam 187 is also partially transmitted at the partial mirror 99*a* producing the visible laser light beam transmitted to interferometer 189. The visible laser light beam transmitted to interferometer 189 continues and hits the center of the interference mirror 100*a* and the visible laser light beam reflected in the interferometer 190 is produced towards the center of the interference mirror 100*b*. The beam stopper 114 is out of the interference light path and the visible laser light beam reflected in the interferometer 190 is reflected at the interference mirror 100*b* resulting in the visible laser light beam exiting the interferometer 192 and being directed to the partial mirror 99*b*.

The interference mirror positioning device control bar 105 is moved up or down accordingly and the interference mirror positioning device control bar slot 107 pulls or pushes the interference mirror positioning device pin 104 resulting in a small adjustment in the position of the interference mirror positioning device 101 that shortens or increases the length of the interferometer light path the exact amount to achieve destructive interference with the sample spectrum of visible laser light path going through the sampling cavity 41.

The partial mirror 99*b* then combines the sample spectrum of visible laser light beam passing through the sampling cavity 188 and the visible laser light beam exiting the interferometer 192 producing the visible laser light modified beam 193 that is directed to the center of the optical cartridge slit 71*c* in the optical cartridge B 73. The visible laser light modified beam 193 enters the optical cartridge slit 71*c* and is modified again by the active optical devices 82*g* and 82*l* inside the optical cartridge B 73 in this example and exits through the optical cartridge slit 71*d* being collimated a second time in the process of passing through the optical cartridge slits 71*c* and 71*d* resulting in the visible laser light modified and post processed beam 194.

The visible laser light modified and post processed beam 194 hits the center of the selection mirror 124 that is located at the right position and at the right angle to reflect the visible laser light modified and post processed beam 194 producing the visible laser light incident beam 254 aimed into the first region at the center of the transmission diffraction grating 210 that is constructed with standard perforations 238 adequate to refract the wavelengths of visible light. The transmission diffraction grating 210 is located at the right position and at the right angle to produce the visible laser light transmitted beam 255 aimed at the laser absorption barrier 237 and the visible laser light diffracted beam 256 aimed at the center of the pivoting detector 226.

The visible laser light transmitted beam 255 and the visible laser light diffracted beam 256 diverge as they follow their paths. The visible laser light diffracted beam 256 hits the center of the pivoting detector 226 that is held at the optimum precise angle to receive and process the visible laser light diffracted beam 256 based on the specific tests desired for analysis of the sample. The visible laser light transmitted beam 255 on the other hand misses the pivoting detector 226 and is absorbed at the laser absorption barrier 237 of the analyzer body 66 at the right side of the pivoting detector 226.

FIG. 26 shows an isometric cutout view of the analyzer device 65 with the vertical walls of the analyzer body 66 cut at a small distance to the bottom base to facilitate the view of the other components of the analyzer device 65 in operation using ultraviolet light beams without interferometry.

The laser tray 89 is positioned to select the ultraviolet laser emitter 93, that is moved to the position in front of the optical cartridge slit 71*a* of the optical cartridge A 70. In this position, the laser tray guide pin 95 is at the left end of the laser tray guide rail 96.

The ultraviolet laser emitter 93 is turned on and the ultraviolet laser light emitted beam 198 is produced. The ultraviolet laser light emitted beam 198 passes through the optical cartridge slit 71*a*, is modified by the active optical devices 82*c* and 82*f* inside the optical cartridge A 70 in this example and passes through the optical cartridge slit 71*b* that collimates the ultraviolet laser light emitted beam 198 producing the ultraviolet laser light collimated and preprocessed beam 199 that continues inside the analyzer device 65 until it hits the center of the partial mirror 99*a*.

The ultraviolet laser light collimated and preprocessed beam 199 is partially reflected producing the ultraviolet laser light beam passing through the sampling cavity 200 that passes through the center of the sampling cavity 41. The ultraviolet laser light beam passing through the sampling cavity 200 as modified by the optical devices 82*c* and 82*f* interacts with the substances present in a sample located inside the sampling cavity 41 and is further modified producing a sample spectrum of ultraviolet laser light that continues to hit the center of the partial mirror 99*b*.

The ultraviolet laser light collimated and preprocessed beam 199 is also partially transmitted at the partial mirror 99*a* producing the ultraviolet laser light beam transmitted to interferometer 201. The ultraviolet laser light beam transmitted to interferometer 201 continues and hits the center of the interference mirror 100*a* and the ultraviolet laser light beam reflected in the interferometer 202 is produced towards the center of the interference mirror 100*b*. The beam stopper 114 is in the interference light path resulting in the ultraviolet laser light beam absorbed by beam stopper 203 causing none of the light of the interference light path to reach the interference mirror 100*b* to be reflected towards the partial mirror 99*b*.

The partial mirror 99*b* then reflects only the sample spectrum of ultraviolet laser light coming from the sampling cavity 41 into the ultraviolet laser light modified beam 205 that hits the center of the optical cartridge slit 71*c* in the optical cartridge B 73. The ultraviolet laser light modified beam 205 enters the optical cartridge slit 71*c* and is modified again by the active optical devices 82*h* and 82*k* inside the optical cartridge B 73 in this example and exits through the optical cartridge slit 71*d* being collimated a second time in the process of passing through the optical cartridge slits 71*c* and 71*d* resulting in the ultraviolet laser light modified and post processed beam 206.

The ultraviolet laser light modified and post processed beam 206 hits the center of the selection mirror 124 that is located at the right position and at the right angle to reflect the ultraviolet laser light modified and post processed beam 206 producing an ultraviolet laser light incident beam 257 aimed into the third region at the left side of the transmission diffraction grating 210 that is constructed with narrower perforations 240 adequate to refract the wavelengths of ultraviolet light. The transmission diffraction grating 210 is located at the right position and at the right angle to produce an ultraviolet laser light transmitted beam 258 aimed at the laser absorption barrier 237 and an ultraviolet laser light diffracted beam 259 aimed at the center of the pivoting detector 226.

The ultraviolet laser light transmitted beam 258 and the ultraviolet laser light diffracted beam 259 diverge as they follow their paths. The ultraviolet laser light diffracted beam 259 hits the center of the pivoting detector 226 that is held at the optimum precise angle to receive and process the ultraviolet laser light diffracted beam 259 based on the specific tests desired for the analysis of the sample. The ultraviolet laser light transmitted beam 258 on the other hand misses the pivoting detector 226 and is absorbed at the laser absorption barrier 237 of the analyzer body 66 at the right side of the pivoting detector 226.

FIG. 27 shows an isometric cutout view of the analyzer device 65 with the vertical walls of the analyzer body 66 cut at a small distance to the bottom base to facilitate the view of the other components of the analyzer device 65 in operation using ultraviolet light beams with interferometry.

The laser tray 89 is positioned to select the ultraviolet laser emitter 93, that is moved to the position in front of the optical cartridge slit 71*a* of the optical cartridge A 70. In this position, the laser tray guide pin 95 is at the left end of the laser tray guide rail 96.

The ultraviolet laser emitter 93 is turned on and the ultraviolet laser light emitted beam 198 is produced. The ultraviolet laser light emitted beam 198 passes through the optical cartridge slit 71*a*, is modified by the active optical devices 82*c* and 82*f* inside the optical cartridge A 70 in this example and passes through the optical cartridge slit 71*b* that collimates the ultraviolet laser light emitted beam 198 producing the ultraviolet laser light collimated and preprocessed beam 199 that continues inside the analyzer device 65 until it hits the center of the partial mirror 99*a*.

The ultraviolet laser light collimated and preprocessed beam 199 is partially reflected producing the ultraviolet laser light beam passing through the sampling cavity 200 that passes through the center of the sampling cavity 41. The ultraviolet laser light beam passing through the sampling cavity 200 as modified by the optical devices 82*c* and 82*f* interacts with the substances present in a sample located inside the sampling cavity 41 and is further modified producing a sample spectrum of ultraviolet laser light that continues to hit the center of the partial mirror 99*b*.

The ultraviolet laser light collimated and preprocessed beam 199 is also partially transmitted at the partial mirror 99*a* producing the ultraviolet laser light beam transmitted to interferometer 201. The ultraviolet laser light beam transmitted to interferometer 201 continues and hits the center of the interference mirror 100*a* and the ultraviolet laser light beam reflected in the interferometer 202 is produced towards the center of the interference mirror 100*b*. The beam stopper 114 is out of the interference light path and the ultraviolet laser light beam reflected in the interferometer 202 is reflected at the interference mirror 100*b* resulting in the ultraviolet laser light beam exiting the interferometer 204 that is directed at the partial mirror 99*b*.

The interference mirror positioning device control bar 105 is moved up or down according and the interference mirror positioning device control bar slot 107 pulls or pushes the interference mirror positioning device pin 104 resulting in a small adjustment in the position of the interference mirror positioning device 101 that shortens or increases the length of the interferometer light path the exact amount to achieve destructive interference with the sample spectrum of ultraviolet laser light path going through the sampling cavity 41.

The partial mirror 99*b* then combines the sample spectrum of ultraviolet laser light beam passing through the sampling cavity 200 and the ultraviolet laser light beam exiting the interferometer 204 producing the ultraviolet laser light modified beam 205 that is directed to the center of the optical cartridge slit 71*c* in the optical cartridge B 73. The ultraviolet laser light modified beam 205 enters the optical cartridge slit 71*c* and is modified again by the active optical devices 82*h* and 82*k* inside the optical cartridge B 73 in this example and exits through the optical cartridge slit 71*d* being collimated a second time in the process of passing through the optical cartridge slits 71*c* and 71*d* resulting in the ultraviolet laser light modified and post processed beam 206.

The ultraviolet laser light modified and post processed beam 206 hits the center of the selection mirror 124 that is located at the right position and at the right angle to reflect the ultraviolet laser light modified and post processed beam 206 producing the ultraviolet laser light incident beam 257 aimed into the third region at the left side of the transmission diffraction grating 210 that is constructed with narrower perforations 240 adequate to refract the wavelengths of ultraviolet light. The transmission diffraction grating 210 is located at the right position and at the right angle to produce the ultraviolet laser light transmitted beam 258 aimed at the laser absorption barrier 237 and the ultraviolet laser light diffracted beam 259 aimed at the center of the pivoting detector 226.

The ultraviolet laser light transmitted beam 258 and the ultraviolet laser light diffracted beam 259 diverge as they follow their paths. The ultraviolet laser light diffracted beam 259 hits the center of the pivoting detector 226 that is held at the optimum precise angle to receive and process the ultraviolet laser light diffracted beam 259 based on the specific tests desired for the analysis of the sample. The ultraviolet laser light transmitted beam 258 on the other hand misses the pivoting detector 226 and is absorbed at the laser absorption barrier 237 of the analyzer body 66 at the right side of the pivoting detector 226.

Operation—Second Embodiment

Before the execution of a test the analyzer device 65 needs to be fully charged or attached to a power source to ensure it has sufficient power to conduct the tests. It is also recommended to download eventual updates to the configuration files containing new updated information on new tests, new detectable substances, pathogens, etc. to ensure best results.

The second embodiment of the analyzer device 65 uses the transmission diffraction grating 210 instead of the reflective diffraction grating 140 used in the first embodiment. As the diffraction grating is a key component, some components and the layout of the analyzer device 65 are adjusted to cope with this change. The operation of the analyzer device 65 is affected only with regard to these adjustments in components and layout and most of the operation of the second embodiment is the same as the operation of the first embodiment.

The explanations for the operations of the second embodiment regarding FIG. 1, FIG. 1A, FIG. 1B, FIG. 1C, FIG. 2, FIG. 3, FIG. 4, FIG. 5, FIG. 6, and FIG. 7 are the same as already described for the first embodiment at the first embodiment operation section.

FIG. 18, FIG. 19, FIG. 20 and FIG. 21 show the second embodiment of the analyzer device 65 of the present invention with the analyzer lid 67 removed from different angles and with the analyzer body 66 cut at a convenient height or transparent, drawn in dash doted lines to better illustrate all components. The operation is the same for all these figures and is described once to avoid unnecessary redundancy.

The sampling cavity 41 inside the sampling window 40 is at the centerline of the analyzer device 65. The optical cartridge A 70 and the optical cartridge B 73 are shown without their respective optical cartridge lids 72 to allow the view of their respective optical devices 82. In the position represented, the optical devices 82*a* and 82*d* in the optical cartridge A 70 and the optical devices 82*g* and 82*l* in the optical cartridge B 73 are active.

The laser tray 89 with the laser tray rim 90 provides support and positioning for the set of laser diodes: the infrared laser emitter 91, the visible laser emitter 92, and the ultraviolet laser emitter 93.

The laser tray guide pin 95 at the opposite face of the laser tray 89 that contains the set of laser diodes fits and slides inside the laser tray guide rail 96 in the analyzer body 66. The position of the laser tray 89 is controlled by the laser tray positioning screw 94 driven by the micro motor 98*a*. The laser tray positioning screw support 97 attached to the analyzer body 66 provides additional support to prevent wobbling of the laser tray positioning screw 94 as it turns.

As the micro motor 98*a* turns the laser tray positioning screw 94 clockwise or counterclockwise, the laser tray positioning screw 94 pulls or pushes the laser tray rim 90 attached to the laser tray 89 to the desired position. The laser tray guide pin 95 stays restrained inside the laser tray guide rail 96 ensuring that the laser tray 89 stays leveled and that the movement of the laser tray 89 stays restrained to the intended linear direction.

In the position represented, the laser tray 89 is positioned in such a way that the visible laser emitter 92 is located in front of the optical cartridge slits 71*a* and 71*b* of the optical cartridge A 70 or stated in a more concise way, the visible laser emitter 92 is selected.

To select the infrared laser emitter 91, the micro motor 98*a* turns the laser tray positioning screw 94 clockwise pulling the laser tray rim 90 attached to the laser tray 89 until the infrared laser emitter 91 is located in front of the optical cartridge slits 71*a* and 71*b*.

Similarly, to select the ultraviolet laser emitter 93, the micro motor 98*a* turns the laser tray positioning screw 94 counterclockwise pushing the laser tray rim 90 attached to the laser tray 89 until the ultraviolet laser emitter 93 is located in front of the optical cartridge slits 71*a* and 71*b*.

When the visible laser emitter 92 is turned on, the emitted visible laser light passes through the optical cartridge slit 71*a* in front of the visible laser emitter 92, gets modified by one or more of the selected active optical devices 82 that in this example are optical devices 82*a* and 82*d* inside the optical cartridge A 70 and passes through the optical cartridge slit 71*b*. The visible laser light is also collimated as it passes through both optical cartridge slits 71*a* and 71*b* and continues inside the analyzer device 65 following a controlled path.

The partial mirrors 99*a* and 99*b* are placed facing the sampling window 40 at a 90 degree angle with respect to each other and with the center of the partial mirror 99*a* positioned at a 45 degree angle to the path of the laser light exiting the optical cartridge slit 71*b* in the optical cartridge A 70.

The laser light modified by the optical devices 82*a* and 82*d* in this example and collimated the optical cartridge slit 71*b* in the optical cartridge A 70 with all or portion of the laser light reflecting off the center of the partial mirror 99*a* causing all or a portion of the laser light to pass through the center of the sampling cavity 41. The laser light is modified by the optical devices 82 to have specific characteristics related to frequency, intensity, polarization, and/or other optical features as specified for one or more specific tests selected for analysis and/or identification of a sample or substances within a sample, and/or to determine proportions of one or more substances within a sample, The laser light as modified by the optical devices 82*a* and 82*d* interacts with the substances present in a sample located inside the sampling cavity 41 such as through the absorption of energy from the laser light. The molecular characteristics of the sample through this interaction alter the characteristics of the laser light producing a sample spectrum. All or a portion of the sample spectrum of laser light reflects off the center of the partial mirror 99*b* with the partial mirror 99*b* directing all or a portion of the sample spectrum of laser light to hit the center of the optical cartridge slit 71*c* in the optical cartridge B 73.

The sample spectrum of laser light enters the optical cartridge slit 71*c* and is modified again by the active optical devices 82*g* and 82*l* inside the optical cartridge B 73 in this example and exits through the optical cartridge slit 71*d* being collimated a second time in the process of passing through the optical cartridge slits 71*c* and 71*d*.

The pair of interference mirrors 100*a* and 100*b* is mounted on the interference mirror positioning device 101 in one pair of mirror supports 102*a* and 102*b* in such a way that the interference mirrors 100*a* and 100*b* are at a 90 degree angle with respect to each other. The interference mirror positioning device arm 103 attached to the center of the top face of the interference mirror positioning device 101 extends some length to the right and is linked to the interference mirror positioning device pin 104 that extends towards the bottom and reaches the level of the bottom face of the interference mirror positioning device 101.

The interference mirror positioning device 101 is fitted with one pair of interference mirror positioning device guide pins 110*a* and 110*b* that fit and slide inside the corresponding interference mirror positioning device guide slots 111*a* and 111*b* in the analyzer body 66 allowing the interference mirror positioning device 101 to have only a short range of movement in the horizontal direction parallel to the interference mirror positioning device guide slots 111*a* and 111*b*. This range of movement is however more than sufficient to adjust the light path in one wavelength to achieve destructive interference between the sample spectrum laser light that goes through the sampling cavity 41 and the laser light adjusted by the interference mirror positioning device 101.

The interference mirror positioning device control bar 105 is located parallel to the interference mirror positioning device 101 that is fitted with the interference mirror positioning device control bar rim 106 at one end and the interference mirror positioning device control bar slot 107 at the other end.

The interference mirror positioning device guide pin 108 at the bottom face of the interference mirror positioning device control bar 105 fits and slides inside the interference mirror positioning device guide rail 109 in the analyzer body 66. The position of the interference mirror positioning device control bar 105 is controlled by the interference mirror positioning device control bar positioning screw 112 driven by the micro motor 98*b*. The interference mirror positioning device control bar positioning screw support 113 attached to the analyzer body 66 provides additional support to prevent wobbling of the interference mirror positioning device control bar positioning screw 112 as it turns.

As the micro motor 98*b* turns the interference mirror positioning device control bar positioning screw 112 clockwise or counterclockwise, the interference mirror positioning device control bar positioning screw 112 pulls or pushes the interference mirror positioning device control bar rim 106 attached to the interference mirror positioning device control bar 105 to the desired position. The interference mirror positioning device guide pin 108 stays restrained inside the interference mirror positioning device guide rail 109 ensuring that the interference mirror positioning device control bar 105 stays leveled and that the movement of the interference mirror positioning device control bar 105 stays restrained to the intended linear direction.

The interference mirror positioning device pin 104 fits and slides inside the interference mirror positioning device control bar slot 107. As the interference mirror positioning device control bar 105 moves up or down, the interference mirror positioning device control bar slot 107 forces the interference mirror positioning device pin 104 right or left respectively.

As the interference mirror positioning device control bar slot 107 is constructed at a small angle to the center line of the interference mirror positioning device control bar 105, a large vertical movement of the interference mirror positioning device control bar 105 is translated into a small horizontal movement of the interference mirror positioning device pin 104 in the interference mirror positioning device 101 allowing an increased level of precision in the positioning of the interference mirrors 100*a* and 100*b* with respect to the partial mirrors 99*a* and 99*b* that are fixed.

The beam stopper 114 is a moving barrier that pivots 90 degrees around the beam stopper shaft 115 located at the right edge of the beam stopper 114. The beam stopper handle 116 allows the position of the beam stopper 114 to be controlled.

The beam stopper actuator 117 has a beam stopper actuator slot 118 at a 90 degree angle in one end and the beam stopper actuator rim 119 at the other end.

The beam stopper actuator guide pin 120 at the bottom face of the beam stopper actuator 117 fits and slides inside the beam stopper actuator guide rail 121 in the analyzer body 66. The position of the beam stopper actuator 117 is controlled by the beam stopper actuator positioning screw 122 driven by the micro motor 98*c*. The beam stopper actuator positioning screw support 123 attached to the analyzer body 66 provides additional support to prevent wobbling of the beam stopper actuator positioning screw 122 as it turns.

As the micro motor 98*c* turns the beam stopper actuator positioning screw 122 clockwise or counterclockwise, the beam stopper actuator positioning screw 122 pulls or pushes the beam stopper actuator rim 119 attached to the beam stopper actuator 117 to the desired position. The beam stopper actuator guide pin 120 stays restrained inside the beam stopper actuator guide rail 121 ensuring that the beam stopper actuator 117 stays leveled and that the movement of the beam stopper actuator 117 stays restrained to the intended linear direction.

The beam stopper handle 116 fits inside the beam stopper actuator slot 118. As the beam stopper actuator 117 moves up or down, the beam stopper actuator slot 118 forces the beam stopper handle 116 to describe an arch around the beam stopper shaft 115 pivoting the beam stopper 114 in the clockwise or counterclockwise directions respectively.

The laser light exiting the optical cartridge slit 71*b* in the optical cartridge A 70 hits the center of the partial mirror 99*a* and all or a portion of the laser light is reflected towards the sampling cavity 41. The non-reflected portion of the laser light continues to the center of the interference mirror 100*a* and is reflected 90 degrees towards the center of the interference mirror 100*b* but in the position represented the transmitted part of the laser light hits the beam stopper 114 and does not reach the interference mirror 100*b*.

The sample spectrum of laser light is further altered by the optical devices 82*g* and 82*l* and exits through the optical cartridge slit 71*d* of the optical cartridge B 73 and continues until it reaches the center of the selection mirror 124 that is held at a precise position and at a precise angle to reflect the altered sample spectrum of laser light towards the desired region of the transmission diffraction grating 210.

The selection mirror 124 is mounted on the selection mirror rail 127 by means of inserting the selection mirror pivoting shaft 125 into the selection mirror rail central pivot 128 and the selection mirror angle control handle 126 into the selection mirror rail guide slot 129 in the selection mirror rail 127.

As the selection mirror 124 pivots around the selection mirror rail central pivot 128, the range of movement of the selection mirror angle control handle 126 is limited by the selection mirror rail guide slot 129 restricting the range of pivoting movement of the selection mirror 124.

The selection mirror rail 127 is also fitted with the selection mirror rail nut 130 and one pair of selection mirror rail alignment pins 131a and 131b underneath that fit and slide inside one corresponding pair of selection mirror rail alignment guides 132a and 132b respectively on the analyzer body 66.

The position of the selection mirror rail 127 is controlled by the selection mirror rail positioning screw 133 driven by the micro motor 98d. As the micro motor 98d turns the selection mirror rail positioning screw 133 clockwise or counterclockwise, the selection mirror rail positioning screw 133 pulls or pushes the selection mirror rail nut 130 attached to the selection mirror rail 127 to the desired position. The selection mirror rail alignment pins 131a and 131b stay restrained inside the respective selection mirror rail alignment guides 132a and 132b on the analyzer body 66 ensuring that the selection mirror rail 127 stays leveled and that the movement of the selection mirror rail 127 stays restrained to the intended linear direction.

The selection mirror rail positioning screw support 134 attached to the analyzer body 66 provides additional support to prevent wobbling of the selection mirror rail positioning screw 133 as it turns.

The angle of the selection mirror 124 is controlled by the position of the selection mirror angle control actuator 135 that is fitted with the selection mirror angle control actuator slot 136 and the selection mirror angle control actuator nut 137. The position of the selection mirror angle control actuator 135 is controlled by the selection mirror angle control actuator positioning screw 138 driven by the micro motor 98e. The selection mirror angle control handle 126 fits and is held inside the selection mirror rail guide slot 129 on the selection mirror rail 127 and the selection mirror angle control actuator slot 136 on the selection mirror angle control actuator 135.

As the micro motor 98e turns the selection mirror angle control actuator positioning screw 138 clockwise or counterclockwise, the selection mirror angle control actuator positioning screw 138 pulls or pushes the selection mirror angle control actuator nut 137 attached to the selection mirror angle control actuator 135 to the desired position. As the selection mirror angle control actuator 135 moves, the selection mirror angle control actuator slot 136 forces the selection mirror angle control handle 126 to slide and assume the position defined by the intersection of the selection mirror rail guide slot 129 and the selection mirror angle control actuator slot 136 pivoting the selection mirror 124 to the desired amount.

The selection mirror angle control actuator positioning screw support 139 attached to the selection mirror rail 127 provides additional support to prevent wobbling of the selection mirror angle control actuator positioning screw 138 as it turns.

The transmission diffraction grating 210 is fitted with the transmission diffraction grating pivoting shaft 211 at the center and the transmission diffraction grating angle control handle 212 at a distance to the transmission diffraction grating pivoting shaft 211.

The transmission diffraction grating 210 is mounted on the transmission diffraction grating rail 213 by means of inserting the transmission diffraction grating pivoting shaft 211 into the transmission diffraction grating rail central pivot 214 and the transmission diffraction grating angle control handle 212 into the transmission diffraction grating rail guide slot 215 in the transmission diffraction grating rail 213.

As the transmission diffraction grating 210 pivots around the transmission diffraction grating rail central pivot 214, the range of movement of the transmission diffraction grating angle control handle 212 is limited by the transmission diffraction grating rail guide slot 215 restricting the range of pivoting movement of the transmission diffraction grating 210.

The transmission diffraction grating rail 213 is also fitted with the transmission diffraction grating rail nut 216 and one pair of transmission diffraction grating rail alignment pins 217a and 217b underneath that fit and slide inside one corresponding pair of transmission diffraction grating rail alignment guides 218a and 218b respectively on the analyzer body 66.

The position of the transmission diffraction grating rail 213 is controlled by the transmission diffraction grating rail positioning screw 219 driven by the micro motor 98f. As the micro motor 98f turns the transmission diffraction grating rail positioning screw 219 clockwise or counterclockwise, the transmission diffraction grating rail positioning screw 219 pulls or pushes the transmission diffraction grating rail nut 216 attached to the transmission diffraction grating rail 213 to the desired position. The transmission diffraction grating rail alignment pins 217a and 217b stay restrained inside the respective transmission diffraction grating rail alignment guides 218a and 218b on the analyzer body 66 ensuring that the transmission diffraction grating rail 213 stays leveled and that the movement of the transmission diffraction grating rail 213 stays restrained to the intended linear direction.

The transmission diffraction grating rail positioning screw support 220 attached to the analyzer body 66 provides additional support to prevent wobbling of the transmission diffraction grating rail positioning screw 219 as it turns.

The angle of the transmission diffraction grating 210 is controlled by the position of the transmission diffraction grating angle control actuator 221 that is fitted with the transmission diffraction grating angle control actuator slot 222 and the transmission diffraction grating angle control actuator nut 223. The position of the transmission diffraction grating angle control actuator 221 is controlled by the transmission diffraction grating angle control actuator positioning screw 224 driven by the micro motor 98g. The transmission diffraction grating angle control handle 212 fits and is held inside the transmission diffraction grating rail guide slot 215 on the transmission diffraction grating rail 213 and the transmission diffraction grating angle control actuator slot 222 on the transmission diffraction grating angle control actuator 221 (see Detail FIG. 21A).

As the micro motor 98g turns the transmission diffraction grating angle control actuator positioning screw 224 clockwise or counterclockwise, the transmission diffraction grating angle control actuator positioning screw 224 pulls or pushes the transmission diffraction grating angle control actuator nut 223 attached to the transmission diffraction grating angle control actuator 221 to the desired position. As the transmission diffraction grating angle control actuator 221 moves, the transmission diffraction grating angle control actuator slot 222 forces the transmission diffraction grating angle control handle 212 to slide and assume the position defined by the intersection of the transmission diffraction grating rail guide slot 215 and the transmission diffraction grating angle control actuator slot 222 pivoting the transmission diffraction grating 210 the desired amount.

The transmission diffraction grating angle control actuator positioning screw support 225 attached to the transmission diffraction grating rail 213 provides additional support to prevent wobbling of the transmission diffraction grating angle control actuator positioning screw 224 as it turns.

The altered sample spectrum laser light that is diffracted by the transmission diffraction grating 210 continues until it reaches the center of the pivoting detector 226 that is held at the optimum precise angle to receive and process the incoming diffracted altered sample spectrum laser light based on the specific tests desired for the analysis of the sample.

The pivoting detector 226 is fitted with the pivoting detector pivoting shaft 227 at the center and the pivoting detector angle control handle 228 at a distance to the pivoting detector pivoting shaft 227.

The pivoting detector pivoting shaft 227 is inserted into the pivoting detector insertion hole 229 in the analyzer body 66. The pivoting detector insertion hole 229 provides the fixed axis around which the pivoting detector 226 is able to pivot.

The pivoting detector angle control actuator 230 is fitted with the pivoting detector angle control actuator slot 231 at a 90 degree angle in one end and with the pivoting detector angle control actuator nut 232 at the other end.

The pivoting detector angle control actuator 230 is also fitted with the pivoting detector angle control actuator guide pin 233 at the bottom face that fits and slides inside the pivoting detector angle control actuator guide rail 234 in the analyzer body 66.

The position of the pivoting detector angle control actuator 230 is controlled by the pivoting detector angle control actuator positioning screw 235 driven by the micro motor 98h. As the micro motor 98h turns the pivoting detector angle control actuator positioning screw 235 clockwise or counterclockwise, the pivoting detector angle control actuator positioning screw 235 pulls or pushes the pivoting detector angle control actuator nut 232 attached to the pivoting detector angle control actuator 230 to the desired position.

The pivoting detector angle control actuator guide pin 233 stays restrained inside the pivoting detector angle control actuator guide rail 234 ensuring that the pivoting detector angle control actuator 230 stays leveled and that the movement of the pivoting detector angle control actuator 230 stays restrained to the intended linear direction.

The pivoting detector angle control actuator positioning screw support 236 attached to the analyzer body 66 provides additional support to prevent wobbling of the pivoting detector angle control actuator positioning screw 235 as it turns.

The pivoting detector angle control handle 228 fits inside the pivoting detector angle control actuator slot 231. As the pivoting detector angle control actuator 230 moves up or down, the pivoting detector angle control actuator slot 231 forces the pivoting detector angle control handle 228 to describe an arch around the pivoting detector pivoting shaft 227 pivoting the pivoting detector 226 in the clockwise or counterclockwise directions respectively.

The case fixation supports 158a and 158b located at the rims of the analyzer body 66 away from the light path hold additional components. The case fixation support 158a provides fixation support to the electronic boards 159a and 159b that contain all the electronics necessary to operate the analyzer device 65 performing all tasks including but not limited to the control of all components, connection to the internet and other devices, storage of information downloaded from the internet or generated inside the analyzer device 65 as results of tests or calculations, processing of the information, preparation of reports and presentations of the results.

The battery 160 provides the energy to run the analyzer device 65 and perform all the functions for the duration that the analyzer device 65 is switched on. The unused case fixation support 158b can be used to provide support for the installation of additional electronic boards 159 or one additional battery 160 in the event that a future upgrade of the analyzer device 65 requires more electronics or power respectively.

The laser absorption barrier 237 absorbs laser beams that would otherwise hit the battery 160 protecting it from potential damage.

Detail FIG. 21A shows the transmission diffraction grating 210 in greater magnification to show the path that light rays hitting the three regions of the transmission diffraction grating 210 follow.

The transmission diffraction grating 210 is fitted with the transmission diffraction grating pivoting shaft 211 at the center and the transmission diffraction grating angle control handle 212 at a distance to the transmission diffraction grating pivoting shaft 211.

The transmission diffraction grating 210 is mounted on the transmission diffraction grating rail 213 by means of inserting the transmission diffraction grating pivoting shaft 211 into the transmission diffraction grating rail central pivot 214 and the transmission diffraction grating angle control handle 212 into the transmission diffraction grating rail guide slot 215 in the transmission diffraction grating rail 213.

As the transmission diffraction grating 210 pivots around the transmission diffraction grating rail central pivot 214, the range of movement of the transmission diffraction grating angle control handle 212 is limited by the transmission diffraction grating rail guide slot 215 restricting the range of pivoting movement of the transmission diffraction grating 210.

The transmission diffraction grating rail 213 is also fitted with the transmission diffraction grating rail nut 216 and one pair of transmission diffraction grating rail alignment pins 217a and 217b underneath that fit and slide inside one corresponding pair of transmission diffraction grating rail alignment guides 218a and 218b respectively on the analyzer body 66.

The position of the transmission diffraction grating rail 213 is controlled by the transmission diffraction grating rail positioning screw 219 driven by the micro motor 98f. As the micro motor 98f turns the transmission diffraction grating rail positioning screw 219 clockwise or counterclockwise, the transmission diffraction grating rail positioning screw 219 pulls or pushes the transmission diffraction grating rail nut 216 attached to the transmission diffraction grating rail 213 to the desired position. The transmission diffraction grating rail alignment pins 217a and 217b stay restrained inside the respective transmission diffraction grating rail alignment guides 218a and 218b on the analyzer body 66 ensuring that the transmission diffraction grating rail 213 stays leveled and that the movement of the transmission diffraction grating rail 213 stays restrained to the intended linear direction.

The angle of the transmission diffraction grating 210 is controlled by the position of the transmission diffraction grating angle control actuator 221 that is fitted with the transmission diffraction grating angle control actuator slot 222 and the transmission diffraction grating angle control actuator nut 223. The position of the transmission diffraction grating angle control actuator 221 is controlled by the transmission diffraction grating angle control actuator positioning screw 224 driven by the micro motor 98g. The transmission diffraction grating angle control handle 212 fits and is held inside the transmission diffraction grating rail guide slot 215 on the transmission diffraction grating rail 213 and the transmission diffraction grating angle control actuator slot 222 on the transmission diffraction grating angle control actuator 221.

As the micro motor 98g turns the transmission diffraction grating angle control actuator positioning screw 224 clockwise or counterclockwise, the transmission diffraction grating angle control actuator positioning screw 224 pulls or pushes the transmission diffraction grating angle control actuator nut 223 attached to the transmission diffraction grating angle control actuator 221 to the desired position. As the transmission diffraction grating angle control actuator 221 moves, the transmission diffraction grating angle control actuator slot 222 forces the transmission diffraction grating angle control handle 212 to slide and assume the position defined by the intersection of the transmission diffraction grating rail guide slot 215 and the transmission diffraction grating angle control actuator slot 222 pivoting the transmission diffraction grating 210 the desired amount.

The transmission diffraction grating angle control actuator positioning screw support 225 attached to the transmission diffraction grating rail 213 provides additional support to prevent wobbling of the transmission diffraction grating angle control actuator positioning screw 224 as it turns.

The first region of the transmission diffraction grating 210 located in the center of the transmission diffraction grating 210 is constructed with a plurality of standard perforations 238 adequate to refract the wavelengths of visible light. One visible laser light incident ray 241 coming from the selection mirror 124 hits the transmission diffraction grating 210 at a 90 degree angle. As the standard perforations 238 have parallel openings, the visible laser light incident ray 241 is partially transmitted and one visible laser light transmitted ray 242 is produced at the other side of the transmission diffraction grating 210 at the same orientation of the visible laser light incident ray 241. One visible laser light diffracted ray 243 is produced at the first diffraction angle.

The pivoting detector 226 is positioned at the optimum angle to capture the visible laser light diffracted ray 243. The visible laser light transmitted ray 242 misses the pivoting detector 226 hitting the laser absorption barrier 237 and is absorbed.

The second region of the transmission diffraction grating 210 located at the right side of the transmission diffraction grating 210 is constructed with wider perforations 239 adequate to refract the wavelengths of infrared light. One infrared laser light incident ray 244 coming from the selection mirror 124 hits the transmission diffraction grating 210 at a 90 degree angle. As the wider perforations 239 have parallel openings, the infrared laser light incident ray 244 is partially transmitted and one infrared laser light transmitted ray 245 is produced at the other side of the transmission diffraction grating 210 at the same orientation of the infrared laser light incident ray 244. One infrared laser light diffracted ray 246 is produced at the first diffraction angle. As the infrared light has a longer wavelength than the visible light, the first diffraction angle of the infrared light occurs at a slightly larger angle than the first diffraction angle of the visible light.

The difference can be ascertained using the parallel line to the visible laser light diffracted ray 247a drawn in Detail FIG. 21A.

The pivoting detector 226 is positioned at the optimum angle to capture the infrared laser light diffracted ray 246. The infrared laser light transmitted ray 245 misses the pivoting detector 226 hitting the laser absorption barrier 237 and is absorbed (see FIG. 22 and FIG. 23).

The second region of the transmission diffraction grating 210 with wider perforations 239 is designed to be located at the right side of the transmission diffraction grating 210, further from pivoting detector 226 than the other regions because the larger angle of diffraction of the infrared light causes the infrared laser light transmitted ray 245 and the infrared laser light diffracted ray 246 to diverge more rapidly. As a result, the infrared laser light diffracted ray 246 is able to cover the longer distance and hit the pivoting detector 226.

The third region of the transmission diffraction grating 210 located at the left side of the transmission diffraction grating 210 is constructed with narrower perforations 240 adequate to refract the wavelengths of ultraviolet light. One ultraviolet laser light incident ray 248 coming from the selection mirror 124 hits the transmission diffraction grating 210 at a 90 degree angle. As the narrower perforations 240 have parallel openings, the ultraviolet laser light incident ray 248 is partially transmitted and one ultraviolet laser light transmitted ray 249 is produced at the other side of the transmission diffraction grating 210 at the same orientation of the ultraviolet laser light incident ray 248. One ultraviolet laser light diffracted ray 250 is produced at the first diffraction angle. As the ultraviolet light has a shorter wavelength than the visible light, the first diffraction angle of the ultraviolet light occurs at a slightly smaller angle than the first diffraction angle of the visible light.

The difference can be ascertained using the parallel line to the visible laser light diffracted ray 247b drawn in Detail FIG. 21A.

The pivoting detector 226 is positioned at the optimum angle to capture the ultraviolet laser light diffracted ray 250. The ultraviolet laser light transmitted ray 249 misses the pivoting detector 226 hitting the laser absorption barrier 237 and is absorbed (see FIG. 26 and FIG. 27).

The third region of the transmission diffraction grating 210 with narrower perforations 240 is designed to be located at the left side of the transmission diffraction grating 210, closer to the pivoting detector 226 than the other regions because the smaller angle of diffraction of the ultraviolet light causes the ultraviolet laser light transmitted ray 249 and the ultraviolet laser light diffracted ray 250 to diverge more slowly. The ultraviolet laser light diffracted ray 250 is able to hit the pivoting detector 226 due to the shorter distance it has to cover.

FIG. 22 shows an isometric cutout view of the analyzer device 65 with the vertical walls of the analyzer body 66 cut at a small distance to the bottom base to facilitate the view of the other components of the analyzer device 65 in operation using infrared light beams without interferometry.

The laser tray 89 is positioned to select the infrared laser emitter 91, that is moved to the position in front of the optical cartridge slit 71*a* of the optical cartridge A 70. In this position, the laser tray guide pin 95 is at the right end of the laser tray guide rail 96.

The infrared laser emitter 91 is turned on and the infrared laser light emitted beam 174 is produced. The infrared laser light emitted beam 174 passes through the optical cartridge slit 71*a*, is modified by the active optical devices 82*b* and 82*e* inside the optical cartridge A 70 in this example and passes through the optical cartridge slit 71*b* that collimates the infrared laser light emitted beam 174 producing the infrared laser light collimated and preprocessed beam 175 that continues inside the analyzer device 65 until it hits the center of the partial mirror 99*a*.

The infrared laser light collimated and preprocessed beam 175 is partially reflected producing the infrared laser light beam passing through the sampling cavity 176 that passes through the center of the sampling cavity 41. The infrared laser light beam passing through the sampling cavity 176 as modified by the optical devices 82*b* and 82*e* interacts with the substances present in a sample located inside the sampling cavity 41 further altering the characteristics of the infrared laser light producing a sample spectrum of infrared laser light that continues to hit the center of the partial mirror 99*b*.

The infrared laser light collimated and preprocessed beam 175 is also partially transmitted at the partial mirror 99*a* producing the infrared laser light beam transmitted to interferometer 177. The infrared laser light beam transmitted to interferometer 177 continues and hits the center of the interference mirror 100*a* and the infrared laser light beam reflected in the interferometer 178 is produced and directed towards the center of the interference mirror 100*b*. The beam stopper 114 is in the interference light path resulting in the infrared laser light beam absorbed by beam stopper 179 so that none of infrared laser light beam reflected in the interferometer 178 reaches the interference mirror 100*b* to be reflected towards the partial mirror 99*b*.

The partial mirror 99*b* then reflects only the sample spectrum of infrared laser light coming from the sampling cavity 41 into the infrared laser light modified beam 181 that is directed to the center of the optical cartridge slit 71*c* in the optical cartridge B 73. The infrared laser light modified beam 181 enters the optical cartridge slit 71*c* and is modified again by the active optical devices 82*i* and 82*j* inside the optical cartridge B 73 in this example and exits through the optical cartridge slit 71*d* being collimated a second time in the process of passing through the optical cartridge slits 71*c* and 71*d* resulting in the infrared laser light modified and post processed beam 182.

The infrared laser light modified and post processed beam 182 hits the center of the selection mirror 124 that is located at the right position and at the right angle to reflect the infrared laser light modified and post processed beam 182 producing the infrared laser light incident beam 251 aimed into the second region at the right side of the transmission diffraction grating 210 that is constructed with wider perforations 239 adequate to refract the wavelengths of infrared light. The transmission diffraction grating 210 is located at the right position and at the right angle to produce the infrared laser light transmitted beam 252 aimed at the laser absorption barrier 237 and the infrared laser light diffracted beam 253 aimed at the center of the pivoting detector 226.

The infrared laser light transmitted beam 252 and the infrared laser light diffracted beam 253 diverge as they follow their paths. The infrared laser light diffracted beam 253 hits the center of the pivoting detector 226 that is held at the optimum precise angle to receive and process the infrared laser light diffracted beam 253 based on the specific tests desired for the analysis of the sample. The infrared laser light transmitted beam 252 on the other hand misses the pivoting detector 226 and is absorbed at the laser absorption barrier 237 of the analyzer body 66 at the right side of the pivoting detector 226.

FIG. 23 shows an isometric cutout view of the analyzer device 65 with the vertical walls of the analyzer body 66 cut at a small distance to the bottom base to facilitate the view of the other components of the analyzer device 65 in operation using infrared light beams with interferometry.

The laser tray 89 is positioned to select the infrared laser emitter 91, that is moved to the position in front of the optical cartridge slit 71*a* of the optical cartridge A 70. In this position, the laser tray guide pin 95 is at the right end of the laser tray guide rail 96.

The infrared laser emitter 91 is turned on and the infrared laser light emitted beam 174 is produced. The infrared laser light emitted beam 174 passes through the optical cartridge slit 71*a*, is modified by the active optical devices 82*b* and 82*e* inside the optical cartridge A 70 in this example and passes through the optical cartridge slit 71*b* that collimates the infrared laser light emitted beam 174 producing the infrared laser light collimated and preprocessed beam 175 that continues inside the analyzer device 65 until it hits the center of the partial mirror 99*a*.

The infrared laser light collimated and preprocessed beam 175 is partially reflected producing the infrared laser light beam passing through the sampling cavity 176 that passes through the center of the sampling cavity 41. The infrared laser light beam passing through the sampling cavity 176 as modified by the optical devices 82*b* and 82*e* interacts with the substances present in a sample located inside the sampling cavity 41 further altering the characteristics of the infrared laser light producing a sample spectrum of infrared laser light that continues to hit the center of the partial mirror 99*b*.

The infrared laser light collimated and preprocessed beam 175 is also partially transmitted at the partial mirror 99*a* producing the infrared laser light beam transmitted to interferometer 177. The infrared laser light beam transmitted to interferometer 177 continues to the center of the interference mirror 100*a* and the infrared laser light beam reflected in the interferometer 178 is produced and directed towards the center of the interference mirror 100*b*. The beam stopper 114 is out of the interference light path and the infrared laser light beam reflected in the interferometer 178 is reflected at the interference mirror 100*b* resulting in the infrared laser light beam exiting the interferometer 180 and being directed to the partial mirror 99*b*.

The interference mirror positioning device control bar 105 is moved up or down according and the interference mirror positioning device control bar slot 107 pulls or pushes the interference mirror positioning device pin 104 resulting in a small adjustment in the position of the interference mirror positioning device 101 that shortens or increases the length of the interferometer light path the exact amount to achieve destructive interference with the sample spectrum of infrared laser light path going through the sampling cavity 41.

The partial mirror 99*b* then combines the sample spectrum of infrared laser light beam passing through the sampling cavity 176 and the infrared laser light beam exiting the interferometer 180 producing the infrared laser light modified beam 181 that is directed to the center of the optical cartridge slit 71*c* in the optical cartridge B 73. The infrared laser light modified beam 181 enters the optical cartridge slit 71c and is modified again by the active optical devices 82i and 82j inside the optical cartridge B 73 in this example and exits through the optical cartridge slit 71d being collimated a second time in the process of passing through the optical cartridge slits 71c and 71d resulting in the infrared laser light modified and post processed beam 182.

The infrared laser light modified and post processed beam 182 hits the center of the selection mirror 124 that is located at the right position and at the right angle to reflect the infrared laser light modified and post processed beam 182 producing the infrared laser light incident beam 251 aimed into the second region at the right side of the transmission diffraction grating 210 that is constructed with wider perforations 239 adequate to refract the wavelengths of infrared light. The transmission diffraction grating 210 is located at the right position and at the right angle to produce the infrared laser light transmitted beam 252 aimed at the laser absorption barrier 237 and the infrared laser light diffracted beam 253 aimed at the center of the pivoting detector 226.

The infrared laser light transmitted beam 252 and the infrared laser light diffracted beam 253 diverge as they follow their paths. The infrared laser light diffracted beam 253 hits the center of the pivoting detector 226 that is held at the optimum precise angle to receive and process the infrared laser light diffracted beam 253 based on the specific tests desired for the analysis of the sample. The infrared laser light transmitted beam 252 on the other hand misses the pivoting detector 226 and is absorbed at the laser absorption barrier 237 of the analyzer body 66 at the right side of the pivoting detector 226.

FIG. 24 shows an isometric cutout view of the analyzer device 65 with the vertical walls of the analyzer body 66 cut at a small distance to the bottom base to facilitate the view of the other components of the analyzer device 65 in operation using visible light beams without interferometry.

The laser tray 89 is positioned to select the visible laser emitter 92, that is moved to the position in front of the optical cartridge slit 71a of the optical cartridge A 70. In this position, the laser tray guide pin 95 is at the center of the laser tray guide rail 96.

The visible laser emitter 92 is turned on and the visible laser light emitted beam 186 is produced. The visible laser light emitted beam 186 passes through the optical cartridge slit 71a, is modified by the active optical devices 82a and 82d inside the optical cartridge A 70 in this example and passes through the optical cartridge slit 71b that collimates the visible laser light emitted beam 186 producing the visible laser light collimated and preprocessed beam 187 that continues inside the analyzer device 65 until it hits the center of the partial mirror 99a.

The visible laser light collimated and preprocessed beam 187 is partially reflected producing the visible laser light beam passing through the sampling cavity 188 that passes through the center of the sampling cavity 41. The visible laser light beam passing through the sampling cavity 188 as modified by the optical devices 82a and 82d interacts with the substances present in a sample located inside the sampling cavity 41 further altering the characteristics of the visible laser light producing a sample spectrum of visible light that continues to hit the center of the partial mirror 99b.

The visible laser light collimated and preprocessed beam 187 is also partially transmitted at the partial mirror 99a producing the visible laser light beam transmitted to interferometer 189. The visible laser light beam transmitted to interferometer 189 continues and hits the center of the interference mirror 100a and the visible laser light beam reflected in the interferometer 190 is produced and directed towards the center of the interference mirror 100b. The beam stopper 114 is in the interference light path resulting in the visible laser light beam absorbed by beam stopper 191 so that none of the visible laser light beam reflected in the interferometer 190 reaches the interference mirror 100b to be reflected towards the partial mirror 99b.

The partial mirror 99b then reflects only the sample spectrum visible laser light coming from the sampling cavity 41 producing the visible laser light modified beam 193 that is directed to the center of the optical cartridge slit 71c in the optical cartridge B 73. The visible laser light modified beam 193 enters the optical cartridge slit 71c and is modified again by the active optical devices 82g and 82l inside the optical cartridge B 73 in this example and exits through the optical cartridge slit 71d being collimated a second time in the process of passing through the optical cartridge slits 71c and 71d resulting in the visible laser light modified and post processed beam 194.

The visible laser light modified and post processed beam 194 hits the center of the selection mirror 124 that is located at the right position and at the right angle to reflect the visible laser light modified and post processed beam 194 producing the visible laser light incident beam 254 aimed into the first region at the center of the transmission diffraction grating 210 that is constructed with standard perforations 238 adequate to refract the wavelengths of visible light. The transmission diffraction grating 210 is located at the right position and at the right angle to produce the visible laser light transmitted beam 255 aimed at the laser absorption barrier 237 and the visible laser light diffracted beam 256 aimed at the center of the pivoting detector 226.

The visible laser light transmitted beam 255 and the visible laser light diffracted beam 256 diverge as they follow their paths. The visible laser light diffracted beam 256 hits the center of the pivoting detector 226 that is held at the optimum precise angle to receive and process the visible laser light diffracted beam 256 based on the specific tests desired for the analysis of the sample. The visible laser light transmitted beam 255 on the other hand misses the pivoting detector 226 and is absorbed at the laser absorption barrier 237 of the analyzer body 66 at the right side of the pivoting detector 226.

FIG. 25 shows an isometric cutout view of the analyzer device 65 with the vertical walls of the analyzer body 66 cut at a small distance to the bottom base to facilitate the view of the other components of the analyzer device 65 in operation using visible light beams with interferometry.

The laser tray 89 is positioned to select the visible laser emitter 92, that is moved to the position in front of the optical cartridge slit 71a of the optical cartridge A 70. In this position, the laser tray guide pin 95 is at the center of the laser tray guide rail 96.

The visible laser emitter 92 is turned on and the visible laser light emitted beam 186 is produced. The visible laser light emitted beam 186 passes through the optical cartridge slit 71a, is modified by the active optical devices 82a and 82d inside the optical cartridge A 70 in this example and passes through the optical cartridge slit 71b that collimates the visible laser light emitted beam 186 producing the visible laser light collimated and preprocessed beam 187 that continues inside the analyzer device 65 until it hits the center of the partial mirror 99a.

The visible laser light collimated and preprocessed beam 187 is partially reflected producing the visible laser light beam passing through the sampling cavity 188 that passes through the center of the sampling cavity 41. The visible laser light beam passing through the sampling cavity 188 as modified by the optical devices 82*a* and 82*d* interacts with the substances present in a sample located inside the sampling cavity 41 further altering the characteristics of the visible laser light producing a sample spectrum of visible laser light that continues to the center of the partial mirror 99*b*.

The visible laser light collimated and preprocessed beam 187 is also partially transmitted at the partial mirror 99*a* producing the visible laser light beam transmitted to interferometer 189. The visible laser light beam transmitted to interferometer 189 continues to the center of the interference mirror 100*a* and the visible laser light beam reflected in the interferometer 190 is produced and directed towards the center of the interference mirror 100*b*. The beam stopper 114 is out of the interference light path and the visible laser light beam reflected in the interferometer 190 is reflected at the interference mirror 100*b* resulting in the visible laser light beam exiting the interferometer 192 and being directed to the partial mirror 99*b*.

The interference mirror positioning device control bar 105 is moved up or down according and the interference mirror positioning device control bar slot 107 pulls or pushes the interference mirror positioning device pin 104 resulting in a small adjustment in the position of the interference mirror positioning device 101 that shortens or increases the length of the interferometer light path the exact amount to achieve destructive interference with the sample spectrum of visible laser light path going through the sampling cavity 41.

The partial mirror 99*b* then combines the sample spectrum of visible laser light beam passing through the sampling cavity 188 and the visible laser light beam exiting the interferometer 192 producing the visible laser light modified beam 193 that is directed to the center of the optical cartridge slit 71*c* in the optical cartridge B 73. The visible laser light modified beam 193 enters the optical cartridge slit 71*c* and is modified again by the active optical devices 82*g* and 82*l* inside the optical cartridge B 73 in this example and exits through the optical cartridge slit 71*d* being collimated a second time in the process of passing through the optical cartridge slits 71*c* and 71*d* resulting in the visible laser light modified and post processed beam 194.

The visible laser light modified and post processed beam 194 hits the center of the selection mirror 124 that is located at the right position and at the right angle to reflect the visible laser light modified and post processed beam 194 producing the visible laser light incident beam 254 aimed into the first region at the center of the transmission diffraction grating 210 that is constructed with standard perforations 238 adequate to refract the wavelengths of visible light. The transmission diffraction grating 210 is located at the right position and at the right angle to produce the visible laser light transmitted beam 255 aimed at the laser absorption barrier 237 and the visible laser light diffracted beam 256 aimed at the center of the pivoting detector 226.

The visible laser light transmitted beam 255 and the visible laser light diffracted beam 256 diverge as they follow their paths. The visible laser light diffracted beam 256 hits the center of the pivoting detector 226 that is held at the optimum precise angle to receive and process the visible laser light diffracted beam 256 based on the specific tests desired for the analysis of the sample. The visible laser light transmitted beam 255 on the other hand misses the pivoting detector 226 and is absorbed at the laser absorption barrier 237 of the analyzer body 66 at the right side of the pivoting detector 226.

FIG. 26 shows an isometric cutout view of the analyzer device 65 with the vertical walls of the analyzer body 66 cut at a small distance to the bottom base to facilitate the view of the other components of the analyzer device 65 in operation using ultraviolet light beams without interferometry.

The laser tray 89 is positioned to select the ultraviolet laser emitter 93, that is moved to the position in front of the optical cartridge slit 71*a* of the optical cartridge A 70. In this position, the laser tray guide pin 95 is at the left end of the laser tray guide rail 96.

The ultraviolet laser emitter 93 is turned on and the ultraviolet laser light emitted beam 198 is produced. The ultraviolet laser light emitted beam 198 passes through the optical cartridge slit 71*a*, is modified by the active optical devices 82*c* and 82*f* inside the optical cartridge A 70 in this example and passes through the optical cartridge slit 71*b* that collimates the ultraviolet laser light emitted beam 198 producing the ultraviolet laser light collimated and preprocessed beam 199 that continues inside the analyzer device 65 until it hits the center of the partial mirror 99*a*.

The ultraviolet laser light collimated and preprocessed beam 199 is partially reflected producing the ultraviolet laser light beam passing through the sampling cavity 200 that passes through the center of the sampling cavity 41. The ultraviolet laser light beam passing through the sampling cavity 200 as modified by the optical devices 82*c* and 82*f* interacts with the substances present in a sample located inside the sampling cavity 41 further altering the characteristics of the ultraviolet laser light producing a sample spectrum of ultraviolet laser light that continues to the center of the partial mirror 99*b*.

The ultraviolet laser light collimated and preprocessed beam 199 is also partially transmitted at the partial mirror 99*a* producing the ultraviolet laser light beam transmitted to interferometer 201.

The ultraviolet laser light beam transmitted to interferometer 201 continues and hits the center of the interference mirror 100*a* and the ultraviolet laser light beam reflected in the interferometer 202 is produced and directed towards the center of the interference mirror 100*b*. The beam stopper 114 is in the interference light path resulting in the ultraviolet laser light beam absorbed by beam stopper 203 so that none of the ultraviolet laser light beam reflected in the interferometer 202 reaches the interference mirror 100*b* to be reflected towards the partial mirror 99*b*.

The partial mirror 99*b* then reflects only the sample spectrum of ultraviolet laser light coming from the sampling cavity 41 as the ultraviolet laser light modified beam 205 that is directed at the center of the optical cartridge slit 71*c* in the optical cartridge B 73. The ultraviolet laser light modified beam 205 enters the optical cartridge slit 71*c* and is modified again by the active optical devices 82*h* and 82*k* inside the optical cartridge B 73 in this example and exits through the optical cartridge slit 71*d* being collimated a second time in the process of passing through the optical cartridge slits 71*c* and 71*d* resulting in the ultraviolet laser light modified and post processed beam 206.

The ultraviolet laser light modified and post processed beam 206 hits the center of the selection mirror 124 that is located at the right position and at the right angle to reflect the ultraviolet laser light modified and post processed beam 206 producing the ultraviolet laser light incident beam 257 aimed into the third region at the left side of the transmission diffraction grating 210 that is constructed with narrower perforations 240 adequate to refract the wavelengths of ultraviolet light. The transmission diffraction grating 210 is located at the right position and at the right angle to produce the ultraviolet laser light transmitted beam 258 aimed at the laser absorption barrier 237 and the ultraviolet laser light diffracted beam 259 aimed at the center of the pivoting detector 226.

The ultraviolet laser light transmitted beam 258 and the ultraviolet laser light diffracted beam 259 diverge as they follow their paths. The ultraviolet laser light diffracted beam 259 hits the center of the pivoting detector 226 that is held at the optimum precise angle to receive and process the ultraviolet laser light diffracted beam 259 based on the specific tests desired for analysis of the sample. The ultraviolet laser light transmitted beam 258 on the other hand misses the pivoting detector 226 and is absorbed at the laser absorption barrier 237 of the analyzer body 66 at the right side of the pivoting detector 226.

FIG. 27 shows an isometric cutout view of the analyzer device 65 with the vertical walls of the analyzer body 66 cut at a small distance to the bottom base to facilitate the view of the other components of the analyzer device 65 in operation using ultraviolet light beams with interferometry.

The laser tray 89 is positioned to select the ultraviolet laser emitter 93, that is moved to the position in front of the optical cartridge slit 71a of the optical cartridge A 70. In this position, the laser tray guide pin 95 is at the left end of the laser tray guide rail 96.

The ultraviolet laser emitter 93 is turned on and the ultraviolet laser light emitted beam 198 is produced. The ultraviolet laser light emitted beam 198 passes through the optical cartridge slit 71a, is modified by the active optical devices 82c and 82f inside the optical cartridge A 70 in this example and passes through the optical cartridge slit 71b that collimates the ultraviolet laser light emitted beam 198 producing the ultraviolet laser light collimated and preprocessed beam 199 that continues inside the analyzer device 65 until it hits the center of the partial mirror 99a.

The ultraviolet laser light collimated and preprocessed beam 199 is partially reflected producing the ultraviolet laser light beam passing through the sampling cavity 200 that passes through the center of the sampling cavity 41. The ultraviolet laser light beam passing through the sampling cavity 200 as modified by the optical devices 82c and 82f interacts with the substances present in a sample located inside the sampling cavity 41 further altering the characteristics of the ultraviolet laser light producing a sample spectrum of ultraviolet laser light that continues to hit the center of the partial mirror 99b.

The ultraviolet laser light collimated and preprocessed beam 199 is also partially transmitted at the partial mirror 99a producing the ultraviolet laser light beam transmitted to interferometer 201. The ultraviolet laser light beam transmitted to interferometer 201 continues and hits the center of the interference mirror 100a and the ultraviolet laser light beam reflected in the interferometer 202 is produced and directed towards the center of the interference mirror 100b. The beam stopper 114 is out of the interference light path and the ultraviolet laser light beam reflected in the interferometer 202 is reflected at the interference mirror 100b resulting in the ultraviolet laser light beam exiting the interferometer 204 and being directed to the partial mirror 99b.

The interference mirror positioning device control bar 105 is moved up or down according and the interference mirror positioning device control bar slot 107 pulls or pushes the interference mirror positioning device pin 104 resulting in a small adjustment in the position of the interference mirror positioning device 101 that shortens or increases the length of the interferometer light path the exact amount to achieve destructive interference with the sample spectrum of ultraviolet laser light path going through the sampling cavity 41.

The partial mirror 99b then combines the sample spectrum of ultraviolet laser light beam passing through the sampling cavity 200 and the ultraviolet laser light beam exiting the interferometer 204 producing the ultraviolet laser light modified beam 205 that is directed to the center of the optical cartridge slit 71c in the optical cartridge B 73. The ultraviolet laser light modified beam 205 enters the optical cartridge slit 71c and is modified again by the active optical devices 82h and 82k inside the optical cartridge B 73 in this example and exits through the optical cartridge slit 71d being collimated a second time in the process of passing through the optical cartridge slits 71c and 71d resulting in the ultraviolet laser light modified and post processed beam 206.

The ultraviolet laser light modified and post processed beam 206 hits the center of the selection mirror 124 that is located at the right position and at the right angle to reflect the ultraviolet laser light modified and post processed beam 206 producing the ultraviolet laser light incident beam 257 aimed into the third region at the left side of the transmission diffraction grating 210 that is constructed with narrower perforations 240 adequate to refract the wavelengths of ultraviolet light. The transmission diffraction grating 210 is located at the right position and at the right angle to produce the ultraviolet laser light transmitted beam 258 aimed at the laser absorption barrier 237 and the ultraviolet laser light diffracted beam 259 aimed at the center of the pivoting detector 226.

The ultraviolet laser light transmitted beam 258 and the ultraviolet laser light diffracted beam 259 diverge as they follow their paths. The ultraviolet laser light diffracted beam 259 hits the center of the pivoting detector 226 that is held at the optimum precise angle to receive and process the ultraviolet laser light diffracted beam 259 based on the specific tests desired for the analysis of the sample. The ultraviolet laser light transmitted beam 258 on the other hand misses the pivoting detector 226 and is absorbed at the laser absorption barrier 237 of the analyzer body 66 at the right side of the pivoting detector 226.

Conclusion

A new simple and compact multipurpose analyzer device that uses laser spectroscopy as the primary means to detect substances in a sample is proposed. The analyzer device uses different laser wavelengths and a variety of optical devices to enable the execution of a variety of spectroscopy analyses using absorption, reflective, excitation, resonance, Raman, among other techniques with and without interferometry.

The analyzer device is portable, affordable and simple to operate allowing a regular user but also an elderly or partially disabled person to own it and perform a variety of tests at home following a simple procedure generating results with a high level of precision and accuracy enabled by spectroscopy analyses.

The tests can be repeated at more frequent intervals and can be sent digitally via internet to skilled medical personnel for prompt evaluation of the results and the assessment of the necessity of internment in a hospital for emergency or planned treatment.

The analyzer device can be used to detect a variety of substances, pathogens and contaminants in samples from a variety of sources including food samples, beverages, body fluids and many more being an effective tool to prevent diseases, detect problematic health conditions or health hazards and help improve the overall health condition and wellbeing of the population.

| DRAWINGS—REFERENCE NUMERALS | |
|---|---|
| N Item Name | Shown in Figures |
| 40 sampling window | 1 2 3 4 5 8 9 11 18 19 21 |
| 41 sampling cavity | 1 8 9 10 11 12 13 14 15 16 17 18 19 20 21 22 23 24 25 26 27 |
| 42 finger | 1 |
| 43 hand | 1 |
| 44 container | 1A 2 |
| 45 container sampling cavity | 1A |
| 46 container alignment rim | 1A |
| 47 container opening | 1A |
| 48 container lid | 1A 2 |
| 49 container opening seal | 1A |
| 50 thin container | 1B 3 |
| 51 reduced volume body | 1B |
| 52 thin container sampling cavity | 1B |
| 53 bottom alignment body | 1B |
| 54 top alignment body | 1B |
| 55 thin container alignment rim | 1B |
| 56 thin container opening | 1B |
| 57 thin container lid | 1B 3 |
| 58 thin container opening seal | 1B |
| 59 blower device | 1C 4 |
| 60 blower sampling cavity | 1C |
| 61 blower cavity exit hole | 1C 4 |
| 62 blower alignment rim | 1C 4 |
| 63 blower neck | 1C |
| 64 blower mouthpiece | 1C 4 |
| 65 analyzer device | 2 3 4 5 8 9 10 11 12 13 14 15 16 17 18 19 20 21 22 23 24 25 26 27 |
| 66 analyzer body | 2 3 4 5 8 9 10 11 12 13 14 15 16 17 18 19 20 21 22 23 24 25 26 27 |
| 67 analyzer lid | 2 3 4 5 |
| 68 analyzer lid opening cover | 2 3 4 5 |
| 69 analyzer lid opening | 5 |
| 70 optical cartridge A | 5 6 7 8 10 11 12 13 14 15 16 17 18 20 21 22 23 24 25 26 27 |
| 71 optical cartridge slit | 5 6 7 8 10 11 12 13 14 15 16 17 18 20 21 22 23 24 25 26 27 |
| 72 optical cartridge lid | 5 6 |
| 73 optical cartridge B | 5 8 10 11 12 13 14 15 16 17 18 20 21 22 23 24 25 26 27 |
| 74 optical cartridge case | 6 7 |
| 75 incident laser beam | 6 |
| 76 laser beam chopped portion | 6 |
| 77 collimated laser beam | 6 |
| 78 recollimated laser beam | 6 |
| 79 optical cartridge guide rail | 6 6A 7 |
| 80 optical cartridge guide rail contact | 6 6A 7 |
| 81 permanent magnet | 6 7 |
| 82 optical device | 6 7 8 10 11 12 13 14 15 16 17 18 20 21 22 23 24 25 26 27 |
| 83 optical device frame | 6 |
| 84 electromagnet | 6 7 |
| 85 optical device bottom contact | 6 |
| 86 optical device top contact | 6 |
| 87 optical device active part | 6 7 |
| 88 cartridge installation site | 9 19 |
| 89 laser LED tray | 5 8 9 10 11 12 13 14 15 16 17 18 19 20 21 22 23 24 25 26 27 |
| 90 laser LED tray rim | 5 8 9 11 18 19 21 |
| 91 infrared laser LED | 5 8 9 11 12 13 18 19 21 22 23 |
| 92 visible laser LED | 5 8 9 10 11 14 15 18 19 20 21 24 25 |
| 93 ultraviolet laser LED | 5 8 9 11 16 17 18 19 21 26 27 |
| 94 laser LED tray positioning screw | 5 8 9 11 11A 18 19 21 |
| 95 laser LED tray guide pin | 8 9 10 11 12 13 14 15 16 17 18 19 20 21 22 23 24 25 26 27 |
| 96 laser LED tray guide rail | 8 9 10 11 12 13 14 15 16 17 18 19 20 21 22 23 24 25 26 27 |
| 97 laser LED tray positioning screw support | 8 9 11 18 19 21 |
| 98 micro motor | 5 8 9 11 11A 18 19 21 21A |
| 99 partial mirror | 8 10 11 12 13 14 15 16 17 18 20 21 22 23 24 25 26 27 |
| 100 interference mirror | 8 9 10 11 12 13 14 15 16 17 18 19 20 21 22 23 24 25 26 27 |
| 101 interference mirror positioning device | 8 9 10 11 12 13 14 15 16 17 18 19 20 21 22 23 24 25 26 27 |

-continued

| DRAWINGS—REFERENCE NUMERALS | |
|---|---|
| N Item Name | Shown in Figures |
| 102 mirror support | 8 9 11 18 19 21 |
| 103 interference mirror positioning device arm | 8 9 11 18 19 21 |
| 104 interference mirror positioning device pin | 8 9 11 12 13 14 15 16 17 18 19 21 22 23 24 25 26 27 |
| 105 interference mirror positioning device control bar | 8 9 11 12 13 14 15 16 17 18 19 21 22 23 24 25 26 27 |
| 106 interference mirror positioning device control bar rim | 8 9 11 18 19 21 |
| 107 interference mirror positioning device control bar slot | 8 9 11 12 13 14 15 16 17 18 19 21 22 23 24 25 26 27 |
| 108 interference mirror positioning device guide pin | 8 9 11 18 19 21 |
| 109 interference mirror positioning device guide rail | 8 9 11 18 19 21 |
| 110 interference mirror positioning device guide pin | 9 11 19 21 |
| 111 interference mirror positioning device guide slot | 9 11 19 21 |
| 112 interference mirror positioning device control bar positioning screw | 8 9 11 18 19 21 |
| 113 interference mirror positioning device control bar positioning screw support | 8 9 11 18 19 21 |
| 114 beam stopper | 8 9 10 11 12 13 14 15 16 17 18 19 20 21 22 23 24 25 26 27 |
| 115 beam stopper shaft | 8 9 11 18 19 21 |
| 116 beam stopper handle | 8 9 10 11 18 19 20 21 |
| 117 beam stopper actuator | 8 9 10 11 18 19 20 21 |
| 118 beam stopper actuator slot | 8 9 10 11 18 19 20 21 |
| 119 beam stopper actuator rim | 8 9 11 18 19 21 |
| 120 beam stopper actuator guide pin | 8 9 11 18 19 21 |
| 121 beam stopper actuator guide rail | 8 9 11 18 19 21 |
| 122 beam stopper actuator positioning screw | 8 9 11 18 19 21 |
| 123 beam stopper actuator positioning screw support | 8 9 11 18 19 21 |
| 124 selection mirror | 8 9 10 11 12 13 14 15 16 17 18 19 20 21 22 23 24 25 26 27 |
| 125 selection mirror pivoting shaft | 8 9 10 11 18 19 20 21 |
| 126 selection mirror angle control handle | 8 9 10 11 18 19 20 21 |
| 127 selection mirror rail | 8 9 11 18 19 21 |
| 128 selection mirror rail central pivot | 8 9 11 18 19 21 |
| 129 selection mirror rail guide slot | 8 9 11 18 19 21 |
| 130 selection mirror rail nut | 8 9 10 11 18 19 20 21 |
| 131 selection mirror rail alignment pin | 8 9 11 18 19 21 |
| 132 selection mirror rail alignment guide | 8 9 11 18 19 21 |
| 133 selection mirror rail positioning screw | 8 9 10 11 18 19 20 21 |
| 134 selection mirror rail positioning screw support | 8 9 11 18 19 21 |
| 135 selection mirror angle control actuator | 8 9 10 11 18 19 20 21 |
| 136 selection mirror angle control actuator slot | 8 9 10 11 18 19 20 21 |
| 137 selection mirror angle control actuator nut | 8 9 10 11 18 19 20 21 |
| 138 selection mirror angle control actuator positioning screw | 8 9 10 11 18 19 20 21 |
| 139 selection mirror angle control actuator positioning screw support | 8 9 11 18 19 21 |
| 140 reflective diffraction grating | 8 10 10A 11 11A 12 13 14 15 16 17 |
| 141 reflective diffraction grating support | 8 9 11 11A |
| 142 moving detector | 8 9 10 11 12 13 14 15 16 17 |
| 143 moving detector pivoting shaft | 8 9 10 11 |
| 144 moving detector angle control handle | 8 9 10 11 |
| 145 moving detector rail | 8 9 11 |
| 146 moving detector rail central pivot | 8 9 11 |
| 147 moving detector rail guide slot | 8 9 11 |
| 148 moving detector rail nut | 8 9 10 11 |
| 149 moving detector rail alignment pin | 8 9 11 |
| 150 moving detector rail alignment guide | 8 9 11 |
| 151 moving detector rail positioning screw | 8 9 10 11 |
| 152 moving detector rail positioning screw support | 8 9 11 |
| 153 moving detector rail angle control actuator | 8 9 10 11 |
| 154 moving detector rail angle control actuator slot | 8 9 10 11 |
| 155 moving detector rail angle control actuator nut | 8 9 10 11 |
| 156 moving detector rail angle control actuator positioning screw | 8 9 10 11 |
| 157 moving detector rail angle control actuator positioning screw support | 8 9 11 |
| 158 case fixation support | 8 9 11 18 19 21 |
| 159 electronic board | 8 10 11 18 21 |
| 160 battery | 8 10 11 18 21 |
| 161 medium standard indentation | 10A 11A 14 15 |
| 162 coarse deeper indentation | 10A 11A 12 13 |
| 163 fine shallower indentation | 10A 11A 16 17 |
| 164 visible laser light incident ray | 11A |
| 165 visible laser light reflected ray | 11A |
| 166 visible laser light diffracted ray | 11A |

-continued

| DRAWINGS—REFERENCE NUMERALS | |
|---|---|
| N Item Name | Shown in Figures |
| 167 infrared laser light incident ray | 11A |
| 168 infrared laser light reflected ray | 11A |
| 169 infrared laser light diffracted ray | 11A |
| 170 parallel direction to the visible laser light diffracted ray | 11A |
| 171 ultraviolet laser light incident ray | 11A |
| 172 ultraviolet laser light reflected ray | 11A |
| 173 ultraviolet laser light diffracted ray | 11A |
| 174 infrared laser light emitted beam | 12 13 22 23 |
| 175 infrared laser light collimated and preprocessed beam | 12 13 22 23 |
| 176 infrared laser light beam passing through the sampling cavity | 12 13 22 23 |
| 177 infrared laser light beam transmitted to interferometer | 12 13 22 23 |
| 178 infrared laser light beam reflected in the interferometer | 12 13 22 23 |
| 179 infrared laser light beam absorbed by beam stopper | 12 22 |
| 180 infrared laser light beam exiting the interferometer | 13 23 |
| 181 infrared laser light modified beam | 12 13 22 23 |
| 182 infrared laser light modified and post processed beam | 12 13 22 23 |
| 183 infrared laser light incident beam | 12 13 |
| 184 infrared laser light reflected beam | 12 13 |
| 185 infrared laser light diffracted beam | 12 13 |
| 186 visible laser light emitted beam | 14 15 24 25 |
| 187 visible laser light collimated and preprocessed beam | 14 15 24 25 |
| 188 visible laser light beam passing through the sampling cavity | 14 15 24 25 |
| 189 visible laser light beam transmitted to interferometer | 14 15 24 25 |
| 190 visible laser light beam reflected in the interferometer | 14 15 24 25 |
| 191 visible laser light beam absorbed by beam stopper | 14 24 |
| 192 visible laser light beam exiting the interferometer | 15 25 |
| 193 visible laser light modified beam | 14 15 24 25 |
| 194 visible laser light modified and post processed beam | 14 15 24 25 |
| 195 visible laser light incident beam | 14 15 24 25 |
| 196 visible laser light reflected beam | 14 15 24 25 |
| 197 visible laser light diffracted beam | 14 15 24 25 |
| 198 ultraviolet laser light emitted beam | 16 17 26 27 |
| 199 ultraviolet laser light collimated and preprocessed beam | 16 17 26 27 |
| 200 ultraviolet laser light beam passing through the sampling cavity | 16 17 26 27 |
| 201 ultraviolet laser light beam transmitted to interferometer | 16 17 26 27 |
| 202 ultraviolet laser light beam reflected in the interferometer | 16 17 26 27 |
| 203 ultraviolet laser light beam absorbed by beam stopper | 16 26 |
| 204 ultraviolet laser light beam exiting the interferometer | 17 27 |
| 205 ultraviolet laser light modified beam | 16 17 26 27 |
| 206 ultraviolet laser light modified and post processed beam | 16 17 26 27 |
| 207 ultraviolet laser light incident beam | 16 17 |
| 208 ultraviolet laser light reflected beam | 16 17 |
| 209 ultraviolet laser light diffracted beam | 16 17 |
| 210 transmission diffraction grating | 18 19 20 20A 21 21A 22 27 |
| 211 transmission diffraction grating pivoting shaft | 18 19 21 21A |
| 212 transmission diffraction grating angle control handle | 18 19 20 21 21A |
| 213 transmission diffraction grating rail | 18 19 21 21A |
| 214 transmission diffraction grating rail central pivot | 18 19 21 21A |
| 215 transmission diffraction grating rail guide slot | 18 19 21 21A |
| 216 transmission diffraction grating rail nut | 18 19 21 21A |
| 217 transmission diffraction grating rail alignment pin | 18 19 21 21A |
| 218 transmission diffraction grating rail alignment guide | 18 19 21 21A |
| 219 transmission diffraction grating rail positioning screw | 18 19 21 21A |
| 220 transmission diffraction grating rail positioning screw support | 18 19 21 |
| 221 transmission diffraction grating angle control actuator | 18 19 20 21 21A |
| 222 transmission diffraction grating angle control actuator slot | 18 19 20 21A |
| 223 transmission diffraction grating angle control actuator nut | 18 19 21 21A |
| 224 transmission diffraction grating angle control actuator positioning screw | 18 19 21 21A |
| 225 transmission diffraction grating angle control actuator positioning screw support | 18 19 21 21A |
| 226 pivoting detector | 18 19 20 21 22 23 24 25 26 27 |
| 227 pivoting detector pivoting shaft | 18 19 20 21 |
| 228 pivoting detector angle control handle | 18 19 20 21 |
| 229 pivoting detector insertion hole | 18 19 21 |
| 230 pivoting detector angle control actuator | 18 19 20 21 |
| 231 pivoting detector angle control actuator slot | 18 19 20 21 |
| 232 pivoting detector angle control actuator nut | 18 19 21 |
| 233 pivoting detector angle control actuator guide pin | 18 19 21 |

| DRAWINGS—REFERENCE NUMERALS | |
|---|---|
| N Item Name | Shown in Figures |
| 234 pivoting detector angle control actuator guide rail | 18 19 21 |
| 235 pivoting detector angle control actuator positioning screw | 18 19 21 |
| 236 pivoting detector angle control actuator positioning screw support | 18 19 21 |
| 237 laser absorption barrier | 18 19 20 21 22 23 24 25 26 27 |
| 238 standard perforation | 20A 21A 24 25 |
| 239 wider perforation | 20A 21A 22 23 |
| 240 narrower perforation | 20A 21A 26 27 |
| 241 visible laser light incident ray | 21A |
| 242 visible laser light transmitted ray | 21A |
| 243 visible laser light diffracted ray | 21A |
| 244 infrared laser light incident ray | 21A |
| 245 infrared laser light transmitted ray | 21A |
| 246 infrared laser light diffracted ray | 21A |
| 247 parallel line to the visible laser light diffracted ray | 21A |
| 248 ultraviolet laser light incident ray | 21A |
| 249 ultraviolet laser light transmitted ray | 21A |
| 250 ultraviolet laser light diffracted ray | 21A |
| 251 infrared laser light incident beam | 22 23 |
| 252 infrared laser light transmitted beam | 22 23 |
| 253 infrared laser light diffracted beam | 22 23 |
| 254 visible laser light incident beam | 24 25 |
| 255 visible laser light transmitted beam | 24 25 |
| 256 visible laser light diffracted beam | 24 25 |
| 257 ultraviolet laser light incident beam | 26 27 |
| 258 ultraviolet laser light transmitted beam | 26 27 |
| 259 ultraviolet laser light diffracted beam | 26 27 |

What is claimed is:

1. A spectroscopy analyzer, comprising:
an analyzer body configured to be handheld;
a sampling cavity configured to hold a sample;
a laser diode configured to emit laser light;
at least one of a pre-sample optical device configured to modify the frequency, intensity, polarization, and/or other optical features of the laser light emitted as specified by one or more specific tests selected for analysis and/or identification of a sample or substances within a sample, and/or to determine proportions of one or more substances within a sample, the at least one pre-sample optical device configured to be placed in the path of the emitted laser light;
a pre-sample partial mirror configured to reflect the emitted laser light through a sample within the sampling cavity;
a post-sample partial mirror configured to reflect a sample spectrum produced by modifying the emitted laser light by substances in the sample;
at least one of a post-sample optical device configured to modify the frequency, intensity, polarization, and/or other optical features of the laser light emitted as specified by one or more specific tests selected for analysis and/or identification of a sample or substances within a sample, and/or to determine proportions of one or more substances within a sample, the at least one of a post-sample optical device configured to be placed in the path of the emitted laser light;
a detector configured to be movable; and
wherein the movable detector comprises:
a rail having a curved rail guide slot;
a rail positioning screw;
a first micro motor configured to move the rail to a position along the rail positioning screw to define the center of the moving detector;
an angle control handle configured to be movable within the curved rail guide slot;
a rail angle control actuator slot;
a rail angle control actuator configured to be movable within the rail angle control actuator slot;
a rail angle control actuator positioning screw;
a second micro motor configured to adjust the angle of the moving detector by moving the rail angle control actuator positioning screw thereby moving the rail angle control actuator within the rail angle control actuator slot that forces the angle control handle to slide and assume the position defined by the intersection of the moving detector rail guide slot and the rail angle control actuator slot thereby pivoting the moving detector to the desired angle with respect to the sample spectrum;
and
wherein specific characteristics of the emitted laser light are modified by the at least one pre-sample optical device based on one or more specific tests desired for analysis of a sample's molecular characteristics altering the characteristics of the emitted laser light producing a sample spectrum, the sample spectrum directed to the post-sample partial mirror and reflected to the at least one of a post-sample optical device and to the movable detector configured to identify substances and/or proportions of substances within the sample based on the one or more specific tests selected for analysis and/or identification of the sample and/or to determine proportions of one or more substances within the sample.

2. The spectroscopy analyzer of claim 1 comprising a laser diode tray configured to provide for the selection of one of at least a laser diode configured to emit laser light at an infrared range of wavelengths, a laser diode configured to emit laser light at a visible range of wavelengths, and a laser diode configured to emit laser light at an ultraviolet range of wavelengths.

3. The spectroscopy analyzer of claim 1 wherein the optical devices are configured to enable the execution of specific tests of spectral analysis based on one of at least absorption, reflection, excitation, resonance, and Raman.

4. The spectroscopy analyzer of claim 1 wherein the movable detector is configured to enable the processing of specific tests of spectral analysis based on one of at least absorption, reflection, excitation, resonance, Raman, and interferometry.

5. The spectroscopy analyzer of claim 1 wherein the sampling cavity is configured to accept liquids, solids or a mixture.

6. The spectroscopy analyzer of claim 1 wherein the sampling cavity is configured for the insertion of a finger or other body part for analysis.

7. The spectroscopy analyzer of claim 1 wherein the sampling cavity is configured as a blower device for the analysis of gases.

8. The spectroscopy analyzer of claim 1, comprising an optical cartridge comprising a plurality of optical devices, the optical cartridge configured to contain a plurality of pre-sample or post sample optical devices and provide for a pre-sample optical device to be selected and be placed in the path of the emitted laser light or provide for a post-sample optical device to be selected and be placed in the path of the sample spectrum based on the one or more specific tests selected for analysis and/or identification of the sample and/or to determine proportions of one or more substances within the sample.

9. The spectroscopy analyzer of claim 1, comprising a reflective diffraction grating configured to reflect a specific range of wavelengths of the sample spectrum to the movable detector.

10. The spectroscopy analyzer of claim 1, comprising a selection mirror configured to direct the sample spectrum to a reflective diffraction grating.

11. A spectroscopy analyzer comprising:
an analyzer body configured to be handheld;
a sampling cavity configured to hold a sample;
a laser diode configured to emit laser light;
at least one of a pre-sample optical device configured to modify the frequency, intensity, polarization, and/or other optical features of the laser light emitted as specified by one or more specific tests selected for analysis and/or identification of a sample or substances within a sample, and/or to determine proportions of one or more substances within a sample, the at least one pre-sample optical device configured to be placed in the path of the emitted laser light;
a pre-sample partial mirror configured to reflect the emitted laser light through a sample within the sampling cavity;
a post-sample partial mirror configured to reflect a sample spectrum produced by modifying the emitted laser light by substances in the sample;
at least one of a post-sample optical device configured to modify the frequency, intensity, polarization, and/or other optical features of the laser light emitted as specified by one or more specific tests selected for analysis and/or identification of a sample or substances within a sample, and/or to determine proportions of one or more substances within a sample, the at least one of a post-sample optical device configured to be placed in the path of the emitted laser light;
a detector configured to be movable;
an interferometer comprising:
a first interference mirror having a positioning device and configured to be positioned in line with the pre-sample partial mirror;
a second interference mirror having a positioning device and configured to be positioned at a 90 degree angle from the first interference mirror;
each positioning device of the first and second interference mirrors comprising:
a positioning device control bar;
a positioning device guide rail formed within the analyzer body;
a positioning device control bar positioning screw;
a positioning device guide slot formed in the analyzer body;
a positioning device guide pin configured to be movable within the positioning device guide slot formed in the analyzer body;
a micro motor configured to move the positioning device control bar screw to position the positioning device control bar within the positioning device positioning device guide rail to position the interference mirror thereby moving the positioning device guide pin within the positioning device guide slot; and
wherein the positioning device guide slot allowing only a short range of movement of the positioning device guide pin, the short range of movement sufficient to achieve destructive interference of a portion of emitted laser light that is not reflected by the pre-sample mirror and instead reflects off of the first interference mirror to the second interference mirror and the sample spectrum, the destructive interference beam directed to the post-sample partial mirror and reflected to at least one of a post-sample optical device and to the movable detector configured to detect an interference pattern and to identify substances and/or proportions of substances within the sample based on the one or more specific tests selected for analysis and/or identification of the sample and/or to determine proportions of one or more substances within the sample.

12. The spectroscopy analyzer of the claim 11, comprising a beam stopper configured to prevent destructive interference of the sample spectrum.

13. The spectroscopy analyzer of the claim 11, comprising a transmission diffraction grating configured to direct a specific range of wavelengths of the sample spectrum to the movable detector.

14. A method for spectroscopy analysis, comprising:
emitting a laser light through at least one of a pre-sample optical device configured to modify the frequency, intensity, polarization, and/or other optical features of the emitted laser light as specified by one or more specific tests selected for analysis and/or identification of a sample or substances within a sample, and/or to determine proportions of one or more substances within a sample;
reflecting the laser light from a pre-sample partial mirror to a sample within the sampling cavity;
modifying the frequency, intensity, polarization, and/or other optical features of the laser light emitted to the sample as specified by one or more specific tests selected for analysis and/or identification of a sample or substances within the sample, and/or to determine proportions of one or more substances within the sample to produce a sample spectrum;
directing the sample spectrum to a post-sample partial mirror;
reflecting the sample spectrum from the post-sample partial mirror to at least one of a post-sample optical device configured to modify the frequency, intensity, polarization, and/or other optical features of the emitted laser light as specified by one or more specific tests selected for analysis and/or identification of a sample or substances within a sample, and/or to determine proportions of one or more substances within a sample to a movable detector comprising a rail, a curved rail guide slot, and a rail positioning screw;

moving the rail along the rail positioning screw to define the center of the moving detector;

adjusting the moving detector to an angle by moving an angle control handle within the rail guide slot;

moving a rail angle control actuator within a rail angle control actuator slot forcing the angle control handle to slide and assume the position defined by the intersection of the moving detector rail guide slot and the rail angle control actuator slot thereby pivoting the moving detector to the desired angle with respect to the sample spectrum;

configured to identify substances and/or proportions of substances within the sample based on the one or more specific tests desired for analysis and/or identification of the sample and/or to determine proportions of one or more substances within the sample.

15. The method for the spectroscopy analysis of claim 14, comprising directing the sample spectrum to a reflective diffraction grating configured to reflect a specific range of wavelengths of the sample spectrum to the movable detector.

16. The method for the spectroscopy analysis of claim 14, comprising directing a portion of the emitted laser light to an interferometer to achieve destructive interference with the sample spectrum and detecting an interference pattern using the movable detector.

17. The method for the spectroscopy analysis of claim 14, comprising directing the sample spectrum to a transmission diffraction grating configured to direct a specific range of wavelengths of the sample spectrum to the movable detector.

* * * * *